(12) United States Patent
Ishii

(10) Patent No.: US 7,363,993 B2
(45) Date of Patent: Apr. 29, 2008

(54) TRAVELING APPARATUS AND METHOD FOR CONTROLLING THEREOF

(75) Inventor: Shinji Ishii, Kanagawa (JP)

(73) Assignee: Toyota Jidosha Kabushiki Kaisha (JP)

( * ) Notice: Subject to any disclaimer, the term of this patent is extended or adjusted under 35 U.S.C. 154(b) by 315 days.

(21) Appl. No.: 10/980,604

(22) Filed: Nov. 3, 2004

(65) Prior Publication Data

US 2005/0121238 A1 Jun. 9, 2005

(30) Foreign Application Priority Data

Nov. 4, 2003 (JP) ............................. 2003-374628
Nov. 4, 2003 (JP) ............................. 2003-374629

(51) Int. Cl.
*B60K 1/00* (2006.01)
*B62D 61/00* (2006.01)

(52) U.S. Cl. ..................... 180/7.1; 180/65.1; 180/218

(58) Field of Classification Search ................ 180/6.2, 180/6.48, 6.5, 7.1, 21, 218, 282, 290; 280/5.502–513
See application file for complete search history.

(56) References Cited

U.S. PATENT DOCUMENTS 6,288,505 B1    9/2001 Heinzmann et al.
6,367,817 B1 *  4/2002 Kamen et al. ........... 280/5.507
6,543,564 B1 *  4/2003 Kamen et al. ........... 180/89.13
6,827,163 B2 * 12/2004 Amsbury et al. ............ 180/7.1
6,874,591 B2 *  4/2005 Morrell et al. .............. 180/179

FOREIGN PATENT DOCUMENTS

JP          2005-006435          1/2005

\* cited by examiner

*Primary Examiner*—Lesley D. Morris
*Assistant Examiner*—Marc A. Scharich
(74) *Attorney, Agent, or Firm*—Finnegan, Henderson, Farabow, Garrett & Dunner, L.L.P.

(57) ABSTRACT

A traveling apparatus suitable for use in a two-wheeled traveling vehicle on which a man rides, and a method for controlling thereof, are provided. An abrupt turn, which can make a rider fall down, is prevented, and stable traveling is obtained without fail. Specifically, the apparatus and method efficiently charge regenerative energy that is generated when decelerating or traveling on a downward slope. The apparatus and method include motors for driving a plurality of wheels independently, a chassis for connecting the plurality of wheels, in which sensors for detecting a shift of barycenter of a rider are provided, and a controller for restricting a rotational velocity of each of the plurality of wheels to a predetermined limited value, wherein turning is performed in accordance with the shift of a barycentric position.

14 Claims, 56 Drawing Sheets

| FIG.23A |
| FIG.23B |

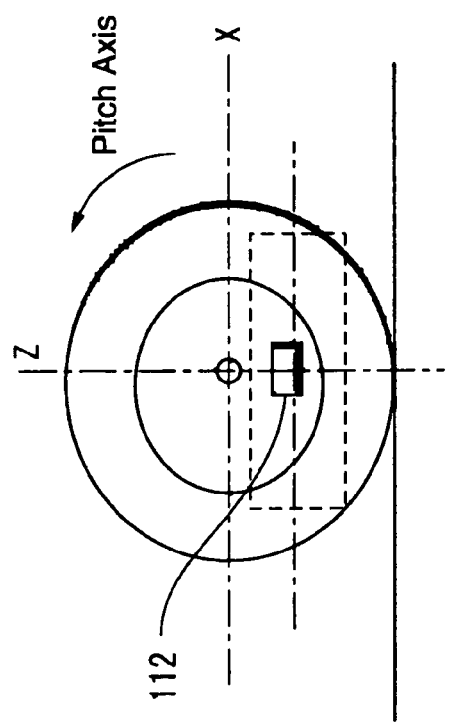
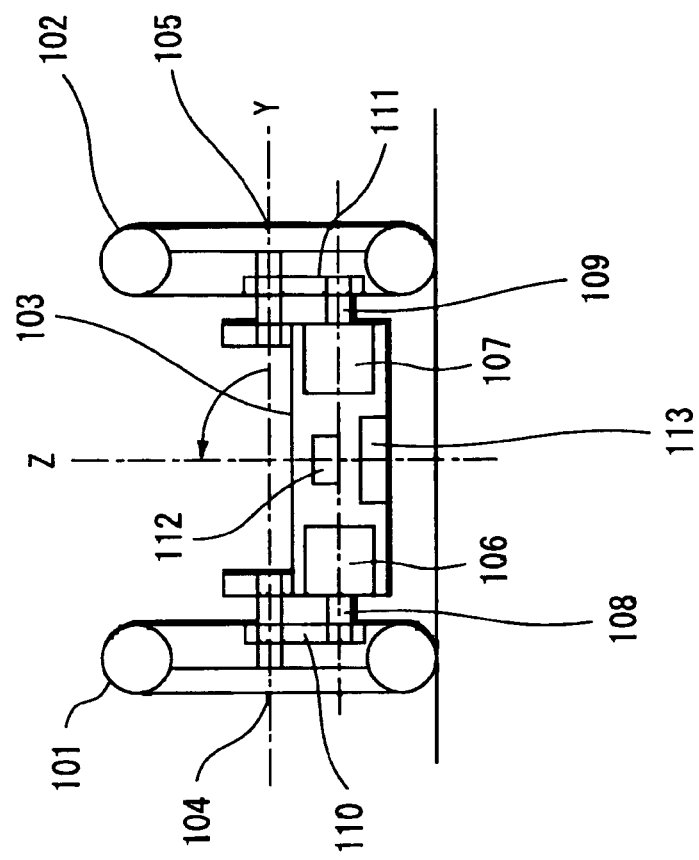
FIG. 47B
FIG. 47A

Trajectory by Turn Velocity Adjusted Based On Size of Barycentric Position (Sentrifugal Force = Small)

Trajectory by Turn Velocity Not Adjusted (Centrifugal Force = Large)

Barycentric Position

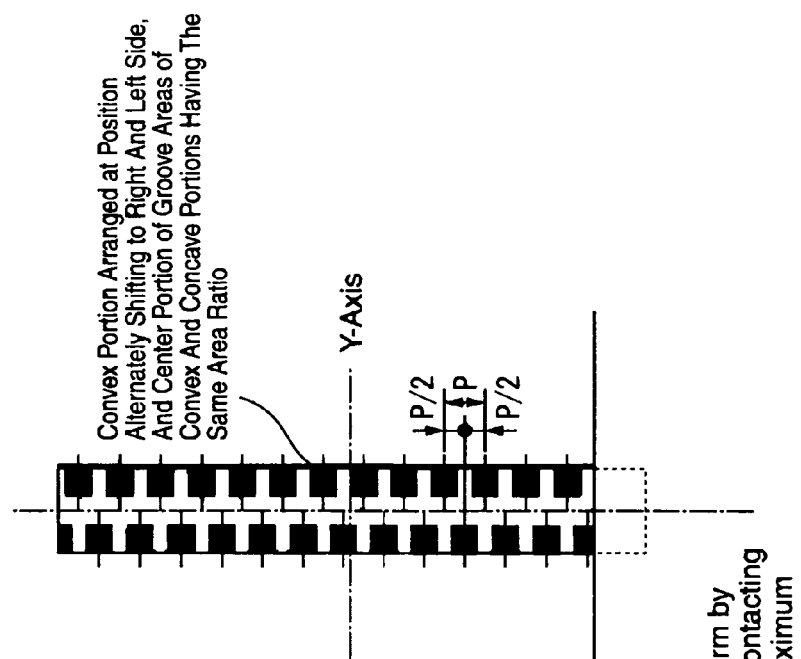
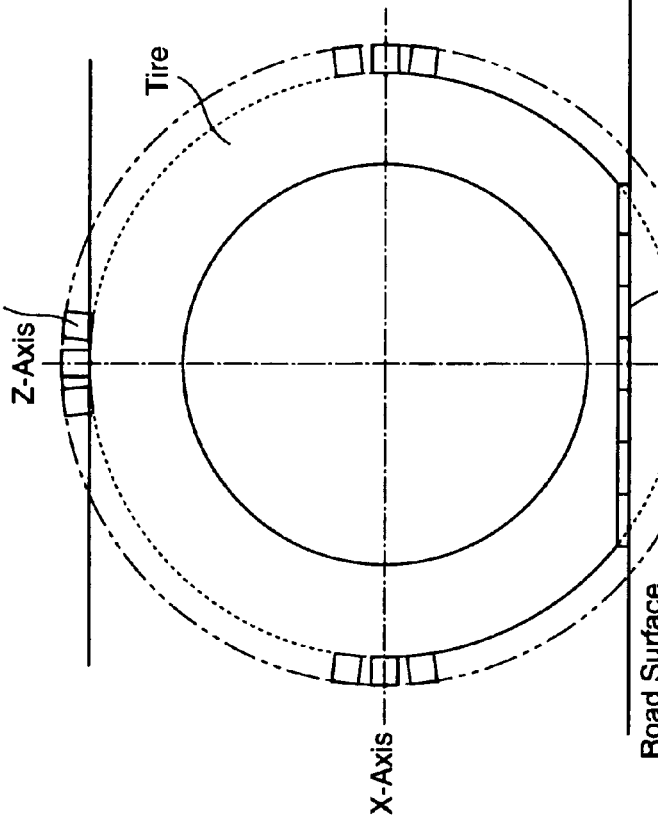

FIG. 65A
FIG. 65B
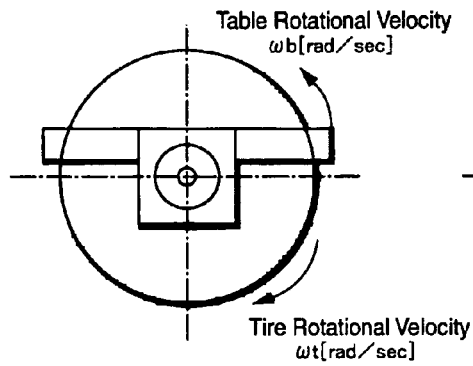
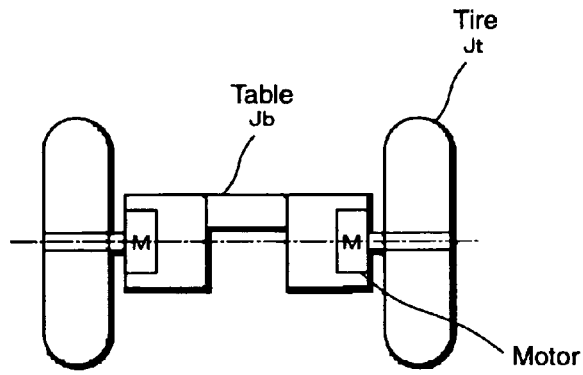
FIG. 66
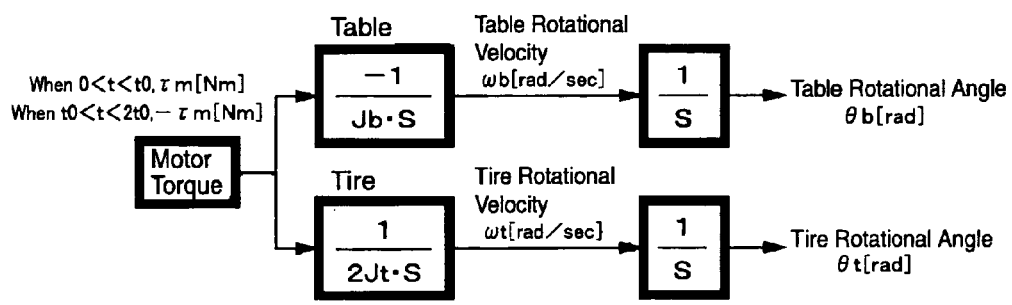
FIG. 67
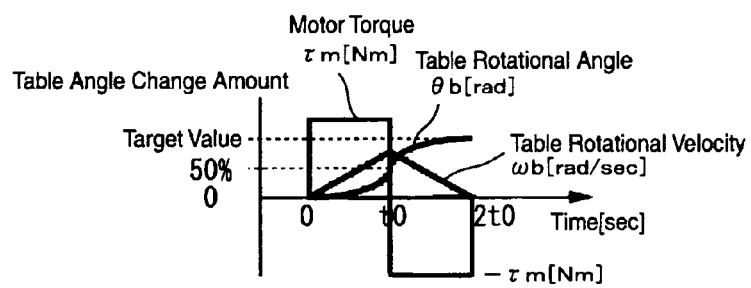

Weight Center

TRAVELING APPARATUS AND METHOD FOR CONTROLLING THEREOF

BACKGROUND OF THE INVENTION

1. Field of the Invention

The present invention relates to a traveling apparatus suitable for use in, for example, a two-wheeled traveling vehicle on which a man rides and to a method for controlling thereof; specifically, relates to the apparatus and method in which charging with regenerative energy that is, for example, generated when decelerating or traveling a downward slope is efficiently performed to obtain excellent traveling.

2. Description of the Related Art

For example, a two-wheeled traveling vehicle on which a man rides has been proposed (for example, refer to a patent reference 1).

[Patent reference 1] U.S. Pat. No. 6,288,505

Specification

For example, the applicant of the present invention has previously proposed a traveling apparatus described hereunder (Japanese Patent Application No. 2003-168224) as a two-wheeled traveling vehicle on which a man rides.

First, FIG. 1 is a perspective view showing an external appearance of an example of a coaxial two-wheeled vehicle which has been proposed by the applicant of the present invention. A pair of wheels 3 (a right wheel 3R and a left wheel 3L) is fixed to both ends of an axle 2 in the coaxial two-wheeled vehicle 1 shown in FIG. 1. The wheel 3 is formed of a rubber material having flexibility, and the inside thereof is filled with air, nitrogen gas or the like. With adjusting pressure of the gas to adjust the flexibility of the wheel 3, vibration of a body of the vehicle can be absorbed and vibration caused by an unevenness of a road surface or a shock caused by a level difference can be reduced.

Further, a base 4 is supported by the axle 2 under a board where for example a man stands, to be capable of making an inclined movement around the axle 2, and a chassis having an approximately rectangular parallelepiped shape in which a control unit described later on and the like are stored is joined to the base 4. Note that, in the following explanation, a midpoint of the axle 2 connecting both wheels is assumed to be the origin 0 of an X-Y-Z coordinate system; and it is defined that the direction which passes through the origin 0 and is parallel to a principal plane of the base 4 and also is orthogonal to the axle 2 is an X axis or a roll axis, the direction of the axle passing through the origin 0 is a Y axis or a pitch axis and the direction passing though the origin 0 which is orthogonal to the principal plane of the base 4 is a Z axis or a yaw axis. Further, it is defined that a forward direction of the coaxial two-wheeled vehicle 1 is a positive direction of the X axis, a left direction thereof is a positive direction of the Y axis and an upper direction thereof is a positive direction of the Z axis, respectively.

As shown in FIG. 2, motors 10 (10R and 10L) capable of rotating in forward and reverse directions are mounted on the base 4, and rotary encoders 11 (11R and 11L) for detecting a rotational position of the motors 10 are provided adjacently to the motors 10. In addition, reducers 12 (12R and 12L) including a gear or a timing belt are provided between the motors 10 and the wheels 3 so that a rotation of the motors 10 can be transmitted to the wheels 3 through the reducers 12 and a joint (not shown).

Furthermore, in the base 4 are incorporated various other sensors than a gyroscopic sensor 13 for detecting angular velocities $\omega p$ and $\omega yaw$ around the pitch axis and the yaw axis of the base 4, such as an acceleration sensor 14 for detecting linear accelerations $Ax$, $Ay$ and $Az$ in the directions of X, Y and Z axes and for detecting angular accelerations $\alpha p$, $\alpha r$ and $\alpha yaw$ around the pitch axis, the roll axis and the yaw axis, a pressure sensor 15 for detecting a load weight on the base 4 and the like.

Among the above sensors, the pressure sensors 15 are provided at four corners between a support table 4a and a movable table 4b constituting the board of the base 4 as shown in a plan view of FIG. 3A and a side view of FIG. 3B, so that the barycentric coordinates (Xg, Yg) of a load on the base 4 and also a load weight Wg thereof can be detected from sensor signals of those four pressure sensors $15_1$, $15_2$, $15_3$ and $15_4$.

Specifically, when the sensor signals of the pressure sensors $15_1$ through $15_4$ are $PS_1$, $PS_2$, $PS_3$ and $PS_4$, respectively, and also when its own weight of the base 4 applied to the pressure sensors $15_1$ through $15_4$ is $W_0$ in a state with no load, the load weight Wg can be obtained as shown in the following formula (1).

[Numerical Expression 1]

$$W_g = PS_1 + PS_2 + PS_3 + PS_4 - W_0 \tag{1}$$

Also, when the respective coordinates of the pressure sensors $15_1$, $15_2$, $15_3$ and $15_4$ are $(X_{ps}, Y_{ps})$, $(-X_{ps}, Y_{ps})$, $(-X_{ps}, -Y_{ps})$ and $(X_{ps}, -Y_{ps})$, the barycentric coordinate (Xg, Yg) can be obtained as shown in the following formula (2).

[Numerical Expression 2]

$$\begin{cases} X_g = X_{ps} * (W1 - W2)/(W1 + W2) \\ Y_g = Y_{ps} * (W3 - W4)/(W3 + W4) \end{cases} \tag{2}$$

wherein $$\begin{cases} W1 = (PS_1 + PS_4)/2 - W_{14} \\ W2 = (PS_2 + PS_3)/2 - W_{23} \\ W3 = (PS_1 + PS_2)/2 - W_{12} \\ W4 = (PS_3 + PS_4)/2 - W_{34} \end{cases}$$

In the formula (2), $W_{14}$ denotes its own weight in a state with no load applied to the pressure sensors $15_1$ and $15_4$, $W_{23}$ denotes its own weight applied to the pressure sensors $15_2$ and $15_3$ in the state with no load, $W_{12}$ denotes its own weight applied to the pressure sensors $15_1$ and $15_2$ in the state with no load, and $W_{34}$ denotes its own weight applied to the pressure sensors $15_3$ and $15_4$ in the state with no load.

Accordingly, since a load induced torque T1 caused by the load on the base 4 can be thus calculated using the pressure sensors 15, it becomes possible to maintain a balance on the base 4 to stabilize a posture when the moment of reaction is given to the motor 10.

Furthermore, a control unit 16 including a microcomputer is mounted on the lower chassis of the base 4, to which various sensor signals and detection signals are input. The control unit 16 performs control based on those input signals so as to generate a motor torque that makes a vehicle body move forward, move backward and turn while maintaining a pitch axis angle and a yaw axis angle of the base 4 at an appropriate value as described later on.

Further as shown in FIG. 4, the coaxial two-wheeled vehicle 1 has a structure in which a weight center M of the base 4 that is capable of making an inclined movement around the axle 2 can be positioned lower than the axle 2.

Therefore, the barycentric position of the vehicle body is maintained at the most stable position even when not moving, and the coaxial two-wheeled vehicle 1 may not topple over easily. Note that, although in FIG. 4 a height of the upper surface of the base 4 is higher than the axle 2, the upper surface of the base 4 may be lower than the axle 2.

Hereupon, an explanation is made with respect to a concept for control to maintain a posture on the base 4. As shown in FIG. 5, when a motor torque Tm is controlled to generate the same moment as the load induced torque $T_1$ caused by a load on the base 4 which is, for example, a man's weight, the base 4 is balanced like a seesaw with a center as a fulcrum thereof. A point corresponding to the fulcrum for maintaining the balance, that is, a point where the rotational moment around the axle 2 becomes zero is called a ZMP (Zero Moment Point). When the ZMP coincides with a ground-contacting point of the wheel 3 with a road surface, or when the ZMP is within a ground-contacting surface with the road surface, the balance is kept to maintain the posture on the base 4.

In the case where a man having a weight Wh rides on the coaxial two-wheeled vehicle 1, the weight center M of the base 4 inclines about the axle 2a as a center thereof in accordance with the man's inclined angle θ as shown in FIG. 6. At this time, an axle torque $T_0$ to keep the balance of the axle 2 is expressed with the following formula (3), and the motor torque Tm for maintaining the posture is shown by $T_0/N$, where a reduction ratio of the reducer 12 is N:1.

[Numerical Expression 3]

$$T_0 = Wh^* \sin\theta - Wm^* \sin\theta \qquad (3)$$

Thus, since the above described coaxial two-wheeled vehicle 1 has a structure in which the weight center M of the base 4 is positioned lower than the axle 2 as described above, only adding a difference between the moment by the man's weight Wh and the moment by the weight Wm of the base 4 as the axle torque $T_0$ is needed as shown in the formula (3) so that the balance is maintained with a comparatively small motor torque.

Further, a dynamic model for maintaining a posture on the base 4 is explained in detail using an X-Z coordinate system shown in FIG. 7. Hereupon, to make the explanation simple, it is considered in FIG. 7 that one wheel 3 is provided. Further, the wheel 3, the base 4 and a man on the base 4 are respectively regarded as a link, and barycentric position coordinates thereof are $(x_0, z_0)$, $(x_1, z_1)$ and $(x_2, z_2)$, respectively. Furthermore, the mass of each link is $m_0$, $m_1$ and $m_2$, respectively, and inertial moments thereof are $I_0$, $I_1$ and $I_2$, respectively.

Each kinetic momentum of the i-th link (i=0, 1, 2) around the defined point Ω (σ, φ) is expressed with the following formula (4), where the barycentric coordinates are $(x_i, z_i)$. Here, one dot put on x and z in the formula (4) denotes a first-stage differentiation of x and z.

[Numerical Expression 4]

$$Ii * \dot{\omega}i + mi * \dot{X}i(\varphi - zi) - mi * \dot{Z}i(\sigma - xi) \qquad (4)$$

Therefore, the moment of all links by the inertial force is expressed with the following formula (5). Hereupon, two dots put on x and z in the formula (5) denote a second-stage differentiation of x and z. Further, the moment of all links by the gravity is expressed with the following formula (6), where gravity acceleration is g.

[Numerical Expression 5]

$$\sum_{i=0}^{n}(Ii * \dot{\omega}i + mi * \ddot{x}i(\varphi - zi) - mi * \ddot{z}i(\sigma - xi)) \qquad (5)$$

$$\sum_{i=0}^{n} mi(\sigma - xi)g \qquad (6)$$

As shown in a formula (7), the moment MΩ around the point Ω(σ, φ) is given by the sum of the moment by the inertial force and the moment by the gravity.

[Numerical Expression 6]

$$M\Omega = \sum_{i=0}^{n} Ii * \dot{\omega}i + \sum_{i=0}^{n} mi(\ddot{x}i(\varphi - zi) - mi * \ddot{z}i(\sigma - xi)) + \qquad (7)$$

$$\sum_{i=0}^{n} mi(\sigma - xi)g$$

With excluding the moment by the gravity for the wheel 3 having the mass $m_0$, the above described moment MΩ becomes the moment Ma around the axle 2 by taking the point Ω(σ, φ) as the origin. This moment Ma around the axle 2 is expressed with the following formula (8).

[Numerical Expression 7]

$$Ma = \sum_{i=0}^{n} Ii * \dot{\omega}i + \sum_{i=0}^{n} mi(\ddot{z}i * xi - \ddot{x}i * zi) - \sum_{i=0}^{n} mi * xi * g \qquad (8)$$

To express the above described moment MΩ using the moment Ma, the moment is given by the following formula (9) when $X_0=0$, that is, when the barycentric position of the wheel 3 is on the axle 2.

[Numerical Expression 8]

$$M\Omega = Ma - \sum_{i=0}^{n} mi(\ddot{z}i - g)\sigma + \sum_{i=0}^{n} mi * \ddot{x}i * \varphi \qquad (9)$$

Here, the ZMP is defined as a point on a floor surface where the moment MΩ is zero. Then, if a height of the axle 2 is h and the coordinates of the ZMP are (σzmp, −h) to be substituted for the formula (7), the formula becomes the following formula (10). The ZMP can be expressed with a link position, acceleration and the mass by solving the formula (10) with respect to σzmp.

[Numerical Expression 9]

$$0 = \sum_{i=0}^{n} Ii * \dot{\omega}i + \sum_{i=0}^{n} mi(-\ddot{x}i(h + zi) - \ddot{z}i(\sigma zmp - xi)) + \qquad (10)$$

$$\sum_{i=0}^{n} mi(\sigma zmp - xi)g$$

Moreover, if the coordinates (σzmp, −h) of the ZMP are substituted for the above described formula (9), the following formula (11) is obtained. The formula (11) expresses a balanced moment around the axle 2.

[Numerical Expression 10]

$$O = Ma - \sum_{i=0}^{n} mi(\ddot{z}i - g)\sigma zmp - \sum_{i=0}^{n} mi * \ddot{x}i * h \quad (11)$$

Hereupon, a force which acts on the ZMP is illustrated in FIG. 8. In FIG. 8, FN denotes a floor reactive force, FT denotes a rotational friction force and F denotes a composite vector of the FN and the FT. In addition, though in actuality distributed over the whole ground-contacting surface of the wheel 3, the floor reactive force FN is expressed in FIG. 8 as the one concentrated on the ZMP. Based on this diagram, a formula expressing the balanced moment around the axle 2 is obtained as the following formula (12).

[Numerical Expression 11]

$$FN*\sigma zmp + FT*h + \tau 0 = 0 \quad (12)$$

Here, the formula (12) becomes the same as the above described formula (11), when the following formulas (13) through (15) are substituted.

[Numerical Expression 12]

$$T_0 = Ma \quad (13)$$

$$FN = -\sum_{i=0}^{n} mi(\ddot{z}i - g) \quad (14)$$

$$FT = -\sum_{i=0}^{n} mi * \ddot{x}i \quad (15)$$

In order to stabilize the posture on the base 4, it is only required that the σzmp becomes 0 in the formula (12). In other words, the posture can be maintained if the axle torque $T_0 = -FT*h$ is obtained. Therefore, with controlling state variables shown in the following formula (16) that satisfies $T_0 = FT = 0$, the posture can be stabilized.

[Numerical Expression 13]

$$(xi, \dot{x}i, \ddot{x}i) = (0, 0, 0) \quad (16)$$

Hereupon, $x_0$ and $x_1$ can be determined uniquely in accordance with a mechanical structure; however, $m_2$, $I_2$, $x_2$ and $z_2$ are variable, because those values belong to a man. The moment Mt on the base 4 with those $m_2$, $I_2$, $x_2$ and $z_2$ is given by the following formula (17). Here, the base 4 is assumed to be kept horizontal as shown in FIG. 9.

[Numerical Expression 14]

$$Mt = I2*\dot{\omega} + m2*\ddot{z}2*x2 - m2*\ddot{x}2*(z2-L) - m2*x2*g \quad (17)$$

Hereupon, since the angular velocity ω2 is small enough when the load is a man, ω2≈0 is approximated, and the moment Mt becomes zero when $x_2$ and a second-stage differentiation value thereof are made to be zero in a formula (17). Making $x_2$ and the second-stage differentiation value thereof become zero can be considered equivalent to controlling $x_0$ and $x_1$ so that the load induced torque $T_1$ on the base 4 become zero. Further, the moment Mt by the load induced torque T1 is equivalent to a force F2 acting to a point of action (xf, L) on the base 4. Therefore, if $x_0$ and $x_1$ to make the xf zero is given, $T_1$ becomes zero and the condition to keep the posture stable can be satisfied.

When a signal of the gyroscopic sensor on the base 4 is controlled through feed-back to maintain $x_0 = x_1$ by giving the motor torque Tm as shown in FIG. 9, the posture can be kept stable by controlling the motor torque Tm to become $xf = x_0$.

Specifically, when an error Ef is $Ef = x_f - x_0$, in case of Ef>0 the motor torque Tm is negative to displace the $x_0$ in the positive direction to make the vehicle move forward and in case of Ef<0 the motor torque Tm is positive to displace the $x_0$ in the negative direction to make the vehicle move backward, so that the error Ef can be reduced to zero. In other words, when $A_0$ is a positive constant and the motor torque $Tm = -A_0*Ef$ is given to reduce the Ef to zero, the posture can be kept stable.

In practice, as shown in FIG. 10, in the case where the base 4 inclines by an angle of $\theta_0$ around the pitch axis, since the load induced torque T1 ($=M\tau \times L$) is actually generated by a man having a weight M, with controlling the motor torque Tm to give the axle torque $T_0$ in the opposite direction to the load induced torque T1 the ZMP can be made to coincide with the ground-contacting point of the wheel 3 to keep the posture stable.

Hereupon, when a man rides on the base 4, a force applied to soles is fluctuated usually in a cycle of 1 to 2 seconds in order to maintain the posture though there is an individual difference, and therefore, the load induced torque T1 by the man's weight changes accordingly. Hence, it is necessary to add to the motor 10 such torque that can maintain a balance in real time so as to keep an angle of the base 4 constant with respect to a load fluctuation.

Then, in order to balance out such load fluctuation in real time, the above described coaxial two-wheeled vehicle 1 has a control mechanism shown in FIG. 11 inside the control unit 16. In FIG. 11, difference between a present base angel $\theta_0$ detected by the gyroscopic sensor 13 and by the acceleration sensor 14, and a base angle command θref that is a postural command is obtained in a subtractor 20, and the difference is supplied to a postural controller 21. The postural controller 21 computes a motor torque current value Tgyr [A] from the base angle command θref and from the present base angle $\theta_0$.

Further, in a regulator 22, the load induced torque T1 is estimated using sensor signals $PS_1$, $PS_2$, $PS_3$ and $PS_4$ from the pressure sensors 15, and to balance out the load induced torque T1, an estimated load induced torque current value $T_1'/Km$ [A] is computed. Here, Km is a motor constant [N m/A]. When the barycentric coordinates of the load are (Xg, Yg) and the load weight is Wg, the estimated load induced torque T1' is expressed as the following formula (18).

[Numerical Expression 15]

$$T1' = Wg*Xg/2 \quad (18)$$

Then, a difference between the motor torque current value Tgyr and the estimated load induced torque current value T1'/Km is obtained in a subtractor 23, and the difference is supplied to a motor 24 as motor current I[A]. The motor 24 generates a motor torque Tm from the rotation using the motor current I, and the motor torque Tm and the load induced torque T1 are added in an adder 25 to be transmitted to a base 26.

Thus, the base angle can be kept constant against the load fluctuation when being stopped by adding to the motor 24 the motor torque Tm to balance out the load induced torque T1.

With the control mechanism described above, a postural stabilization control can be performed; however, in order to travel in this state, a control mechanism for traveling is further required. Therefore, the above described coaxial two-wheeled vehicle 1 actually has a control mechanism of two-wheeled structure in which a motor torque for postural stabilization control and a motor torque for traveling control are obtained independently.

A physical model for such a control mechanism of two-wheeled structure is shown in FIG. 12. Note that, to make the explanation simple, it is considered in FIG. 12 that only one wheel 3 is provided. As shown in FIG. 12, various sensors such as the gyroscopic sensor 13, the acceleration sensor 14, the pressure sensor 15 and the like are incorporated in the base 4, under which a motor stator 30, a rotary encoder 31 and a motor rotor 32 are provided, and the rotation of the motor rotor 32 is transmitted to the wheel 3 through a reducer 33 and a joint 34.

A postural controller/regulator 40 computes the above described motor torque Tgyr and estimated load induced torque T1' using the base angle command $\theta$ref that is a postural command, the present base angle $\theta_0$ detected by the gyroscopic sensor 13 and the acceleration sensor 14, and also the sensor signals $PS_1$, $PS_2$, $PS_3$ and $PS_4$ of the pressure sensors 15. Further, a motor controller 41 computes a motor torque for traveling, using the rotational position command Pref of the motor rotor 32 which is a travel command and the present rotational position $\theta$r of the motor rotor 32 detected by the rotary encoder 31.

Then, the motor torque Tgyr, the estimated load induced torque T1' and also the motor torque for traveling are added in an adder 42, and the added value is supplied to the motor rotor 32.

Here, the above described base angle command $\theta$ref is a target value of the base angle which is set in accordance with an acceleration Ax in the X-axis direction so that a rider can ride on stably. Specifically, the target value $\theta$ref is set so that the base 4, becomes horizontal when the X-axis acceleration Ax is zero; the base 4 is inclined forward when the X-axis acceleration Ax is positive; and the base 4 is inclined backward when the X-axis acceleration Ax is negative, respectively.

Then, with for example the positive X-axis acceleration Ax, when the base 4 is inclined such that the ZMP can be positioned in the direction of a composite vector of an inertial force and a gravitational force as shown in FIG. 13, the rider can keep his/her posture stable. In addition, the base angle command $\theta$ref changes in proportion to the X-axis acceleration Ax.

A block diagram of the control mechanism is shown in FIG. 14. A difference between the base angle command $\theta$ref that is a postural command and the present base angle $\theta_0$ detected by the gyroscopic sensor 13 (and the acceleration sensor 14) is obtained in a subtractor 50, and the difference is supplied to a postural controller 51. The postural controller 51 computes the motor torque Tgyr using the base angle command $\theta$ref and the present base angle $\theta_0$, and supplies the motor torque Tgyr to an adder 54.

On the other hand, a difference between the rotational position command Pref of the motor rotor 57 which is a travel command and a present rotational position $\theta$r of a motor rotor 57 detected by a rotary encoder 58 is obtained in a subtractor 52, and the difference is supplied to a motor controller 53. The motor controller 53 computes the motor torque for traveling using the rotational position command Pref and the present rotational position $\theta$r, and supplies the motor torque to the adder 54.

Moreover, when the load induced torque T1 is applied to the base 4, the sensor signals $PS_1$, $PS_2$, $PS_3$ and $PS_4$ of the pressure sensors 15 are supplied to a regulator 55, and the regulator 55 computes the above described estimated load induced torque T1' based on those sensor signals.

The motor torque Tgyr from the postural controller 51 and the motor torque from the motor controller 53 are added in the adder 54, and the estimated load induced torque T1' is subtracted from the added value in a subtractor 56. The result finally becomes the motor torque Tm and is supplied to the motor rotor 57. A reactive force of the motor torque Tm and the load induced torque T1 are added in an adder 59, and the added value is supplied to a motor stator/base 60.

A rotational control is performed on the motor rotor 57 in accordance with the motor torque Tm. The rotational position Or of the motor rotor 57 is converted into 1/N by a reducer 61 having a reduction ratio of N:1 to be transmitted to the wheel 3. Specifically, a rotational position $\theta$w of the wheel 3 is 1/N of the rotational position $\theta$r of the motor rotor 57. The rotary encoder 58 detects the rotational position $\theta$r of the motor rotor 57, and the detected signal is supplied to the subtractor 52.

On the other hand, although the added value of the reactive force of the motor torque Tm and the load induced torque T1 is applied to the motor stator/base 60 as described above, an inclined movement of the motor stator/base 60 can be prevented, because both the values are mutually canceled out.

FIG. 15 shows the processing of the block diagram shown in FIG. 14 as a mathematical model using a Laplace operator. As described above, the difference between the base angle command $\theta$ref and the present base angle $\theta_0$ is supplied to the postural controller 51, and the difference between the rotational position command Pref of the motor rotor 57 and the present rotational position $\theta$r is supplied to the motor controller 53. In the postural controller 51 and motor controller 53, each motor torque is computed by a feed-back control which performs, for example, a PID (proportional, integral and differential) operation.

Specifically, $Kp_0$ and $Kp_1$ become proportional gains, $Ki_0$ and $Ki_1$ become integral gains, and $Kd_0$ and $Kd_1$ become differential gains. Depending on those control gains, following characteristics of a motor which responds to the postural command $\theta$ref and to the travel command Pref may vary. For example, when the proportional gains $Kp_0$ and $Kp_1$ are made small, the motor rotor 57 moves with a slow delay in following, and when the proportional gains $Kp_0$ and $Kp_1$ are made large, the motor rotor 57 moves at high velocity in following. Thus, by changing the control gain, the amount of difference between the postural command $\theta$ref and the travel command Pref, and an actual movement and response time can be regulated.

Moreover, the motor torque Tm obtained by subtracting the estimated load induced torque T1' from the added value of the motor torque from the posture controller 51 and the motor torque from the motor controller 53 is supplied to the motor rotor 57 to rotate only by the rotational angle $\theta$r. Here, Jr is inertia of the motor rotor 57 and Dr is a viscosity resistance (damper coefficient) of the motor rotor 57.

On the other hand, although the added value of the reactive force of the motor torque Tm and the load induced torque T1 is applied to the motor stator/base 60 as described above, the inclined movement is prevented by mutually canceled out. Here, J is inertia of the motor stator/base 60 and D is a viscosity resistance (damper coefficient) of the motor stator/base 60.

FIG. 16, for example, shows in detail the mathematical model shown in FIG. 15. As shown in FIG. 16, a postural controller 70 performs the PID control on the difference between the base angle command θref and the present base angle $θ_0$ to generate the motor torque Tgyr for postural control, and the motor controller 71 performs the PID control on the difference between the rotational position command Pref of the motor 10 and the present rotational position θr to generate the motor torque for traveling control.

Further, a regulator 72 generates the estimated load induced torque T1' from the sensor signal of the pressure sensor 15. The respective torque is added in an adder 73, and the obtained motor torque Tm is supplied to the motor 10. The motor 10 is driven to rotate by the motor torque Tm, and the rotation is converted to 1/16 by a reducer 74 having a reduction ratio of 16:1 to be transmitted to the wheel 3.

Referring to FIGS. 12 through 16, the explanation is made in which only one wheel 3 is considered to be provided, to make the explanation simple; however, actually the coaxial two-wheeled vehicle 1 has the right and left wheels of 3R and 3L, and the motor controller 53 is independently provided for the right and the left, while the postural controller 51 shown, for example, in FIG. 14 is used in common by the right and left wheels of 3R and 3L.

A block diagram of a control mechanism in this case is shown in FIG. 17. A sensor value ωp from the gyroscopic sensor 13 is sent to an angle calculator 82 through a band-pass filter (BPF) 80 having a passing band of, for example, 0.1 through 50 Hz, and a sensor value αp from the acceleration sensor 14 is sent to the angle calculator 82 through a low-pass filter (LPF) 81 having a cut-off frequency of, for example, 0.1 Hz. In the angle calculator 82, the present base angle $θ_0$ is computed based on those sensor values.

Further, difference between the base angle command θref that is the postural command and the present base angle $θ_0$ is obtained in a subtractor 83, and the difference is supplied to a postural controller 84. The postural controller 84 computes the above described motor torque Tgyr using the base angle command θref and the present base angle $θ_0$.

On the other hand, difference between a rotational position command Prefr of a motor rotor 92R that is a travel command for the right wheel 3R and a present rotational position θr of the motor rotor 92R detected by a rotary encoder 93R is obtained in a subtractor 85R, and the difference is supplied to a position proportional controller 86R. The position proportional controller 86R performs a position proportional (P) control on the difference, and the result of the proportional control is supplied to a subtractor 87R.

Moreover, a differentiation unit 88R differentiates the rotational position θr of the motor rotor 92R supplied from the rotary encoder 93R, and the result is supplied to the subtractor 87R. Then, difference between the result of the proportional control from the position proportional controller 86R and the result of the differentiation from the differentiation unit 88R is obtained in the subtractor 87R, and the difference is supplied to a velocity proportional controller 89R. The velocity proportional controller 89R performs a velocity proportional (P) control on the difference, and the result is supplied to an adder 90R.

The result of the proportional control, the motor torque Tgyr, and the estimated load induced torque T1' obtained from the sensor signals $PS_1$, $PS_2$, $PS_3$ and $PS_4$ of the pressure sensors 15 in a regulator 94 are added in the adder 90R, and the added value is supplied to a current control amplifier 91R. The current control amplifier 91R generates motor current based on the added value to drive the motor rotor 92R. The rotational position of the motor rotor 92R is supplied to the differentiation unit 88R as well as to the subtractor 85R. Since the same explanation will be applied similarly to the left wheel 3L, an explanation thereof is omitted.

Thus, the above described coaxial two-wheeled vehicle 1 has a common control mechanism for postural stabilization control with respect to the right and left wheels 3R and 3L, and has control mechanisms for traveling control to the right and left wheels independently, and since each control is performed independently, both the postural stabilization control and the traveling control can be stably performed.

Hereinafter, velocity control in the above described coaxial two-wheeled vehicle 1 will be explained.

As described above, the barycentric coordinates (Xg, Yg) of the load on the base 4 and the load weight Wg are detected from the respective sensor signals $PS_1$, $PS_2$, $PS_3$ and $PS_4$ of the four pressure sensors $15_1$ through $15_4$ provided at four corners of the base 4 in the above coaxial two-wheeled vehicle 1 to obtain the load induced torque T1; and the barycentric coordinates (Xg, Yg) are further used as a command to control a travel direction and velocity. Specifically, when the load weight Wg is a predetermined value or more, a velocity command Vx is changed based on the X-coordinate Xg of the barycentric position.

FIG. 18 shows the above aspect. Here, the range from $X_3$ to $X_1$ in FIG. 18 is an area in which the coaxial two-wheeled vehicle 1 is halted, and travel velocity is commanded to be zero within the range. It is preferable that the range be within an X-coordinate range of ground-contacting surface of the wheel 3 with a road surface. In this case, for example, when the load weight Wg is large or when gas pressure of the wheel 3 is low, a ground-contacting area of the wheel 3 with the road surface becomes large and therefore, the range in which the vehicle is halted also becomes large. Providing such range in which the vehicle is halted (dead zone) prevents the vehicle body from moving forward and moving backward due to a slight movement of the barycenter which is not intended by a rider.

When the X-coordinate becomes $X_1$ or more, velocity is commanded to increase in accordance with the value of X-coordinate until reaching the maximum forward velocity SfMAX. Moreover, when the value of X-coordinate becomes X2 or more, the velocity is reduced to stop forcibly until the posture is stabilized again within the stop area. Thus, providing the area for forcibly reducing the velocity to stop can secure a safety of the rider when traveling at the maximum velocity.

Similarly, when the value of X-coordinate becomes $X_3$ or less, the velocity is commanded to increase in accordance with the value of X-coordinate until reaching the maximum backward velocity SbMAX. In addition, it is preferable that the maximum backward velocity SbMAX be less than the maximum forward velocity SfMAX. Moreover, when the value of X-coordinate becomes $X_4$ or less, the velocity is forcibly reduced to stop until the posture is stabilized again within the stop area.

When the X-coordinate is in the range from $X_1$ to $X_2$ or from $X_3$ to $X_4$, a rotational position command Prefr of the motor 10R and a rotational position command Prefl of the motor 10L are generated using, for example, the following formula (19) in accordance with the X-coordinate Xg. Hereupon, $G_0$ in the formula (19) is a positive constant gain and can be variable in accordance with the load weight Wg, for example.

[Numerical Expression 16]

$$Prefr=Prefl=Xg*G_0 \quad (19)$$

Further, when a velocity command is $V_{x0}$ at a time t=0 and the velocity command is $V_{x1}$ at a time $t=t_1$, it is preferable that acceleration be continuously changed for traveling so as not to generate a mechanical resonant vibration. In this case, when the time before reaching $V_{x1}$ is $\Delta t$, a travel velocity command Vref(t) at a time t ($0 \leq t \leq =t1$) can be computed by the following formula (20), for example.

[Numerical Expression 17]

$$Vref(t)=(1/4)t^4-(2/3)\Delta t*t^3+(1/2)\Delta t^2*t^2+V_{x0} \quad (20)$$

At this time, the rotational position command Pref(t) of the motor 10 becomes an integrated value of the travel velocity command Vref(t) in the formula (20) and is obtained with a quintic function as shown in the following formula (21). Here, $Pref_0$ in the formula (21) is the rotational position command at the time t=0.

[Numerical Expression 18]

$$Pref(t)=\int Vref(t)dt+Pref_0=(1/20)t^5-(2/12)\Delta t*t^4+(1/6)\Delta t^2*t^3+Pref_0 \quad (21)$$

Moreover, not only moving forward and moving backward but also a turn velocity command Vr can be changed as shown, for example, in FIG. 19 based on the Y-coordinate Yg of the barycentric position when the load weight Wg is a predetermined value or more. Here, the range from $-Y_1$ to $Y_1$ in FIG. 19 is a stop area, and a turn velocity is commanded to be zero within the range.

In addition, the stop area can arbitrarily be set in the vicinity of the origin O. Thus, providing the stop area (dead zone), the vehicle can be prevented from making a turn due to a slight shift of the barycenter which is not intended by a rider. When the Y-coordinate becomes $Y_1$ or more, the turn velocity is commanded to increase in accordance with the value of Y-coordinate until reaching a right-turn maximum velocity CWMAX. Similarly, when the value of Y-coordinate becomes $-Y_1$ or less, the turn velocity is commanded to increase in accordance with the value of Y-coordinate until reaching a left-turn maximum velocity CCWMAX.

When the value of Y-coordinate is $Y_1$ or more or $-Y_1$ or less, the rotational position command Rrefr of the motor 10R and the rotational position command Rrefl of the motor 10L are generated in accordance with the Y-coordinate Yg. When a travel velocity is zero, the rotational position command Rrefr of the motor 10R and the rotational position command Rrefl of the motor 10L become the opposite phase command as shown in the following formula (22), for example. Hereupon, $G_1$ is a positive constant gain in the formula (22) and can be made variable in accordance with the load weight Wg, for example.

[Numerical Expression 19]

$$Rrefr=-Rrefl=Y_g*G_1 \quad (22)$$

On the other hand, when the travel velocity is not zero, the rotational position command Rrefr of the motor 10R and the rotational position command Rrefl of the motor 10L become the same phase command as shown in the following formulas (23) and (24), for example. Here, $G_2$ is a positive constant gain in the formulas (23) and (24), and can be made variable in accordance with the load weight Wg, for example.

[Numerical Expression 20]

$$Rrefr=Prefr+Y_g*G_2 \quad (23)$$

$$Rrefl=Prefl-Y_g*G_2 \quad (24)$$

Hereupon, when traveling on a road surface which has an unevenness such as a road surface of an unleveled ground or on an inclined road surface, it becomes difficult to travel in the target direction given by the rotational position commands to the right and left motors 10R and 10L, and there is a possibility that a difference arise between the target direction and an actual travel direction. Moreover, when effective diameters of the wheels 3 become unequal due to a difference in gas pressure of the right and left wheels 3R and 3L, there is a possibility that the similar discrepancy arise between the target direction and the actual travel direction.

Then, in the above described coaxial two-wheeled vehicle 1, an actual travel direction is detected by the gyroscopic sensor 13 which detects the angular velocity ωyaw around the yaw axis and each rotational velocity of the right and left motors 10R and 10L is independently controlled, so that discrepancy between the target direction and the actual travel direction can be corrected.

An example is explained, in which as shown in FIG. 20A the effective diameter of the left wheel 3L is shorter than that of the right wheel 3R and as shown in FIG. 20B $\omega yaw_1$ [rad/sec] is detected as a gyroscopic sensor signal around the yaw axis when moving forward. In such case, when rotational velocity commands Vrefr and Vrefl are added to get the average $Vref_0$, the vehicle can move forward by correcting the rotational velocity commands Vrefr and Vrefl respectively supplied to the right and left motors 10R and 10L as shown in the following formulas (25) and (26). Hereupon, $K_0$ is a positive constant in the formulas (25) and (26).

[Numerical Expression 21]

$$Vrefr=Vref_0-K_0*\omega_{yaw1} \quad (25)$$

$$Vrefl=Vref_0+K_0*\omega_{yaw1} \quad (26)$$

Further, when, as shown in FIG. 20C, Dref [rad/sec] is supplied as the target direction, the rotational velocity commands Vrefr and Vrefl are respectively supplied to the right and left wheels as shown in the following formulas (27) and (28).

[Numerical Expression 22]

$$Vrefr=Vref_0-K_0(Dref-\omega_{yaw1}) \quad (27)$$

$$Vrefl=Vref_0+K_0(Dref-\omega_{yaw1}) \quad (28)$$

The rotational velocity commands Vrefr and Vrefl obtained in this manner are respectively converted into the rotational position commands Prefr and Prefl of the respective wheels by the following formulas (29) and (30). Here, in the formulas (29) and (30), k is an integer showing the number of sampling and Pref(k) indicates a rotational position command in k-th sampling.

[Numerical Expression 23]

$$Rrefr(k)=Prefr(k)+Vref_0 \quad (29)$$

$$Rrefl(k)=Prefl(k)+Vref_0 \quad (30)$$

Similarly, there is a possibility that a discrepancy arise in turn velocity due to a difference in gas pressure between the right and left wheels 3R and 3L, a difference in a road surface condition or the like, when making a turn. In this case also, an actual turn velocity is detected by the gyroscopic sensor 13 which detects the angular velocity ωyaw around the yaw axis to control independently each rotational velocity of the right and left motors 10r and 10L, so that a discrepancy between the targeted turn velocity and an actual turn velocity can be corrected.

An example is explained in which the effective diameter of the left wheel 3L is smaller than that of the right wheel 3R and $\omega_{yaw2}$ [rad/sec] is detected as the gyroscopic sensor signal around the yaw axis, when making a turn. When differentiated signals of the rotational position command Rrefr of the right wheel 3R and the rotational position command Rrefl of the left wheel 3L are Vrefr and Vrefl, respectively, a difference ωerr of the turn velocity is expressed in the following formula (31).

[Numerical Expression 24]

$$\omega_{err} = (Vrefl - Vrefr) - \omega_{yaw2} \tag{31}$$

In this case, the vehicle can make a turn as intended by correcting the rotational position commands Vrefr and Vrefl supplied to the right and left motors 10R and 10L as shown in the following formulas (32) and (33). Here, $G_3$ is a positive constant gain in the formulas (32) and (33) and can be made variable in accordance with the load weight Wg, for example.

[Numerical Expression 25]

$$Rrefr = Prefr + Y_g * G_2 - \omega_{err} * G_3 \tag{32}$$

$$Rrefl = Prefl - Y_g * G_2 - \omega_{err} * G_3 \tag{33}$$

Thus, in the above described coaxial two-wheeled vehicle 1, an actual travel direction and turn velocity are detected by the gyroscopic sensor 13 which detects the angular velocity ωyaw around the yaw axis to control independently each rotational velocity of the right and left motors 10R and 10L, so that the discrepancy between the target direction (turn velocity) and the travel direction (turn velocity) can be corrected.

Further, a software configuration of such coaxial two-wheeled vehicle 1 is explained using FIG. 21, in which a layered structure includes a hardware layer 150 as the lowest layer, a kernel layer 151, an on-body layer 152, a network layer 153 and an application layer 154 as the highest layer in order.

The hardware layer 150 is a circuit layer, and includes a motor control circuit, a central control circuit, a control circuit of a sensor circuit and the like, for example. The kernel layer 151 is a layer which performs various operations such as a motor servo operation, a postural control operation, a travel control operation or a real-time travel target value operation. In the hardware layer 150 and the kernel layer 151, basic postural stabilization control and travel control are performed. The on-body layer 152 is a layer which performs a travel target value operation, the generation of an obstacle evading trajectory and the like.

Each of those layers performs sampling in a different control cycle respectively, and the higher the layer is, the longer the cycle becomes. For example, the hardware layer 150 that is the lowest layer has the control cycle of 0.1 msec, which is a short cycle; on the other hand, the kernel layer 151 has that of 1 msec and the on-body layer 152 has that of 10 msec.

Subsequently, the whole configuration of circuits in the coaxial two-wheeled vehicle 1 is explained. As shown in FIG. 22, the sensor signals $PS_1$, $PS_2$, $PS_3$ and $PS_4$ are supplied from the pressure sensors 151 through 154 to a sensor circuit 200. The sensor circuit 200 supplies to the control unit 16, together with those sensor signals, the sensor signals ωp and ωyaw from the gyroscopic sensor 13 which detects the angular velocity around the pitch axis and the yaw axis and the sensor signals Ax, Ay, Az, αp, αr and αyaw from the acceleration sensor 14 which detects both the linear acceleration in the directions of the X, Y and Z axes and the angular acceleration around the pitch axis, roll axis and yaw axis.

The control unit 16 generates the motor torque Tgyr and the rotational position command Pref of the motor rotor which is the travel command based on those sensor signals as described above, and those are supplied to right and left motor drivers 203R and 203L. The motor drivers 203R and 203L calculate the optimal motor current to drive the motors 10R and 10L that is, for example, 200 W based on the motor torque Tgyr, the rotational position command Pref of the motor rotor and the like and supply the current to the motors 10R and 10L. The rotational positions of those motors 10R and 10L are obtained by the rotary encoders 11R and 11L, and are fed back to the motor drivers 203R and 203L.

A servo-on/power switch 204 is connected to the control unit 16 and a power supply switch 205, and a signal from the power supply switch 205 is supplied to a power supply management circuit 206. This power supply management circuit 206 is connected to a battery 207, and supplies motor power to the motor drivers 203R and 203L, as well as supplying control power of 24V to the control unit 16, an audio processing circuit 201 and a video processing circuit 202. Regenerative electric power of the motors 10R and 10L is supplied to the power supply management circuit 206 through the motor drivers 203R and 204L, and the power supply management circuit 206 charges the battery 207 using this regenerative electric power.

Using FIGS. 23A and 23B, a detailed configuration of the whole configuration shown in FIG. 22 is explained. As shown in FIGS. 23A and 23B, the sensor signals $PS_1$, $PS_2$, $PS_3$ and $PS_4$ from the pressure sensors $15_1$ through $15_4$, the sensor signals ωp and ωyaw from the gyroscopic sensors $13_1$ and $13_2$ and also the sensor signals Ax, Ay, Az, αp, αr and αyaw from the acceleration sensor 14 are supplied to the sensor circuit 200. The sensor circuit 200 performs a gain adjustment to the sensor signals $PS_1$, $PS_2$, $PS_3$ and $PS_4$ from the pressure sensors 15 using for example a pressure gain of 10 mV/N, and after converting the results into digital signals through an analog-digital converter not shown in the figure, the digital signals are supplied to a barycentric operation unit 210 in the control unit 16.

Further, the sensor circuit 200 performs the gain adjustment to the sensor signals ωp and ωyaw from the gyroscopic sensors $13_1$ and $13_2$ using for example a postural gain of 1.6 V/(rad/sec), and also performs the gain adjustment to the sensor signals Ax, Ay, Az, αp, αr and αyaw from the acceleration sensor 14 using for example the postural gain of 1.6 V/(rad/sec$^2$); and after converting the results into the digital signals through the analog-digital converter not shown in the figure, the digital signals are supplied to a signal preprocessing unit 211. The signal preprocessing unit 211 performs preprocessing of digital filtering with respect to inputted signals, of an offset adjustment, of a computation of a postural position that is a base angle θ0 and the like.

The barycentric operation unit 210 computes the barycentric coordinates (Xg, Yg) of the load on the base 4 and the load weight Wg thereof as described above based on the sensor signals $PS_1$, $PS_2$, $PS_3$ and $PS_4$ from the pressure sensors $15_1$ through $15_4$; supplies information on those barycentric coordinates (Xg, Yg) and load weight Wg to a travel command computing unit 212; and supplies information on the Y-coordinate Yg of the barycentric position and on the load weight Wg to a turn command generator 215.

The travel command computing unit 212 generates the velocity command Vx based on the barycentric position X coordinate-travel velocity characteristic as shown in FIG. 18 for example, and a rotational velocity command generator 213 performs the above mentioned quintic function operation based on the velocity command Vx to generate the rotational velocity command Vref(t). The rotational velocity command generator 213 supplies the rotational position command Pref(t) to a rotational position command generator 214, the turn command generator 215 and a postural command generator 216.

The turn command generator 215 generates, when making a turn, a phase command of for example Yg*G1 based on the Y-coordinate Yg of the barycentric position and the load weight Wg which are supplied from the barycentric operation unit 210, the rotational angular velocity ωyaw around the yaw axis which is supplied from the signal preprocessing unit 211 and the rotational velocity command Vref(t) which is supplied from the rotational velocity command generator 213, and supplies the phase command to the rotational position command generator 214.

The rotational position command generator 214 generates the rotational position command Pref(t) by integrating the rotational velocity command Vref(t) supplied from the rotational velocity command generator 213, and supplies the rotational position commands Prefr(t) and Prefl(t) to the right and left motor drivers. On this occasion, the rotational position command generator 214 generates the rotational position commands Prefr(t) and Prefl(t) in consideration of the phase command supplied from the turn command generator 215.

Based on the rotational velocity command Vref(t) supplied from the rotational velocity command generator 213, the postural command generator 216 computes the base angle command θref which is the postural command as explained using FIG. 13, and supplies the base angle command θref to a subtractor 217. In the subtractor 217, the current base angle θ0 obtained in the signal preprocessing unit 211 is subtracted from the base angle command θref, and the difference is supplied to a postural controller 218. The postural controller 218 performs the PID control based on the difference to obtain the motor torque Tgyr.

In addition, when the PID control is performed, the PI gain can be changed according to the load weight Wg on the base 4. Specifically, when the load weight Wg becomes large, it is desirable to make the proportional gain larger and to make the integration gain smaller. The postural controller 218 supplies the motor torque Tgyr to the right and left motor drivers 203R and 203L.

In the motor driver 203R for the right wheel 3R, a difference between the rotational position command Prefr which is the travel command for the motor 10R and the current rotational position θr of the motor 10R which is detected by the rotary encoder 11R is taken in a subtractor 230R, the difference thereof is supplied to a position proportional controller 231R. The position proportional controller 231R performs the position proportional (P) control on the above difference, and the result of the proportional control is supplied to a subtractor 232R. Further, a differentiating unit 233R differentiates the rotational position θr of the motor 10R which is supplied from the rotary encoder 11R, and the result of the differentiation is supplied to the subtractor 232R.

Then, a difference between the result of the proportional control from the position proportional controller 231R and the result of the differentiation from the differentiating unit 233R is taken in the subtractor 232R, and the difference is supplied to a velocity proportion and integration controller 234R. The velocity proportion and integration controller 234R performs the velocity proportional and integration (PI) control to the difference, and supplies the result of the proportional-integration control to an adder 235R. In the adder 235R, the result of the proportional-integration control and the motor torque Tgyr are added, and the added value is supplied to a current control amplifier 236R.

The current control amplifier 236R generates motor current based on the added value to drive, for example, the motor 10R of 200 W. The rotational position of the motor 10R is supplied to the subtractor 230R and to the differentiating unit 233R. Since the same is also said with respect to the left wheel 3L, an explanation thereof is omitted.

The power supply management circuit 206 is connected to the battery 207 of 24V, for example, and supplies the control power of 24V and 1 A to the control unit 16 and also supplies the motor power of 24V and 30 A respectively to the motor drivers 203R and 203L. Regenerative electric power of the motors 10R and 10L is supplied to the power supply management circuit 206 through the motor drivers 203R and 203L, and the power supply management circuit 206 charges the battery 207 using the regenerative electric power.

As described above, the coaxial two-wheeled vehicle 1 previously proposed by the inventor of the present application includes: the postural control unit for the right and left wheels 3R and 3L in common, which generates the motor torque Tgyr to perform the angle control of the base 4 using the gyroscopic sensor 13 and the acceleration sensor 14 and also generates the motor torque T1' to cancel out the load induced torque using the pressure sensor 15; and the motor control units independently to the right and the left, which generate the motor torque to perform the travel control using the pressure sensor 15, and since they each perform the control independently, the postural stabilization control and the travel control can be performed stably and compatibly.

Further, in the coaxial two-wheeled vehicle 1 previously proposed by the inventor of the present application, the travel control is performed in accordance with the barycentric coordinates of the load on the base 4, in which the stop zone (dead zone) is provided in the range of the X-coordinate and in the range of the Y-coordinate of the ground-contacting surface where the wheel 3 contacts with the road surface, so that the vehicle body can be prevented from moving forward, moving backward and making a turn by a slight movement of the barycenter which is not intended by the rider.

Furthermore, in the coaxial two-wheeled vehicle 1 previously proposed by the inventor of the present application, the actual travel direction and turn velocity are detected using the gyroscopic sensor 13 which detects the angular velocity ωyaw around the yaw axis, each rotational velocity of the right and left motors 10R and 10L are independently controlled, so that the difference between the target direction (turn velocity) and the travel direction (turn velocity) can be adjusted.

The applicant of the present invention has previously proposed the above described traveling apparatus according to such coaxial two-wheeled vehicle.

However, in a traveling apparatus such as the one mentioned above, there is a possibility that the rider falls down by the centrifugal force when a turn is suddenly made. In other words, in the above described apparatus of patent reference 1, cornering and the turn to the right or to the left are made by a turning switch installed in an operating arm of the apparatus. In this case, a rider (operator) is always required to operate manually in order to make the turn. Due to the above, there is a problem that the rider falls down by the centrifugal force when the abrupt turn is made.

Moreover, the above described coaxial two-wheeled vehicle 1 previously proposed by the inventor of the present application is an apparatus in which a direction is flexibly changed only by the barycentric balance of the rider. In this case, since the turn is also made by the weight shift, there arises a necessity to control the turn velocity such that the turn is safely made in a posture which can maintain a balance against the centrifugal force generated at the time of making the turn.

The present application is made in view of the above, and aims to solve such problem in a conventional apparatus as the possibility that the rider may fall down by the centrifugal force when an abrupt turn is made.

Furthermore, for example, a two-wheeled traveling vehicle described in the followings, on which a man rides has been proposed by the applicant of the present application (Japanese Patent Application No. 2003-168224).

First, FIG. 24 is a perspective view showing an external appearance of an example of a coaxial two-wheeled vehicle which has been proposed by the applicant of the present invention. A pair of wheels 3 (a right wheel 3R and a left wheel 3L) is fixed to both ends of an axle 2 in the coaxial two-wheeled vehicle 1 shown in FIGS. 23A and 23B. The wheel 3 is formed of a rubber material having flexibility, and the inside thereof is filled with air, nitrogen gas or the like. With adjusting pressure of the gas to adjust the flexibility of the wheel 3, vibration of a body of the vehicle can be absorbed and vibration caused by an unevenness of a road surface or a shock caused by a level difference can be reduced.

Further, a base 4 is supported by the axle 2 under a board where for example a man stands, to be capable of making an inclined movement around the axle 2, and a chassis having an approximately rectangular parallelepiped shape in which a control unit described later on and the like are stored is joined to the base 4. Note that, in the following explanation, a midpoint of the axle 2 connecting both wheels is assumed to be the origin 0 of an X-Y-Z coordinate system; and it is defined that the direction which passes through the origin 0 and is parallel to a principal plane of the base 4 and also is orthogonal to the axle 2 is an X axis or a roll axis, the direction of the axle passing through the origin 0 is a Y axis or a pitch axis and the direction passing though the origin 0 which is orthogonal to the principal plane of the base 4 is a Z axis or a yaw axis. Further, it is defined that a forward direction of the coaxial two-wheeled vehicle 1 is a positive direction of the X axis, a left direction thereof is a positive direction of the Y axis and an upper direction thereof is a positive direction of the Z axis, respectively.

As shown in FIG. 25, motors 10 (10R and 10L) capable of rotating in forward and reverse directions are mounted on the base 4, and rotary encoders 11 (11R and 11L) for detecting a rotational position of the motors 10 are provided adjacently to the motors 10. In addition, reducers 12 (12R and 12L) including a gear or a timing belt are provided between the motors 10 and the wheels 3 so that a rotation of the motors 10 can be transmitted to the wheels 3 through the reducers 12 and a joint (not shown).

Furthermore, in the base 4 are incorporated various other sensors than a gyroscopic sensor 13 for detecting angular velocities $\omega p$ and $\omega yaw$ around the pitch axis and the yaw axis of the base 4, such as an acceleration sensor 14 for detecting linear accelerations Ax, Ay and Az in the directions of X, Y and Z axes and for detecting angular accelerations $\alpha p$, $\alpha r$ and $\alpha yaw$ around the pitch axis, the roll axis and the yaw axis, a pressure sensor 15 for detecting a load weight on the base 4 and the like.

Among the above sensors, the pressure sensors 15 are provided at four corners between a support table 4a and a movable table 4b constituting the board of the base 4 as shown in a plan view of FIG. 26A and a side view of FIG. 26B, so that the barycentric coordinates (Xg, Yg) of a load on the base 4 and also a load weight Wg thereof can be detected from sensor signals of those four pressure sensors $15_1$, $15_2$, $15_3$ and $15_4$.

Specifically, when the sensor signals of the pressure sensors $15_1$ through $15_4$ are $PS_1$, $PS_2$, $PS_3$ and $PS_4$, respectively, and also when its own weight of the base 4 applied to the pressure sensors $15_1$ through $15_4$ is $W_0$ in a state with no load, the load weight Wg can be obtained as shown in the following formula (34).

[Numerical Expression 26]

$$W_g = PS_1 + PS_2 + PS_3 + PS_4 - W_0 \tag{34}$$

Also, when the respective coordinates of the pressure sensors $15_1$, $15_2$, $15_3$ and $15_4$ are $(X_{ps}, Y_{ps})$ $(-X_{ps}, Y_{ps})$ $(-X_{ps}, -Y_{ps})$ and $(X_{ps}, -Y_{ps})$, the barycentric coordinate (Xg, Yg) can be obtained as shown in the following formula (35).

[Numerical Expression 27]

$$\begin{cases} X_g = X_{ps} * (W1 - W2)/(W1 + W2) \\ Y_g = Y_{ps} * (W3 - W4)/(W3 + W4) \end{cases} \tag{35}$$

wherein $$\begin{cases} W1 = (PS_1 + PS_4)/2 - W_{14} \\ W2 = (PS_2 + PS_3)/2 - W_{23} \\ W3 = (PS_1 + PS_2)/2 - W_{12} \\ W4 = (PS_3 + PS_4)/2 - W_{34} \end{cases}$$

In the formula (35), $W_{14}$ denotes its own weight in a state with no load applied to the pressure sensors $15_1$ and $15_4$, $W_{23}$ denotes its own weight applied to the pressure sensors $15_2$ and $15_3$ in the state with no load, $W_{12}$ denotes its own weight applied to the pressure sensors $15_1$ and $15_2$ in the state with no load, and $W_{34}$ denotes its own weight applied to the pressure sensors $15_3$ and $15_4$ in the state with no load.

Accordingly, since a load induced torque T1 caused by the load on the base 4 can be thus calculated using the pressure sensors 15, it becomes possible to maintain a balance on the base 4 to stabilize a posture when the moment of reaction is given to the motor 10.

Furthermore, a control unit 16 including a microcomputer is mounted on the lower chassis of the base 4, to which various sensor signals and detection signals are input. The control unit 16 performs control based on those input signals so as to generate a motor torque that makes a vehicle body move forward, move backward and turn while maintaining a pitch axis angle and a yaw axis angle of the base 4 at an appropriate value as described later on.

Further as shown in FIG. 27, the coaxial two-wheeled vehicle 1 has a structure in which a weight center M of the base 4 that is capable of making an inclined movement around the axle 2 can be positioned lower than the axle 2. Therefore, the barycentric position of the vehicle body is maintained at the most stable position even when not moving, and the coaxial two-wheeled vehicle 1 may not topple over easily. Note that, although in FIG. 27 a height of the upper surface of the base 4 is higher than the axle 2, the upper surface of the base 4 may be lower than the axle 2.

Hereupon, an explanation is made with respect to a concept for control to maintain a posture on the base 4. As shown in FIG. 28, when a motor torque Tm is controlled to generate the same moment as the load induced torque $T_1$ caused by a load on the base 4 which is, for example, a man's weight, the base 4 is balanced like a seesaw with a center as a fulcrum thereof. A point corresponding to the fulcrum for maintaining the balance, that is, a point where the rotational moment around the axle 2 becomes zero is called a ZMP (Zero Moment Point). When the ZMP coincides with a ground-contacting point of the wheel 3 with a road surface, or when the ZMP is within a ground-contacting surface with the road surface, the balance is kept to maintain the posture on the base 4.

In the case where a man having a weight Wh rides on the coaxial two-wheeled vehicle 1, the weight center M of the base 4 inclines about the axle 2a as a center thereof in accordance with the man's inclined angle θ as shown in FIG. 29. At this time, an axle torque $T_0$ to keep the balance of the axle 2 is expressed with the following formula (36), and the motor torque Tm for maintaining the posture is shown by $T_0/N$, where a reduction ratio of the reducer 12 is N:1.

[Numerical Expression 28]

$$T_0 = Wh * \sin\theta - Wm * \sin\theta \tag{36}$$

Thus, since the above described coaxial two-wheeled vehicle 1 has a structure in which the weight center M of the base 4 is positioned lower than the axle 2 as described above, only adding a difference between the moment by the man's weight Wh and the moment by the weight Wm of the base 4 as the axle torque $T_0$ is needed as shown in the formula (36) so that the balance is maintained with a comparatively small motor torque.

Further, a dynamic model for maintaining a posture on the base 4 is explained in detail using an X-Z coordinate system shown in FIG. 30. Hereupon, to make the explanation simple, it is considered in FIG. 30 that one wheel 3 is provided. Further, the wheel 3, the base 4 and a man on the base 4 are respectively regarded as a link, and barycentric position coordinates thereof are $(x_0, z_0)$, $(x_1, z_1)$ and $(x_2, z_2)$, respectively. Furthermore, the mass of each link is $m_0$, $m_1$ and $m_2$, respectively, and inertial moments thereof are $I_0$, $I_1$ and $I_2$, respectively.

Each kinetic momentum of the i-th link (i=0, 1, 2) around the defined point Ω (σ, φ) is expressed with the following formula (37), where the barycentric coordinates are $(x_i, z_i)$. Here, one dot put on x and z in the formula (37) denotes a first-stage differentiation of x and z.

[Numerical Expression 29]

$$Ii*\dot{\omega}i + mi*\dot{X}i(\varphi - zi) - mi*\dot{Z}i(\sigma - xi) \tag{37}$$

Therefore, the moment of all links by the inertial force is expressed with the following formula (38). Hereupon, two dots put on x and z in the formula (38) denote a second-stage differentiation of x and z. Further, the moment of all links by the gravity is expressed with the following formula (39), where gravity acceleration is g.

[Numerical Expression 30]

$$\sum_{i=0}^{n}(Ii*\dot{\omega}i + mi*\ddot{x}i(\varphi - zi) - mi*\ddot{z}i(\sigma - xi)) \tag{38}$$

$$\sum_{i=0}^{n} mi(\sigma - xi)g \tag{39}$$

As shown in a formula (40), the moment MΩ around the point Ω (σ, φ) is given by the sum of the moment by the inertial force and the moment by the gravity.

[Numerical Expression 31]

$$M\Omega = \tag{40}$$

$$\sum_{i=0}^{n} Ii*\dot{\omega}i + \sum_{i=0}^{n} mi(\ddot{x}i(\varphi - zi) - mi*\ddot{z}i(\sigma - xi)) + \sum_{i=0}^{n} mi(\sigma - xi)g$$

With excluding the moment by the gravity for the wheel 3 having the mass $m_0$, the above described moment MΩ becomes the moment Ma around the axle 2 by taking the point Ω (σ, φ) as the origin. This moment Ma around the axle 2 is expressed with the following formula (41).

[Numerical Expression 32]

$$Ma = \sum_{i=0}^{n} Ii*\dot{\omega}i + \sum_{i=0}^{n} mi(\ddot{z}i*xi - \ddot{x}i*zi) - \sum_{i=0}^{n} mi*xi*g \tag{41}$$

To express the above described moment MΩ using the moment Ma, the moment is given by the following formula (42) when $X_0=0$, that is, when the barycentric position of the wheel 3 is on the axle 2.

[Numerical Expression 33]

$$M\Omega = Ma - \sum_{i=0}^{n} mi(\ddot{z}i - g)\sigma + \sum_{i=0}^{n} mi*\ddot{x}i*\varphi \tag{42}$$

Here, the ZMP is defined as a point on a floor surface where the moment MΩ is zero. Then, if a height of the axle 2 is h and the coordinates of the ZMP are (σzmp, −h) to be substituted for the formula (40), the formula becomes the following formula (43). The ZMP can be expressed with a link position, acceleration and the mass by solving the formula (43) with respect to σzmp.

[Numerical Expression 34]

$$O = \sum_{i=0}^{n} Ii*\dot{\omega}i + \tag{43}$$

$$\sum_{i=0}^{n} mi(-\ddot{x}i(h + zi) - \ddot{z}i(\sigma zmp - xi)) + \sum_{i=0}^{n} mi(\sigma zmp - xi)g$$

Moreover, if the coordinates (σzmp, −h) of the ZMP are substituted for the above described formula (42), the following formula (44) is obtained. The formula (44) expresses a balanced moment around the axle 2.

[Numerical Expression 35]

$$0 = Ma - \sum_{i=0}^{n} mi(\ddot{z}i - g)\sigma zmp - \sum_{i=0}^{n} mi*\ddot{x}i*h \quad (44)$$

Hereupon, a force which acts on the ZMP is illustrated in FIG. 31. In FIG. 31, FN denotes a floor reactive force, FT denotes a rotational friction force and F denotes a composite vector of the FN and the FT. In addition, though in actuality distributed over the whole ground-contacting surface of the wheel 3, the floor reactive force FN is expressed in FIG. 31 as the one concentrated on the ZMP. Based on this diagram, a formula expressing the balanced moment around the axle 2 is obtained as the following formula (45).

[Numerical Expression 36]

$$FN*\sigma zmp + FT*h + \tau 0 = 0 \quad (45)$$

Here, the formula (45) becomes the same as the above described formula (44), when the following formulas (46) through (48) are substituted.

[Numerical Expression 37]

$$T_0 = Ma \quad (46)$$

$$FN = -\sum_{i=0}^{n} mi(\ddot{z}i - g) \quad (47)$$

$$FT = -\sum_{i=0}^{n} mi*\ddot{x}i \quad (48)$$

In order to stabilize the posture on the base 4, it is only required that the σzmp becomes 0 in the formula (45). In other words, the posture can be maintained if the axle torque $T_0 = -FT*h$ is obtained. Therefore, with controlling state variables shown in the following formula (49) that satisfies $T_0 = FT = 0$, the posture can be stabilized.

[Numerical Expression 38]

$$(xi, \dot{x}i, \ddot{x}i) = (0,0,0) \quad (49)$$

Hereupon, $x_0$ and $x_1$ can be determined uniquely in accordance with a mechanical structure; however, $m_2$, $I_2$, $x_2$ and $z_2$ are variable, because those values belong to a man. The moment Mt on the base 4 with those $m_2$, $I_2$, $x_2$ and $z_2$ is given by the following formula (50). Here, the base 4 is assumed to be kept horizontal as shown in FIG. 32.

[Numerical Expression 39]

$$Mt = I2*\dot{\omega}2 + m2*\ddot{z}2*x2 - m2*\ddot{x}2*(z2-L) - m2*x2*g \quad (50)$$

Hereupon, since the angular velocity ω2 is small enough when the load is a man, ω2≈0 is approximated, and the moment Mt becomes zero when $x_2$ and a second-stage differentiation value thereof are made to be zero in a formula (50). Making $x_2$ and the second-stage differentiation value thereof become zero can be considered equivalent to controlling $x_0$ and $x_1$ so that the load induced torque $T_1$ on the base 4 become zero. Further, the moment Mt by the load induced torque T1 is equivalent to a force F2 acting to a point of action (xf, L) on the base 4. Therefore, if $x_0$ and $x_1$ to make the xf zero is given, $T_1$ becomes zero and the condition to keep the posture stable can be satisfied.

When a signal of the gyroscopic sensor on the base 4 is controlled through feed-back to maintain $x_0 = x_1$ by giving the motor torque Tm as shown in FIG. 32, the posture can be kept stable by controlling the motor torque Tm to become $xf = x_0$.

Specifically, when an error Ef is $Ef = x_f - x_0$, in case of Ef>0 the motor torque Tm is negative to displace the $x_0$ in the positive direction to make the vehicle move forward and in case of Ef<0 the motor torque Tm is positive to displace the $x_0$ in the negative direction to make the vehicle move backward, so that the error Ef can be reduced to zero. In other words, when $A_0$ is a positive constant and the motor torque $Tm = -A_0*Ef$ is given to reduce the Ef to zero, the posture can be kept stable.

In practice, as shown in FIG. 33, in the case where the base 4 inclines by an angle of $\theta_0$ around the pitch axis, since the load induced torque T1 (=Mτ×L) is actually generated by a man having a weight M, with controlling the motor torque Tm to give the axle torque $T_0$ in the opposite direction to the load induced torque T1 the ZMP can be made to coincide with the ground-contacting point of the wheel 3 to keep the posture stable.

Hereupon, when a man rides on the base 4, a force applied to soles is fluctuated usually in a cycle of 1 to 2 seconds in order to maintain the posture though there is an individual difference, and therefore, the load induced torque T1 by the man's weight changes accordingly. Hence, it is necessary to add to the motor 10 such torque that can maintain a balance in real time so as to keep an angle of the base 4 constant with respect to a load fluctuation.

Then, in order to balance out such load fluctuation in real time, the above described coaxial two-wheeled vehicle 1 has a control mechanism shown in FIG. 34 inside the control unit 16. In FIG. 34, difference between a present base angel $\theta_0$ detected by the gyroscopic sensor 13 and by the acceleration sensor 14, and a base angle command θref that is a postural command is obtained in a subtractor 20, and the difference is supplied to a postural controller 21. The postural controller 21 computes a motor torque current value Tgyr [A] from the base angle command θref and from the present base angle $\theta_0$.

Further, in a regulator 22, the load induced torque T1 is estimated using sensor signals $PS_1$, $PS_2$, $PS_3$ and $PS_4$ from the pressure sensors 15, and to balance out the load induced torque T1, an estimated load induced torque current value $T_1'/Km$ [A] is computed. Here, Km is a motor constant [N m/A]. When the barycentric coordinates of the load are (Xg, Yg) and the load weight is Wg, the estimated load induced torque T1' is expressed as the following formula (51).

[Numerical Expression 40]

$$T1' = Wg*Xg/2 \quad (51)$$

Then, a difference between the motor torque current value Tgyr and the estimated load induced torque current value T1'/Km is obtained in a subtractor 23, and the difference is supplied to a motor 24 as motor current I[A]. The motor 24 generates a motor torque Tm from the rotation using the motor current I, and the motor torque Tm and the load induced torque T1 are added in an adder 25 to be transmitted to a base 26.

Thus, the base angle can be kept constant against the load fluctuation when being stopped by adding to the motor 24 the motor torque Tm to balance out the load induced torque T1.

With the control mechanism described above, a postural stabilization control can be performed; however, in order to travel in this state, a control mechanism for traveling is further required. Therefore, the above described coaxial two-wheeled vehicle 1 actually has a control mechanism of two-wheeled structure in which a motor torque for postural stabilization control and a motor torque for traveling control are obtained independently.

A physical model for such a control mechanism of two-wheeled structure is shown in FIG. 35. Note that, to make the explanation simple, it is considered in FIG. 35 that only one wheel 3 is provided. As shown in FIG. 35, various sensors such as the gyroscopic sensor 13, the acceleration sensor 14, the pressure sensor 15 and the like are incorporated in the base 4, under which a motor stator 30, a rotary encoder 31 and a motor rotor 32 are provided, and the rotation of the motor rotor 32 is transmitted to the wheel 3 through a reducer 33 and a joint 34.

A postural controller/regulator 40 computes the above described motor torque Tgyr and estimated load induced torque T1' using the base angle command θref that is a postural command, the present base angle $\theta_0$ detected by the gyroscopic sensor 13 and the acceleration sensor 14, and also the sensor signals $PS_1$, $PS_2$, $PS_3$ and $PS_4$ of the pressure sensors 15. Further, a motor controller 41 computes a motor torque for traveling, using the rotational position command Pref of the motor rotor 32 which is a travel command and the present rotational position θr of the motor rotor 32 detected by the rotary encoder 31.

Then, the motor torque Tgyr, the estimated load induced torque T1' and also the motor torque for traveling are added in an adder 42, and the added value is supplied to the motor rotor 32.

Here, the above described base angle command θref is a target value of the base angle which is set in accordance with an acceleration Ax in the X-axis direction so that a rider can ride on stably. Specifically, the target value θref is set so that the base 4 becomes horizontal when the X-axis acceleration Ax is zero; the base 4 is inclined forward when the X-axis acceleration Ax is positive; and the base 4 is inclined backward when the X-axis acceleration Ax is negative, respectively.

Then, with for example the positive X-axis acceleration Ax, when the base 4 is inclined such that the ZMP can be positioned in the direction of a composite vector of an inertial force and a gravitational force as shown in FIG. 13, the rider can keep his/her posture stable. In addition, the base angle command θref changes in proportion to the X-axis acceleration Ax.

A block diagram of the control mechanism is shown in FIG. 37. A difference between the base angle command θref that is a postural command and the present base angle $\theta_0$ detected by the gyroscopic sensor 13 (and the acceleration sensor 14) is obtained in a subtractor 50, and the difference is supplied to a postural controller 51. The postural controller 51 computes the motor torque Tgyr using the base angle command θref and the present base angle $\theta_0$, and supplies the motor torque Tgyr to an adder 54.

On the other hand, a difference between the rotational position command Pref of the motor rotor 57 which is a travel command and a present rotational position $\theta_r$ of a motor rotor 57 detected by a rotary encoder 58 is obtained in a subtractor 52, and the difference is supplied to a motor controller 53. The motor controller 53 computes the motor torque for traveling using the rotational position command Pref and the present rotational position θr, and supplies the motor torque to the adder 54.

Moreover, when the load induced torque T1 is applied to the base 4, the sensor signals $PS_1$, $PS_2$, $PS_3$ and $PS_4$ of the pressure sensors 15 are supplied to a regulator 55, and the regulator 55 computes the above described estimated load induced torque T1' based on those sensor signals.

The motor torque Tgyr from the postural controller 51 and the motor torque from the motor controller 53 are added in the adder 54, and the estimated load induced torque T1' is subtracted from the added value in a subtractor 56. The result finally becomes the motor torque Tm and is supplied to the motor rotor 57. A reactive force of the motor torque Tm and the load induced torque T1 are added in an adder 59, and the added value is supplied to a motor stator/base 60.

A rotational control is performed on the motor rotor 57 in accordance with the motor torque Tm. The rotational position θr of the motor rotor 57 is converted into 1/N by a reducer 61 having a reduction ratio of N:1 to be transmitted to the wheel 3. Specifically, a rotational position θw of the wheel 3 is 1/N of the rotational position θr of the motor rotor 57. The rotary encoder 58 detects the rotational position θr of the motor rotor 57, and the detected signal is supplied to the subtractor 52.

On the other hand, although the added value of the reactive force of the motor torque Tm and the load induced torque T1 is applied to the motor stator/base 60 as described above, an inclined movement of the motor stator/base 60 can be prevented, because both the values are mutually canceled out.

FIG. 38 shows the processing of the block diagram shown in FIG. 37 as a mathematical model using a Laplace operator. As described above, the difference between the base angle command θref and the present base angle $\theta_0$ is supplied to the postural controller 51, and the difference between the rotational position command Pref of the motor rotor 57 and the present rotational position θr is supplied to the motor controller 53. In the postural controller 51 and motor controller 53, each motor torque is computed by a feed-back control which performs, for example, a PID (proportional, integral and differential) operation.

Specifically, $Kp_0$ and $Kp_1$ become proportional gains, $Ki_0$ and $Ki_1$ become integral gains, and $Kd_0$ and $Kd_1$ become differential gains. Depending on those control gains, following characteristics of a motor which responds to the postural command θref and to the travel command Pref may vary. For example, when the proportional gains $Kp_0$ and $Kp_1$ are made small, the motor rotor 57 moves with a slow delay in following, and when the proportional gains $Kp_0$ and $Kp_1$ are made large, the motor rotor 57 moves at high velocity in following. Thus, by changing the control gain, the amount of difference between the postural command θref and the travel command Pref, and an actual movement and response time can be regulated.

Moreover, the motor torque Tm obtained by subtracting the estimated load induced torque T1' from the added value of the motor torque from the posture controller 51 and the motor torque from the motor controller 53 is supplied to the motor rotor 57 to rotate only by the rotational angle θr. Here, Jr is inertia of the motor rotor 57 and Dr is a viscosity resistance (damper coefficient) of the motor rotor 57.

On the other hand, although the added value of the reactive force of the motor torque Tm and the load induced torque T1 is applied to the motor stator/base 60 as described above, the inclined movement is prevented by mutually canceled out. Here, J is inertia of the motor stator/base 60 and D is a viscosity resistance (damper coefficient) of the motor stator/base 60.

FIG. 39, for example, shows in detail the mathematical model shown in FIG. 38. As shown in FIG. 39, a postural controller 70 performs the PID control on the difference between the base angle command θref and the present base angle $\theta_0$ to generate the motor torque Tgyr for postural control, and the motor controller 71 performs the PID control on the difference between the rotational position command Pref of the motor 10 and the present rotational position θr to generate the motor torque for traveling control.

Further, a regulator 72 generates the estimated load induced torque T1' from the sensor signal of the pressure sensor 15. The respective torque is added in an adder 73, and the obtained motor torque Tm is supplied to the motor 10. The motor 10 is driven to rotate by the motor torque Tm, and the rotation is converted to 1/16 by a reducer 74 having a reduction ratio of 16:1 to be transmitted to the wheel 3.

Referring to FIGS. 35 through 39, the explanation is made in which only one wheel 3 is considered to be provided, to make the explanation simple; however, actually the coaxial two-wheeled vehicle 1 has the right and left wheels of 3R and 3L, and the motor controller 53 is independently provided on the right and the left, while the postural controller 51 shown, for example, in FIG. 37 is used in common by the right and left wheels of 3R and 3L.

A block diagram of a control mechanism in this case is shown in FIG. 40. A sensor value ωp from the gyroscopic sensor 13 is sent to an angle calculator 82 through a band-pass filter (BPF) 80 having a passing band of, for example, 0.1 through 50 Hz, and a sensor value αp from the acceleration sensor 14 is sent to the angle calculator 82 through a low-pass filter (LPF) 81 having a cut-off frequency of, for example, 0.1 Hz. In the angle calculator 82, the present base angle $\theta_0$ is computed based on those sensor values.

Further, difference between the base angle command θref that is the postural command and the present base angle $\theta_0$ is obtained in a subtractor 83, and the difference is supplied to a postural controller 84. The postural controller 84 computes the above described motor torque Tgyr using the base angle command θref and the present base angle $\theta_0$.

On the other hand, difference between a rotational position command Prefr of a motor rotor 92R that is a travel command for the right wheel 3R and a present rotational position θr of the motor rotor 92R detected by a rotary encoder 93R is obtained in a subtractor 85R, and the difference is supplied to a position proportional controller 86R. The position proportional controller 86R performs a position proportional (P) control on the difference, and the result of the proportional control is supplied to a subtractor 87R.

Moreover, a differentiation unit 88R differentiates the rotational position θr of the motor rotor 92R supplied from the rotary encoder 93R, and the result is supplied to the subtractor 87R. Then, difference between the result of the proportional control from the position proportional controller 86R and the result of the differentiation from the differentiation unit 88R is obtained in the subtractor 87R, and the difference is supplied to a velocity proportional controller 89R. The velocity proportional controller 89R performs a velocity proportional (P) control on the difference, and the result is supplied to an adder 90R.

The result of the proportional control, the motor torque Tgyr, and the estimated load induced torque T1' obtained from the sensor signals $PS_1$, $PS_2$, $PS_3$ and $PS_4$ of the pressure sensors 15 in a regulator 94 are added in the adder 90R, and the added value is supplied to a current control amplifier 91R. The current control amplifier 91R generates motor current based on the added value to drive the motor rotor 92R. The rotational position of the motor rotor 92R is supplied to the differentiation unit 88R as well as to the subtractor 85R. Since the same explanation will be applied similarly to the left wheel 3L, an explanation thereof is omitted.

Thus, the above described coaxial two-wheeled vehicle 1 has a common control mechanism for postural stabilization control with respect to the right and left wheels 3R and 3L, and has control mechanisms for traveling control to the right and left wheels independently, and since each control is performed independently, both the postural stabilization control and the traveling control can be stably performed.

Hereinafter, velocity control in the above described coaxial two-wheeled vehicle 1 will be explained.

As described above, the barycentric coordinates (Xg, Yg) of the load on the base 4 and the load weight Wg are detected from the respective sensor signals $PS_1$, $PS_2$, $PS_3$ and $PS_4$ of the four pressure sensors $15_1$ through $15_4$ provided at four corners of the base 4 in the above coaxial two-wheeled vehicle 1 to obtain the load induced torque T1; and the barycentric coordinates (Xg, Yg) are further used as a command to control a travel direction and velocity. Specifically, when the load weight Wg is a predetermined value or more, a velocity command Vx is changed based on the X-coordinate Xg of the barycentric position.

FIG. 41 shows the above aspect. Here, the range from $X_3$ to $X_1$ in FIG. 41 is an area in which the coaxial two-wheeled vehicle 1 is halted, and travel velocity is commanded to be zero within the range. It is preferable that the range be within an X-coordinate range of ground-contacting surface of the wheel 3 with a road surface. In this case, for example, when the load weight Wg is large or when gas pressure of the wheel 3 is low, a ground-contacting area of the wheel 3 with the road surface becomes large and therefore, the range in which the vehicle is halted also becomes large. Providing such range in which the vehicle is halted (dead zone) prevents the vehicle body from moving forward and moving backward due to a slight movement of the barycenter which is not intended by a rider.

When the X-coordinate becomes $X_1$ or more, velocity is commanded to increase in accordance with the value of X-coordinate until reaching the maximum forward velocity SfMAX. Moreover, when the value of X-coordinate becomes $X_2$ or more, the velocity is reduced to stop forcibly until the posture is stabilized again within the stop area. Thus, providing the area for forcibly reducing the velocity to stop can secure a safety of the rider when traveling at the maximum velocity.

Similarly, when the value of X-coordinate becomes $X_3$ or less, the velocity is commanded to increase in accordance with the value of X-coordinate until reaching the maximum backward velocity SbMAX. In addition, it is preferable that the maximum backward velocity SbMAX be less than the maximum forward velocity SfMAX. Moreover, when the value of X-coordinate becomes $X_4$ or less, the velocity is forcibly reduced to stop until the posture is stabilized again within the stop area.

When the X-coordinate is in the range from $X_1$ to $X_2$ or from $X_3$ to $X_4$, a rotational position command Prefr of the motor 10R and a rotational position command Prefl of the motor 10L are generated using, for example, the following formula (52) in accordance with the X-coordinate Xg. Hereupon, $G_0$ in the formula (52) is a positive constant gain and can be variable in accordance with the load weight Wg, for example.

[Numerical Expression 41]

$$Prefr = Prefl = Xg * G_0 \quad (52)$$

Further, when a velocity command is $V_{x0}$ at a time t=0 and the velocity command is $V_{x1}$ at a time t=$t_1$, it is preferable that acceleration be continuously changed for traveling so as not to generate a mechanical resonant vibration. In this case, when the time before reaching $V_{x1}$ is $\Delta t$, a travel velocity command Vref(t) at a time t ($0 \leq t \leq t1$) can be computed by the following formula (53), for example.

[Numerical Expression 42]

$$Vref(t) = (1/4)t^4 - (2/3)\Delta t * t^3 + (1/2)\Delta t^2 * t^2 + V_{x0} \quad (53)$$

At this time, the rotational position command Pref(t) of the motor 10 becomes an integrated value of the travel velocity command Vref(t) in the formula (53) and is obtained with a quintic function as shown in the following formula (54). Here, $Pref_0$ in the formula (54) is the rotational position command at the time t=0.

[Numerical Expression 43]

$$Pref(t) = \int Vref(t)dt + Pref_0 \quad (54)$$
$$= (1/20)t^5 - (2/12)\Delta t * t^4 + (1/6)\Delta t^2 * t^3 + Pref_0$$

Moreover, not only moving forward and moving backward but also a turn velocity command Vr can be changed as shown, for example, in FIG. 42 based on the Y-coordinate Yg of the barycentric position when the load weight Wg is a predetermined value or more. Here, the range from $-Y_1$ to $Y_1$ in FIG. 42 is a stop area, and a turn velocity is commanded to be zero within the range.

In addition, the stop area can arbitrarily be set in the vicinity of the origin O. Thus, providing the stop area (dead zone), the vehicle can be prevented from making a turn due to a slight shift of the barycenter which is not intended by a rider. When the Y-coordinate becomes Y1 or more, the turn velocity is commanded to increase in accordance with the value of Y-coordinate until reaching a right-turn maximum velocity CWMAX. Similarly, when the value of Y-coordinate becomes $-Y_1$ or less, the turn velocity is commanded to increase in accordance with the value of Y-coordinate until reaching a left-turn maximum velocity CCWMAX.

When the value of Y-coordinate is $Y_1$ or more or $-Y_1$ or less, the rotational position command Rrefr of the motor 10R and the rotational position command Rrefl of the motor 10L are generated in accordance with the Y-coordinate Yg. When a travel velocity is zero, the rotational position command Rrefr of the motor 10R and the rotational position command Rrefl of the motor 10L become the opposite phase command as shown in the following formula (55), for example. Hereupon, $G_1$ is a positive constant gain in the formula (55) and can be made variable in accordance with the load weight Wg, for example.

[Numerical Expression 44]

$$Rrefr = -Rrefl = Y_g * G_1 \quad (55)$$

On the other hand, when the travel velocity is not zero, the rotational position command Rrefr of the motor 10R and the rotational position command Rrefl of the motor 10L become the same phase command as shown in the following formulas (56) and (57), for example. Here, $G_2$ is a positive constant gain in the formulas (56) and (57), and can be made variable in accordance with the load weight Wg, for example.

[Numerical Expression 45]

$$Rrefr = Prefr + Y_g * G_2 \quad (56)$$

$$Rrefl = Prefl - Y_g * G_2 \quad (57)$$

Hereupon, when traveling on a road surface which has an unevenness such as a road surface of an unleveled ground or on an inclined road surface, it becomes difficult to travel in the target direction given by the rotational position commands to the right and left motors 10R and 10L, and there is a possibility that a difference arise between the target direction and an actual travel direction. Moreover, when effective diameters of the wheels 3 become unequal due to a difference in gas pressure of the right and left wheels 3R and 3L, there is a possibility that the similar discrepancy arise between the target direction and the actual travel direction.

Then, in the above described coaxial two-wheeled vehicle 1, an actual travel direction is detected by the gyroscopic sensor 13 which detects the angular velocity ωyaw around the yaw axis and each rotational velocity of the right and left motors 10R and 10L is independently controlled, so that discrepancy between the target direction and the actual travel direction can be corrected.

An example is explained, in which as shown in FIG. 43A the effective diameter of the left wheel 3L is shorter than that of the right wheel 3R and as shown in FIG. 43B $\omega yaw_1$ [rad/sec] is detected as a gyroscopic sensor signal around the yaw axis when moving forward. In such case, when rotational velocity commands Vrefr and Vrefl are added to get the average $Vref_0$, the vehicle can move forward by correcting the rotational velocity commands Vrefr and Vrefl respectively supplied to the right and left motors 10R and 10L as shown in the following formulas (58) and (59). Hereupon, $K_0$ is a positive constant in the formulas (58) and (59).

[Numerical Expression 46]

$$Vrefr = Vref_0 - K_0 * \omega_{yaw1} \quad (58)$$

$$Vrefl = Vref_0 + K_0 * \omega_{yaw1} \quad (59)$$

Further, when, as shown in FIG. 43C, Dref [rad/sec] is supplied as the target direction, the rotational velocity commands Vrefr and Vrefl are respectively supplied to the right and left wheels as shown in the following formulas (60) and (61).

[Numerical Expression 47]

$$Vrefr = Vref_0 - K_0(Dref - \omega_{yaw1}) \quad (60)$$

$$Vrefl = Vref_0 + K_0(Dref - \omega_{yaw1}) \quad (61)$$

The rotational velocity commands Vrefr and Vrefl obtained in this manner are respectively converted into the rotational position commands Prefr and Prefl of the respective wheels by the following formulas (62) and (63). Here, in the formulas (62) and (63), k is an integer showing the number of sampling and Pref(k) indicates a rotational position command in k-th sampling.

[Numerical Expression 48]

$$Rrefr(k) = Prefr(k) + Vref_0 \quad (62)$$

$$Rrefl(k) = Prefl(k) + Vref_0 \quad (63)$$

Similarly, there is a possibility that a discrepancy arise in turn velocity due to a difference in gas pressure between the right and left wheels 3R and 3L, a difference in a road surface condition or the like, when making a turn. In this case also, an actual turn velocity is detected by the gyroscopic sensor 13 which detects the angular velocity ωyaw around the yaw axis to control independently each rotational velocity of the right and left motors 10R and 10L, so that a discrepancy between the targeted turn velocity and an actual turn velocity can be corrected. An example is explained in which the effective diameter of the left wheel 3L is smaller than that of the right wheel 3R and ωyaw2 [rad/sec] is detected as the gyroscopic sensor signal around the yaw axis, when making a turn. When differentiated signals of the rotational position command Rrefr of the right wheel 3R and the rotational position command Rrefl of the left wheel 3L are Vrefr and Vrefl, respectively, a difference ωerr of the turn velocity is expressed in the following formula (64).

[Numerical Expression 49]

$$\omega_{err} = (Vrefl - Vrefr) - \omega_{yaw2} \quad (64)$$

In this case, the vehicle can make a turn as intended by correcting the rotational position commands Vrefr and Vrefl supplied to the right and left motors 10R and 10L as shown in the following formulas (65) and (66). Here, $G_3$ is a positive constant gain in the formulas (65) and (66) and can be made variable in accordance with the load weight Wg, for example.

[Numerical Expression 50]

$$Rrefr = Prefr + Y_g * G_2 - \omega_{err} * G_3 \quad (65)$$

$$Rrefl = Prefl - Y_g * G_2 - \omega_{err} * G_3 \quad (66)$$

Thus, in the above described coaxial two-wheeled vehicle 1, an actual travel direction and turn velocity are detected by the gyroscopic sensor 13 which detects the angular velocity ωyaw around the yaw axis to control independently each rotational velocity of the right and left motors 10R and 10L, so that the discrepancy between the target direction (turn velocity) and the travel direction (turn velocity) can be corrected.

Further, a software configuration of such coaxial two-wheeled vehicle 1 is explained using FIG. 44, in which a layered structure includes a hardware layer 150 as the lowest layer, a kernel layer 151, an on-body layer 152, a network layer 153 and an application layer 154 as the highest layer in order.

The hardware layer 150 is a circuit layer, and includes a motor control circuit, a central control circuit, a control circuit of a sensor circuit and the like, for example. The kernel layer 151 is a layer which performs various operations such as a motor servo operation, a postural control operation, a travel control operation or a real time travel target value operation. In the hardware layer 150 and the kernel layer 151, basic postural stabilization control and travel control are performed. The on-body layer 152 is a layer which performs a travel target value operation, the generation of an obstacle evading trajectory and the like.

Each of those layers performs sampling in a different control cycle respectively, and the higher the layer is, the longer the cycle becomes. For example, the hardware layer 150 that is the lowest layer has the control cycle of 0.1 msec, which is a short cycle; on the other hand, the kernel layer 151 has that of 1 msec and the on-body layer 152 has that of 10 msec.

Subsequently, the whole configuration of circuits in the coaxial two-wheeled vehicle 1 is explained. As shown in FIG. 45, the sensor signals $PS_1$, $PS_2$, $PS_3$ and $PS_4$ are supplied from the pressure sensors $15_1$ through $15_4$ to a sensor circuit 200. The sensor circuit 200 supplies to the control unit 16, together with those sensor signals, the sensor signals ωp and ωyaw from the gyroscopic sensor 13 which detects the angular velocity around the pitch axis and the yaw axis and the sensor signals Ax, Ay, Az, αp, αr and αyaw from the acceleration sensor 14 which detects both the linear acceleration in the directions of the X, Y and Z axes and the angular acceleration around the pitch axis, roll axis and yaw axis.

The control unit 16 generates the motor torque Tgyr and the rotational position command Pref of the motor rotor which is the travel command based on those sensor signals as described above, and those are supplied to right and left motor drivers 203R and 203L. The motor drivers 203R and 203L calculate the optimal motor current to drive the motors 10R and 10L that is, for example, 200 W based on the motor torque Tgyr, the rotational position command Pref of the motor rotor and the like and supply the current to the motors 10R and 10L. The rotational positions of those motors 10R and 10L are obtained by the rotary encoders 11R and 11L, and are fed back to the motor drivers 203R and 203L.

A servo-on/power switch 204 is connected to the control unit 16 and a power supply switch 205, and a signal from the power supply switch 205 is supplied to a power supply management circuit 206. This power supply management circuit 206 is connected to a battery 207, and supplies motor power to the motor drivers 203R and 203L, as well as supplying control power of 24V to the control unit 16, an audio processing circuit 201 and a video processing circuit 202. Regenerative electric power of the motors 10R and 10L is supplied to the power supply management circuit 206 through the motor drivers 203R and 204L, and the power supply management circuit 206 charges the battery 207 using this regenerative electric power.

Using FIGS. 46A and 46B, a detailed configuration of the whole configuration shown in FIG. 45 is explained. As shown in FIGS. 46A and 46B, the sensor signals $PS_1$, $PS_2$, $PS_3$ and $PS_4$ from the pressure sensors $15_1$ through $15_4$, the sensor signals ωp and ωyaw from the gyroscopic sensors $13_1$ and $13_2$ and also the sensor signals Ax, Ay, Az, αp, αr and αyaw from the acceleration sensor 14 are supplied to the sensor circuit 200. The sensor circuit 200 performs a gain adjustment to the sensor signals $PS_1$, $PS_2$, $PS_3$ and $PS_4$ from the pressure sensors 15 using for example a pressure gain of 10 mV/N, and after converting the results into digital signals through an analog-digital converter not shown in the figure, the digital signals are supplied to a barycentric operation unit 210 in the control unit 16.

Further, the sensor circuit 200 performs the gain adjustment to the sensor signals ωp and ωyaw from the gyroscopic sensors $13_1$ and $13_2$ using for example a postural gain of 1.6 V/(rad/sec), and also performs the gain adjustment to the sensor signals Ax, Ay, Az, αp, αr and αyaw from the acceleration sensor 14 using for example the postural gain of 1.6 V/(rad/sec²); and after converting the results into the digital signals through the analog-digital converter not shown in the figure, the digital signals are supplied to a signal preprocessing unit 211. The signal preprocessing unit 211 performs preprocessing of digital filtering with respect to inputted signals, of an offset adjustment, of a computation of a postural position that is a base angle $\theta_0$ and the like.

The barycentric operation unit 210 computes the barycentric coordinates (Xg, Yg) of the load on the base 4 and the load weight Wg thereof as described above based on the sensor signals $PS_1$, $PS_2$, $PS_3$ and $PS_4$ from the pressure sensors $15_1$ through $15_4$; supplies information on those barycentric coordinates (Xg, Yg) and load weight Wg to a travel command computing unit 212; and supplies information on the Y-coordinate Yg of the barycentric position and on the load weight Wg to a turn command generator 215.

The travel command computing unit 212 generates the velocity command Vx based on the barycentric position X coordinate-travel velocity characteristic as shown in FIG. 41 for example, and a rotational velocity command generator 213 performs the above mentioned quintic function operation based on the velocity command Vx to generate the rotational velocity command Vref(t). The rotational velocity command generator 213 supplies the rotational position command Pref(t) to a rotational position command generator 214, the turn command generator 215 and a postural command generator 216.

The turn command generator 215 generates, when making a turn, a phase command of for example Yg*G1 based on the Y-coordinate Yg of the barycentric position and the load weight Wg which are supplied from the barycentric operation unit 210, the rotational angular velocity ωyaw around the yaw axis which is supplied from the signal preprocessing unit 211 and the rotational velocity command Vref(t) which is supplied from the rotational velocity command generator 213, and supplies the phase command to the rotational position command generator 214.

The rotational position command generator 214 generates the rotational position command Pref(t) by integrating the rotational velocity command Vref(t) supplied from the rotational velocity command generator 213, and supplies the rotational position commands Prefr(t) and Prefl(t) to the right and left motor drivers. On this occasion, the rotational position command generator 214 generates the rotational position commands Prefr(t) and Prefl(t) in consideration of the phase command supplied from the turn command generator 215.

Based on the rotational velocity command Vref(t) supplied from the rotational velocity command generator 213, the postural command generator 216 computes the base angle command θref which is the postural command as explained using FIG. 37, and supplies the base angle command θref to a subtractor 217. In the subtractor 217, the current base angle θ0 obtained in the signal preprocessing unit 211 is subtracted from the base angle command θref, and the difference is supplied to a postural controller 218. The postural controller 218 performs the PID control based on the difference to obtain the motor torque Tgyr.

In addition, when the PID control is performed, the PI gain can be changed according to the load weight Wg on the base 4. Specifically, when the load weight Wg becomes large, it is desirable to make the proportional gain larger and to make the integration gain smaller. The postural controller 218 supplies the motor torque Tgyr to the right and left motor drivers 203R and 203L.

In the motor driver 203R for the right wheel 3R, a difference between the rotational position command Prefr which is the travel command for the motor 10R and the current rotational position θr of the motor 10R which is detected by the rotary encoder 11R is taken in a subtractor 230R, the difference thereof is supplied to a position proportional controller 231R. The position proportional controller 231R performs the position proportional (P) control on the above difference, and the result of the proportional control is supplied to a subtractor 232R. Further, a differentiating unit 233R differentiates the rotational position θr of the motor 10R which is supplied from the rotary encoder 11R, and the result of the differentiation is supplied to the subtractor 232R.

Then, a difference between the result of the proportional control from the position proportional controller 231R and the result of the differentiation from the differentiating unit 233R is taken in the subtractor 232R, and the difference is supplied to a velocity proportion and integration controller 234R. The velocity proportion and integration controller 234R performs the velocity proportional and integration (PI) control to the difference, and supplies the result of the proportional-integration control to an adder 235R. In the adder 235R, the result of the proportional-integration control and the motor torque Tgyr are added, and the added value is supplied to a current control amplifier 236R.

The current control amplifier 236R generates motor current based on the added value to drive, for example, the motor 10R of 200 W. The rotational position of the motor 10R is supplied to the subtractor 230R and to the differentiating unit 233R. Since the same is also said with respect to the left wheel 3L, an explanation thereof is omitted.

The power supply management circuit 206 is connected to the battery 207 of 24V, for example, and supplies the control power of 24V and 1 A to the control unit 16 and also supplies the motor power of 24V and 30 A respectively to the motor drivers 203R and 203L. Regenerative electric power of the motors 10R and 10L is supplied to the power supply management circuit 206 through the motor drivers 203R and 203L, and the power supply management circuit 206 charges the battery 207 using the regenerative electric power.

As described above, the coaxial two-wheeled vehicle 1 previously proposed by the inventor of the present application includes: the postural control unit for the right and left wheels 3R and 3L in common, which generates the motor torque Tgyr to perform the angle control of the base 4 using the gyroscopic sensor 13 and the acceleration sensor 14 and also generates the motor torque T1' to cancel out the load induced torque using the pressure sensor 15; and the motor control units independently to the right and the left, which generate the motor torque to perform the travel control using the pressure sensor 15, and since they each perform the control independently, the postural stabilization control and the travel control can be performed stably and compatibly.

Further, in the coaxial two-wheeled vehicle 1 previously proposed by the inventor of the present application, the travel control is performed in accordance with the barycentric coordinates of the load on the base 4, in which the stop zone (dead zone) is provided in the range of the X-coordinate and in the range of the Y-coordinate of the ground-contacting surface where the wheel 3 contacts with the road surface, so that the vehicle body can be prevented from moving forward, moving backward and making a turn by a slight movement of the barycenter which is not intended by the rider.

Furthermore, in the coaxial two-wheeled vehicle 1 previously proposed by the inventor of the present application, the actual travel direction and turn velocity are detected using the gyroscopic sensor 13 which detects the angular velocity ωyaw around the yaw axis, each rotational velocity of the right and left motors 10R and 10L are independently controlled, so that the difference between the target direction (turn velocity) and the travel direction (turn velocity) can be adjusted.

The applicant of the present invention has previously proposed the above described traveling apparatus according to such coaxial two-wheeled vehicle.

In the traveling apparatus, for example, described in the above described patent reference 1, traveling is performed by changing the rider's posture of the barycentric position based on a control principle of an inverted pendulum. Due to the above, when traveling on a road surface having considerable level differences and when a wheel going apart from the road surface and then falls freely in the air, there occurs such a problem that the wheel is driven to a high speed rotation by the control unit. When the wheel driven to such high speed rotation lands on the road surface, the vehicle abruptly runs; the posture becomes unstable; and then the rider cannot maintain the posture and falls down to result in a dangerous state, which is a problem.

On the other hand, the above mentioned coaxial two-wheeled vehicle 1 which has been previously proposed by the inventor of the present application is the apparatus in which the direction change is flexibly performed only by the man's barycentric balance. In this case, various sensors are provided in order to measure the shift of the barycenter, so that the state of the vehicle's free fall can be detected by those sensors.

The present application is made in view of such facts, and aims to solve such problem as a possibility in the conventional apparatus that when traveling on the road surface having considerable level differences, and when the wheel going apart from the road surface and then falls freely in the air, the wheel is driven to a high speed rotation by a control unit; and when the wheel being driven to the high speed rotation lands on the road surface, the vehicle abruptly runs, the posture becomes unstable, and then the rider cannot maintain the posture and falls down to result in the dangerous state.

SUMMARY OF THE INVENTION

In the present invention when a turn is performed in accordance with a shift of the barycentric position to the right and left, the barycentric position coming close to a position of the wheel is detected to restrict rotational velocity of the wheel. As a result, an abrupt turn in which the rider may fall down by the centrifugal force is prevented from occurring and stable traveling can be obtained without fail.

Further in the present invention, the level difference of the road surface is predicted by the change of a signal from the acceleration sensor in the gravitational direction (Z-axis) of the vehicle to control the rotation of the wheel with respect to the state of falling from the level difference. As a result, when traveling on the road surface having a considerable level difference and the wheel going apart from the road surface to fall freely in the air, the rider can land safely.

According to an aspect of claim 1 of the present invention, a traveling apparatus includes: a means for driving a plurality of wheels independently and a chassis connecting the plurality of wheels, in which a means for detecting a barycentric shift of a rider is provided in the chassis to perform traveling by respectively setting rotational velocity of the plurality of wheels in accordance with information on the detected shift of the barycenter, wherein turning is performed in accordance with a shift of the barycentric position to the right and left and also a control means is provided for detecting that the barycentric position has come close to the position of the wheels and for restricting the rotational velocity of the plurality of wheels to a predetermined limited value, so that the occurrence of an abrupt turn in which the rider may fall down by the centrifugal force can be prevented and stable traveling can be obtained without fail.

Moreover, according to an aspect of claim 2 of the present invention, the plurality of wheels includes two wheels whose rotational axles are disposed on a straight line and keeping the chassis horizontal is included as an element in setting the rotational velocity of the plurality of wheels, so that stable traveling can be obtained.

According to an aspect of claim 3 of the present invention, a means for detecting acceleration in traveling is provided in the chassis, and the angle of the chassis is controlled in accordance with the detected travel acceleration to ensure stability of the rider, so that further stable traveling can be obtained.

According to an aspect of claim 4 of the present invention, a means for detecting turning velocity is provided in the chassis, and the value to restrict the rotational velocity of the plurality of wheels is changed in accordance with the detected turning velocity, so that traveling can be performed smoothly.

According to an aspect of claim 5 of the present invention, the chassis includes acceleration sensors which detect acceleration on an X-axis, a Y-axis and a Z-axis and gyroscopic sensors which detect angular velocity on a pitch axis, a yaw axis and a roll axis to control the angle and the travel acceleration of the chassis by detecting the acceleration and the angular velocity of the chassis at a time of traveling, so that excellent traveling can be performed without fail.

According to an aspect of claim 6 of the present invention, along with a table provided on the chassis, pressure sensors are provided respectively at four corners of the table to detect the shift of the barycentric position of the rider in real time from outputs of those pressure sensors, so that the stable traveling can be performed.

According to an aspect of claim 7 of the present invention, a barycentric vector is obtained from information on the turning velocity and information on the barycentric position, and control is performed such that a ground-contacting point of the barycentric vector with a road surface can be a ground-contacting point between the wheel and the road surface, so that the stable and excellent traveling can be performed.

Furthermore, according to an aspect of claim 8 of the present invention, a method for controlling a traveling apparatus is provided in which the traveling apparatus includes a plurality of wheels independently driven, a chassis connecting the plurality of wheels, and the chassis is provided with a means for detecting barycentric shift of a rider to perform traveling by setting rotational velocity of the plurality of wheels respectively in accordance with information on the detected barycentric shift, wherein turning is performed in accordance with a shift of the barycentric position to the right and left and the barycentric position that comes close to the position of the wheels is detected to restrict the rotational velocity of the plurality of wheels to a predetermined limited value, so that the occurrence of an abrupt turn in which the rider may fall down by the centrifugal force can be prevented and stable traveling can be obtained without fail.

Moreover, according to an aspect of claim 9 of the present invention, the plurality of wheels includes two wheels whose rotational axles are disposed on a straight line and keeping the chassis horizontal is included as an element in setting the rotational velocity of the plurality of wheels, so that stable traveling can be obtained.

According to an aspect of claim 10 of the present invention, the travel acceleration of the chassis is detected and the angle of the chassis is controlled in accordance with the detected travel acceleration to ensure the stability of posture of the rider, so that further stable traveling can be obtained.

According to an aspect of claim 11 of the present invention, velocity of the above turning of the chassis is detected and the value to restrict the rotational velocity of the plurality of wheels is changed in accordance with the detected turning velocity, so that traveling can be performed smoothly.

According to an aspect of claim 12 of the present invention, the acceleration of the chassis on the X-axis, the Y-axis and the Z-axis and the angular velocity of the chassis on the pitch axis, the yaw axis and the roll axis are detected to control the angle and the travel acceleration of the chassis, so that the excellent traveling can be performed without fail.

According to an aspect of claim 13 of the present invention, the shift of the barycentric position of the rider is detected in real time by measuring pressure at each of the four corners of the table which is provided on the chassis, so that the stable traveling can be performed without fail.

According to an aspect of claim 14 of the present invention, a barycentric vector is obtained from information on the turning velocity and information on the barycentric position, and control is performed such that a ground-contacting point of the barycentric vector with a road surface can be a ground-contacting point between the wheel and the road surface, so that the stable and excellent traveling can be performed.

Therefore, a possibility in a conventional traveling apparatus that the rider may fall down by the centrifugal force when an abrupt turn is made can be resolved easily according to the present invention.

According to an aspect of claim 15 of the present invention, a traveling apparatus includes a means for driving a plurality of wheels independently and a chassis connecting the plurality of wheels, in which a means for detecting a barycentric shift of a rider is provided in the chassis to perform traveling by respectively setting rotational velocity of the plurality of wheels in accordance with information on said detected shift of the barycenter, wherein means for detecting the acceleration in the gravitational direction is provided in the chassis, and a control means for performing a predetermined control with respect to the rotational velocity of the plurality of wheels by detecting a change in acceleration in the gravitational direction, so that safe landing can be obtained even if a wheel goes apart from a road surface and falls freely in the air.

Moreover, according to an aspect of claim 16 of the present invention, the plurality of wheels includes two wheels whose rotational axles are disposed on a straight line and the control by the control means includes an element of keeping the chassis horizontal when setting the rotational velocity of the plurality of wheels, so that stable traveling can be obtained.

According to an aspect of claim 17 of the present invention, when a fall of the chassis is detected by the detection of the acceleration in the gravitational direction, the control means performs a control not to supply a rotational torque to the plurality of wheels, so that the safe landing can be obtained.

According to an aspect of claim 18 of the present invention, a gyroscopic sensor for detecting an angular velocity on the pitch axis is provided in the chassis, and when the fall of the chassis is detected by the detection of the acceleration in the gravitational direction, the control means applies a predetermined control of torque to the rotational velocity of the plurality of wheels by means of an output of the gyroscopic sensor so that the chassis can be brought to a desired angle, and performs control to make the plurality of wheels start to rotate inversely with an equivalent torque at the point of time when an angle of the chassis becomes half a target value, so that the chassis can be kept horizontal.

According to an aspect of claim 19 of the present invention, a detection means for detecting acceleration in the forward and backward direction and also a detection means for detecting rotational angular velocity of the plurality of wheels are further provided with the chassis, and the control means performs control to make relative velocity of the rotation of the wheel to a road surface brought into zero using the output of the gyroscopic sensor, an integrated value of the acceleration in the forward and backward direction and a detected value of the rotational angular velocity of the plurality of wheels, so that the excellent traveling can be performed at the time of landing.

Furthermore, according to an aspect of claim 20 of the present invention, a method for controlling a traveling apparatus is provided in which the traveling apparatus includes a plurality of wheels independently driven, a chassis connecting the plurality of wheels, and the chassis is provided with a means for detecting barycentric shift of a rider to perform traveling by respectively setting rotational velocity of the plurality of wheels in accordance with information on the detected barycentric shift, wherein the acceleration in the gravitational direction of the chassis is detected, and a change in acceleration in the gravitational direction is detected to apply a predetermined control with respect to the rotational velocity of the plurality of wheels, so that safe landing can be obtained even if a wheel goes apart from a road surface and falls freely in the air.

Moreover, according an aspect of claim 21 of the present invention, the plurality of wheels includes two wheels whose rotational axles are disposed on a straight line and the predetermined control includes an element of keeping the chassis horizontal when setting the rotational velocity of the plurality of wheels, so that stable traveling can be obtained.

According to an aspect of claim 22 of the present invention, when a fall of the chassis is detected by the detection of the acceleration in the gravitational direction, the control not to apply a rotational torque to the plurality of wheels is performed, so that the safe landing can be obtained.

According to an aspect of claim 23 of the present invention, an angular velocity on the pitch axis of the chassis is detected, and when the fall of the chassis is detected by the detection of the acceleration in the gravitational direction, a predetermined control of torque is applied to the rotational velocity of the plurality of wheels by means of an output of the gyroscopic sensor so that the chassis can be brought to a desired angle and control to make the plurality of wheels start to rotate inversely with an equivalent torque is performed at the point of time when an angle of the chassis becomes half a target value, so that the chassis can be kept horizontal.

According to an aspect of claim 24 of the present invention, acceleration in the forward and backward direction of the chassis is detected, also rotational angular velocity of the plurality of wheels are detected, and control to make relative velocity of the rotation of the wheel to a road surface brought into zero is performed using the output of the gyroscopic sensor, an integrated value of the acceleration in the forward and backward direction and a detected value of the rotational angular velocity of the plurality of wheels, so that the excellent traveling can be performed at the time of landing.

Accordingly, there has been a possibility in the conventional apparatus that when traveling on the road surface having a considerable level difference and when the wheel goes apart from the road surface and falls freely in the air, the wheel is driven to high rotational velocity by the control unit; and when the wheel driven to the high rotational velocity lands on the road surface, the vehicle abruptly runs to make the posture unstable, and then the rider cannot retain the posture and may fall down to result in the dangerous state; however, according to the present invention such problems can be resolved easily.

BRIEF DESCRIPTION OF THE DRAWINGS

FIG. 6 is a diagram for explaining a postural control when a man rides on;

FIG. 29 is a diagram for explaining a postural control when a man rides on;

FIGS. 47A and 47B are diagrams showing a structure of an embodiment of a coaxial two-wheeled vehicle to which a traveling apparatus and a method for controlling thereof according to the present invention is applied, in which 47A is a front view and 47B is a lateral view;

FIGS. 54A and 54B are diagrams showing a structure of a tire;

FIGS. 65A and 65B are diagrams showing a structure of a tire and a table, in which 65A is a front view and 65B is a lateral view;

FIG. 66 is a block diagram showing the relation between motor torque and angular velocity, and angle;

FIG. 67 is a diagram for explaining a torque, a table angular velocity and an angle change;

DESCRIPTION OF THE PREFERRED EMBODIMENTS

Figure 1:
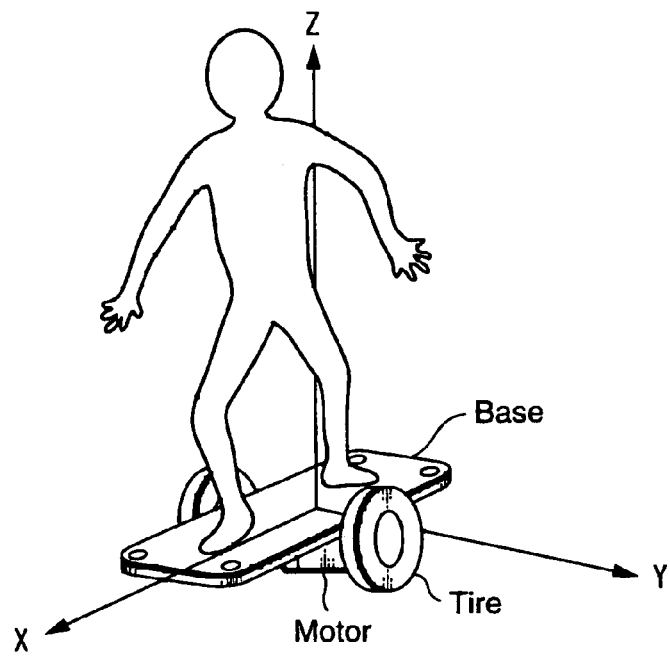
FIG. 1 is a perspective view showing an external appearance of an example of a coaxial two-wheeled vehicle which has previously been proposed by the applicant of the present invention.
Figure 2:
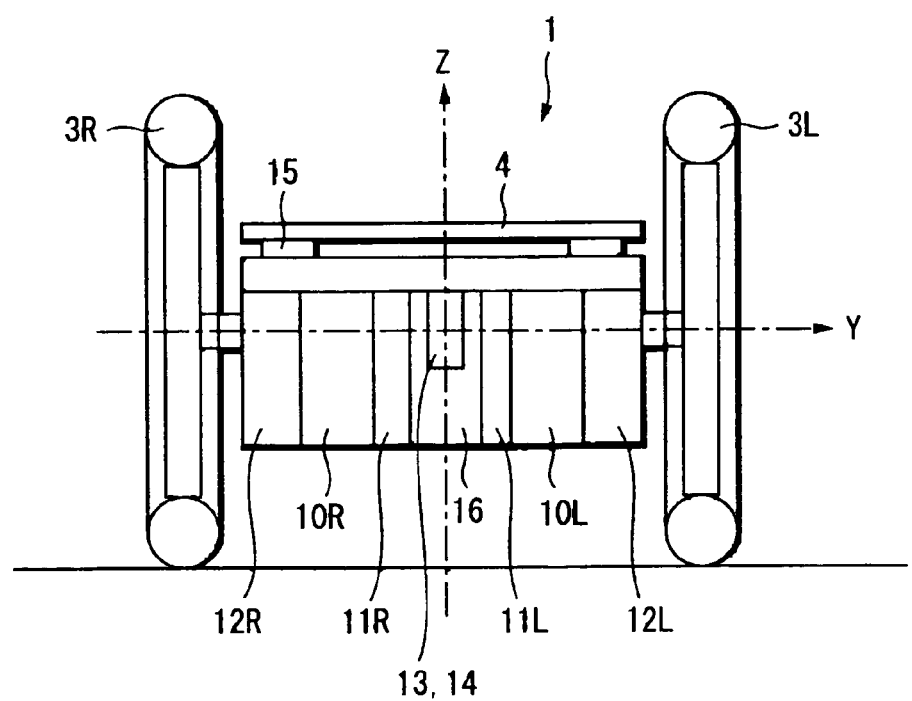
FIG. 2 is a lateral sectional view for explaining a base of a coaxial two-wheeled vehicle.
Figure 3A:
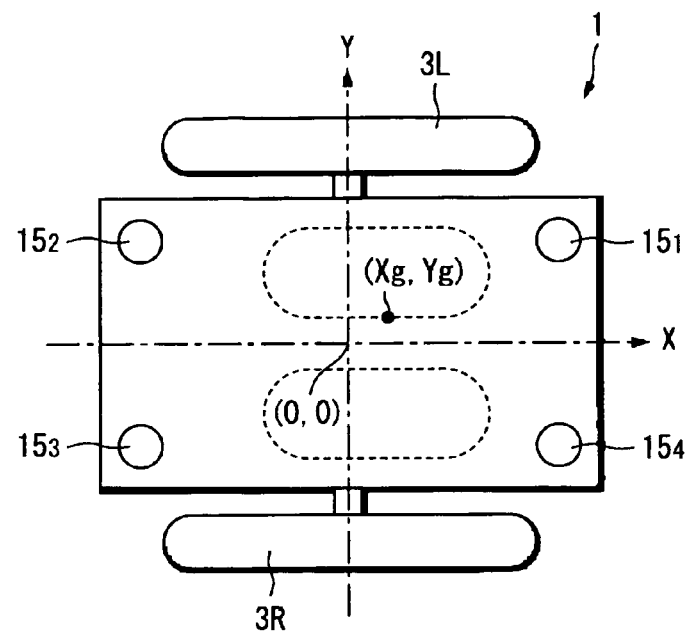
FIGS. 3A and 3B are diagrams showing pressure sensors which are provided in a base of a coaxial two-wheeled vehicle, in which 3A is a plan view and 3B is a lateral view.
Figure 3B:
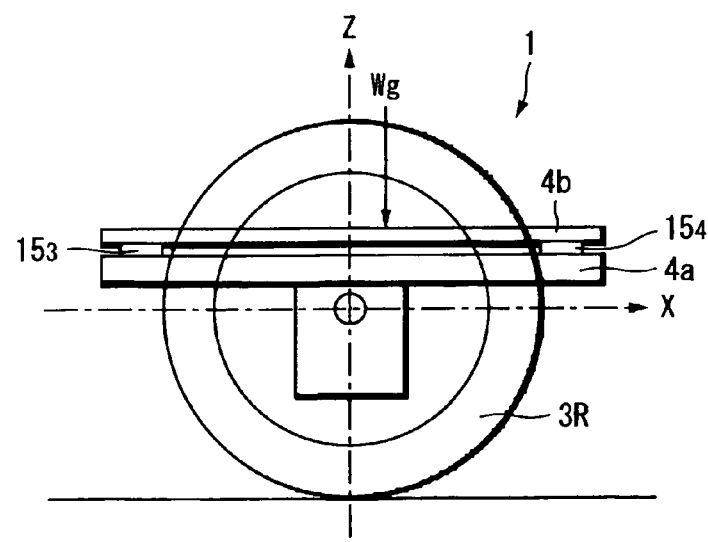
Figure 4:
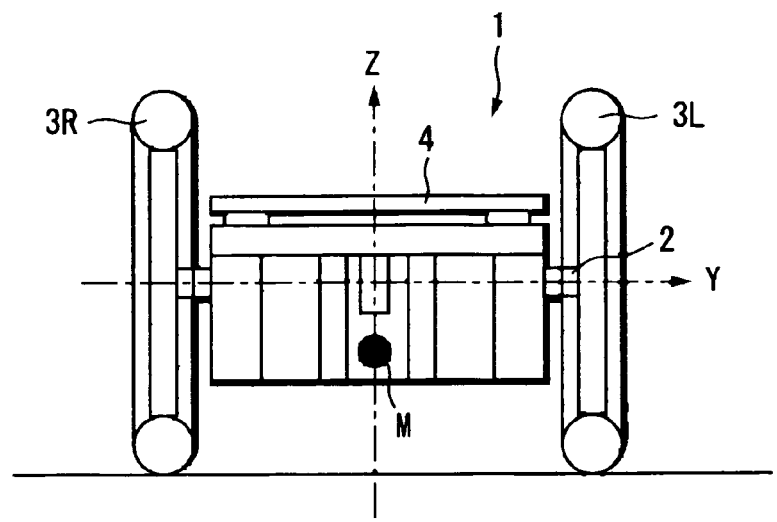
FIG. 4 is a diagram showing a positional relationship between a weight center and an axle of a two-wheeled vehicle.
Figure 5:
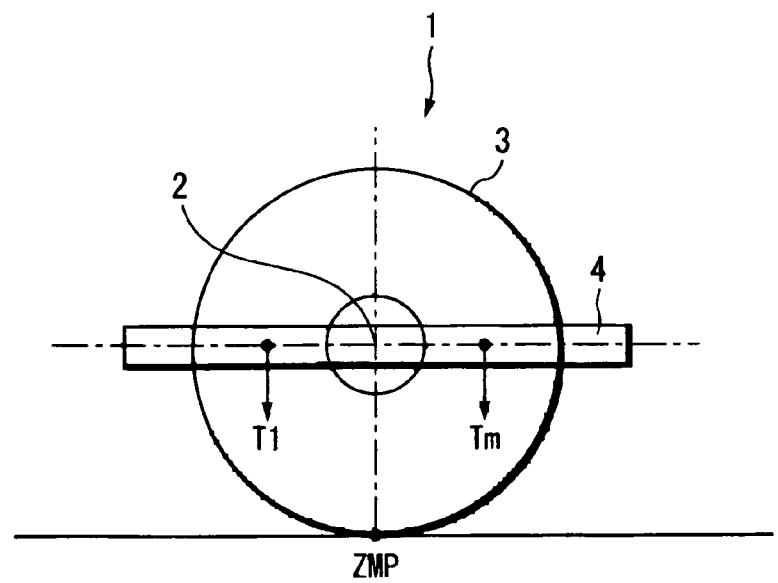
FIG. 5 is a diagram for explaining a balance between a load induced torque and a motor torque.
Figure 6:
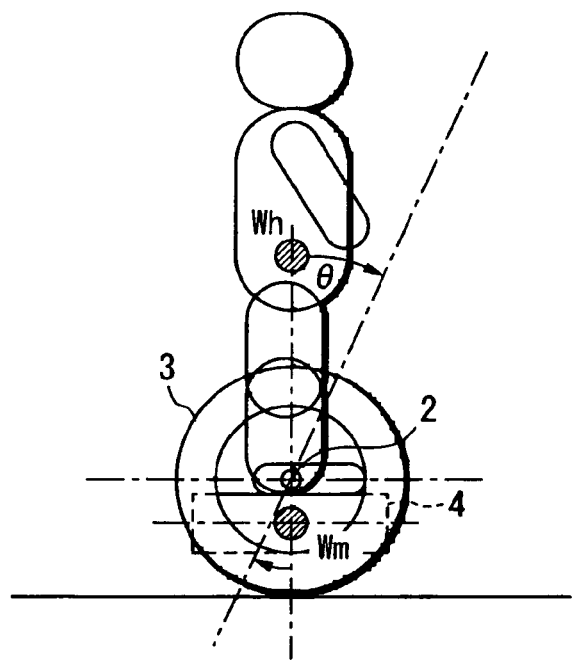
Figure 7:
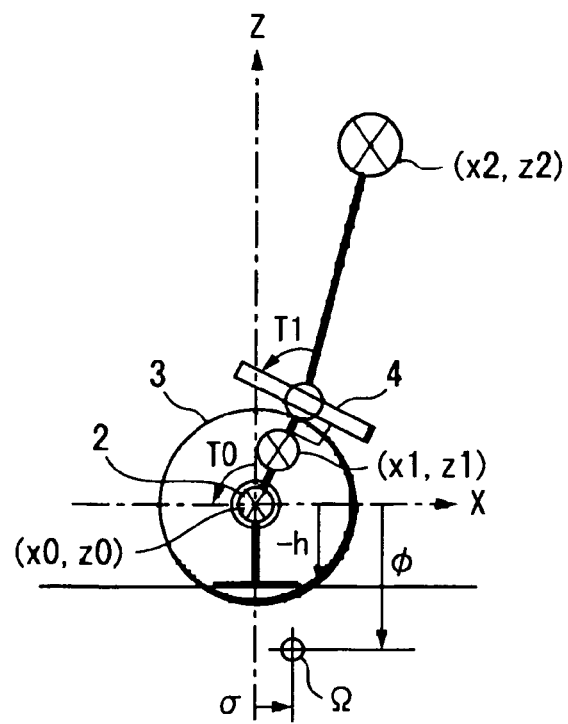
FIG. 7 is a diagram for explaining a dynamic model for maintaining a posture on a base.
Figure 8:
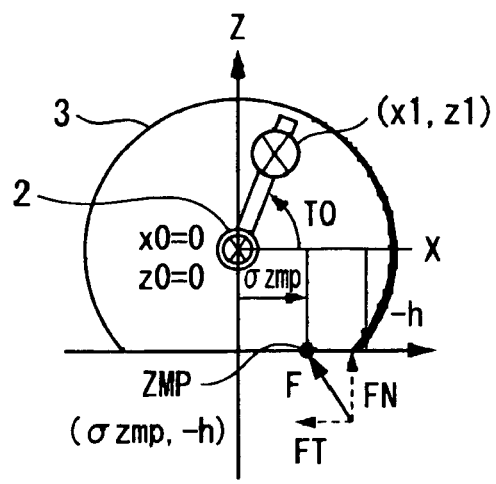
FIG. 8 is a diagram for explaining a dynamic model for maintaining a posture on a base.
Figure 9:
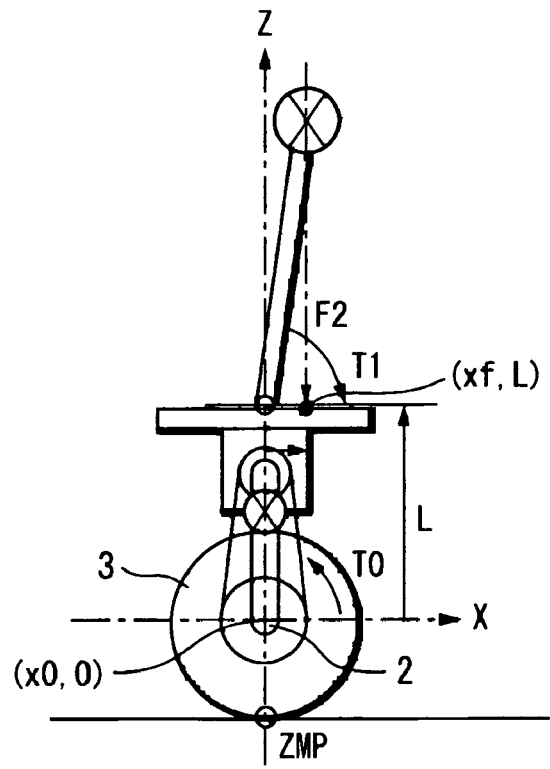
FIG. 9 is a diagram for explaining a dynamic model for maintaining a posture on a base.
Figure 10:
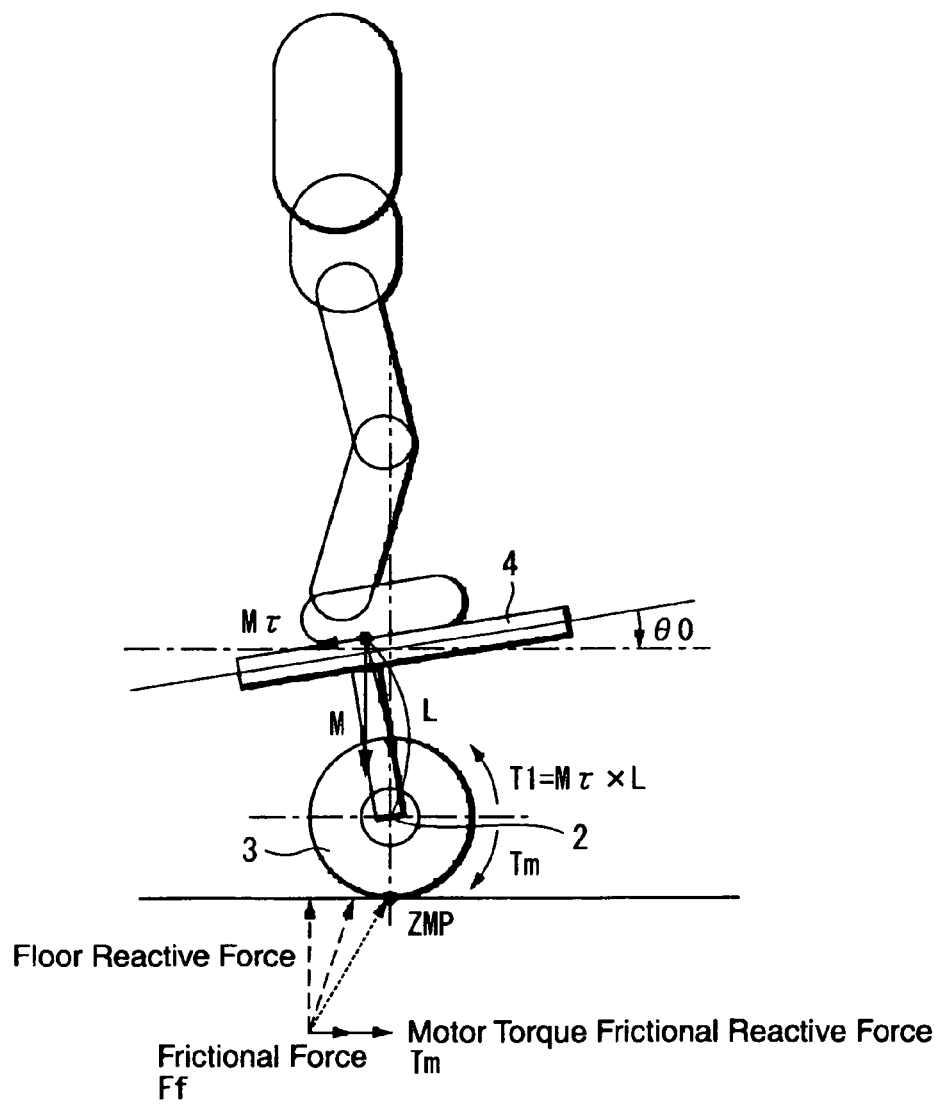
FIG. 10 is a diagram for explaining a dynamic model in a coaxial two-wheeled vehicle.
Figure 11:
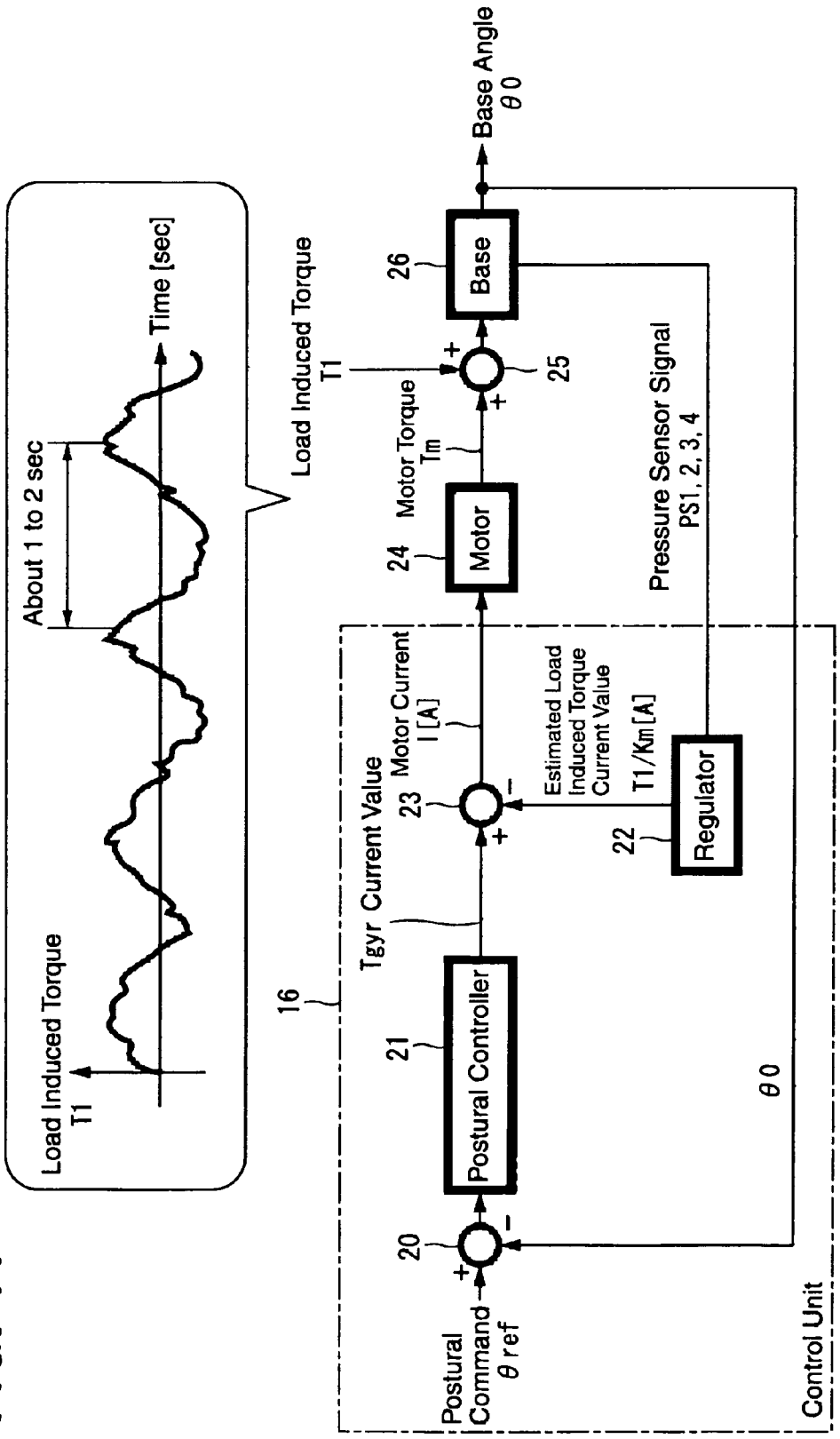
FIG. 11 is a diagram showing a control mechanism for postural stabilization control.
Figure 12:
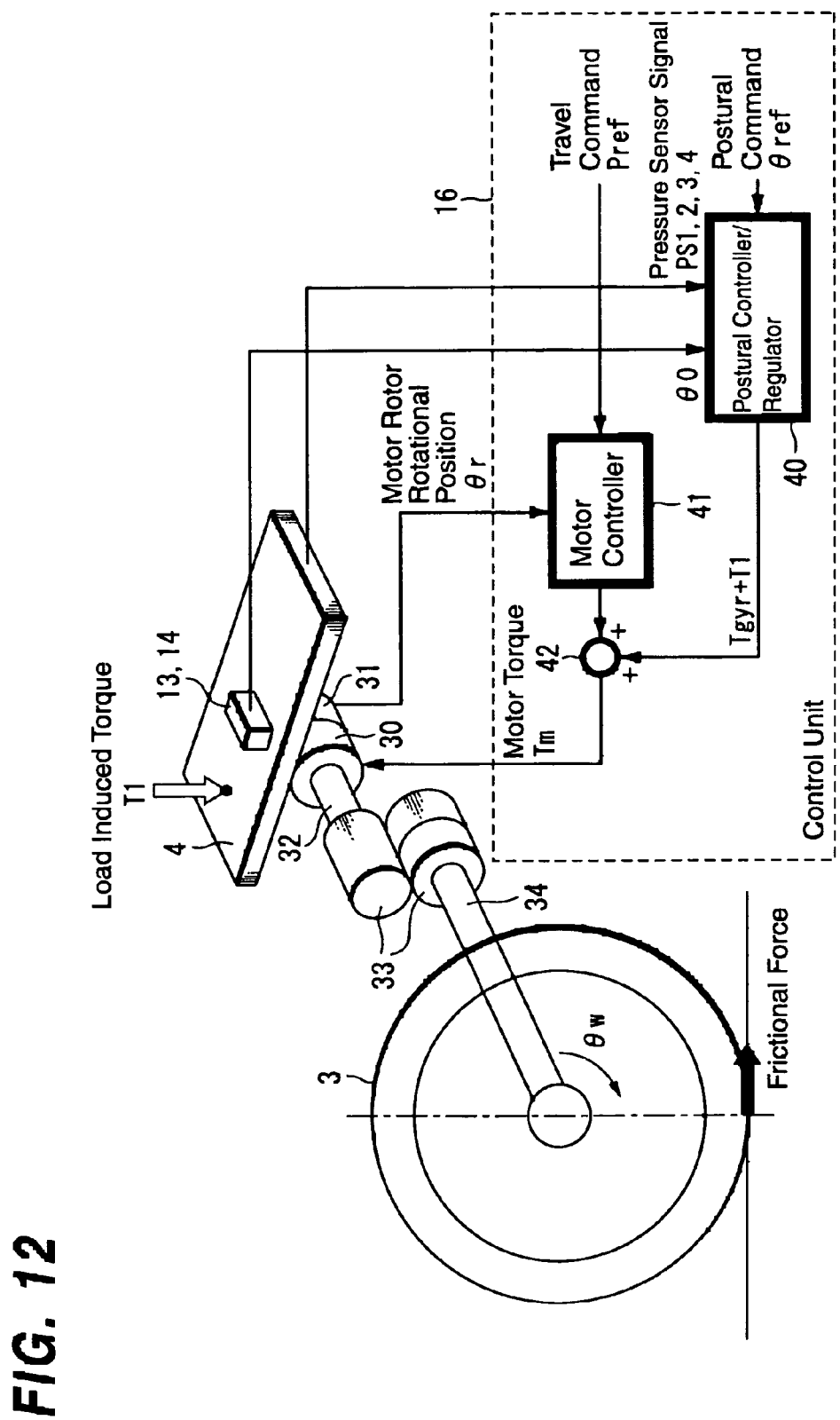
FIG. 12 is a diagram showing a control mechanism for postural stabilization control and traveling control in the case where only one wheel is considered to be provided.
Figure 13:
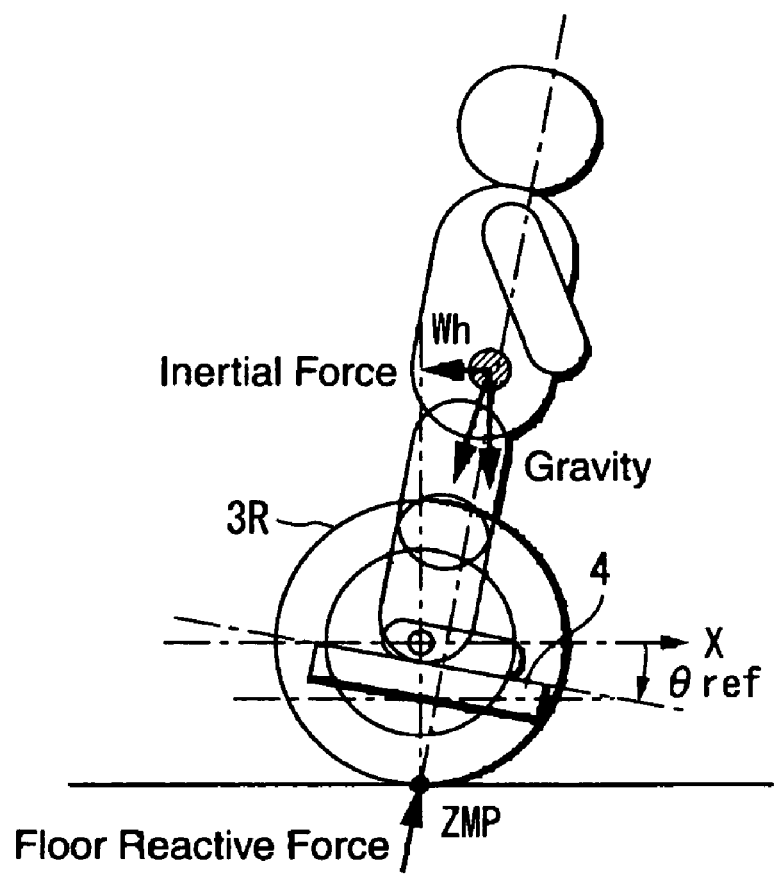
FIG. 13 is a diagram for explaining a postural command in a coaxial two-wheeled vehicle.

Hereinafter, an explanation is made to the present invention by referring to accompanied drawings. FIGS. 47A and 47B are diagrams showing a structure of an embodiment of a coaxial two-wheeled vehicle to which a traveling apparatus and a method for controlling thereof according to the present invention are applied, where FIG. 47A is a front view and FIG. 47B is a lateral view.

For example, right and left wheels 101 and 102 are provided in FIG. 47. Those two wheels 101 and 102 are arranged such that respective wheel axles 104 and 105 are disposed on a straight line of a table (chassis) 103. Further, right and left motors 106 and 107 are respectively disposed close to the wheels 101 and 102 on the table 103, and rotary shafts 108 and 109 of those right and left motors 106 and 107 are connected to the wheel axles 104 and 105 respectively through transmission portions (reducers) 110 and 111, so that the wheels 101 and 102 can be rotationally driven.

Further, a sensor circuit 112 of such as a gyroscopic sensor or an acceleration sensor to detect a posture of a rider is mounted on the table 103. Further, a sensor signal detected by the sensor circuit 112 is supplied to a control unit 113 to perform a control over driving of the motors 106 and 107, to perform a control over a posture of the table 103 with respect to the roll axis and the pitch axis, and to perform a control over charging a secondary battery 115 (not shown in the figure) with regenerative energy by a charging circuit 114 (not shown) which is disposed close to the control unit 113.

Figure 22:
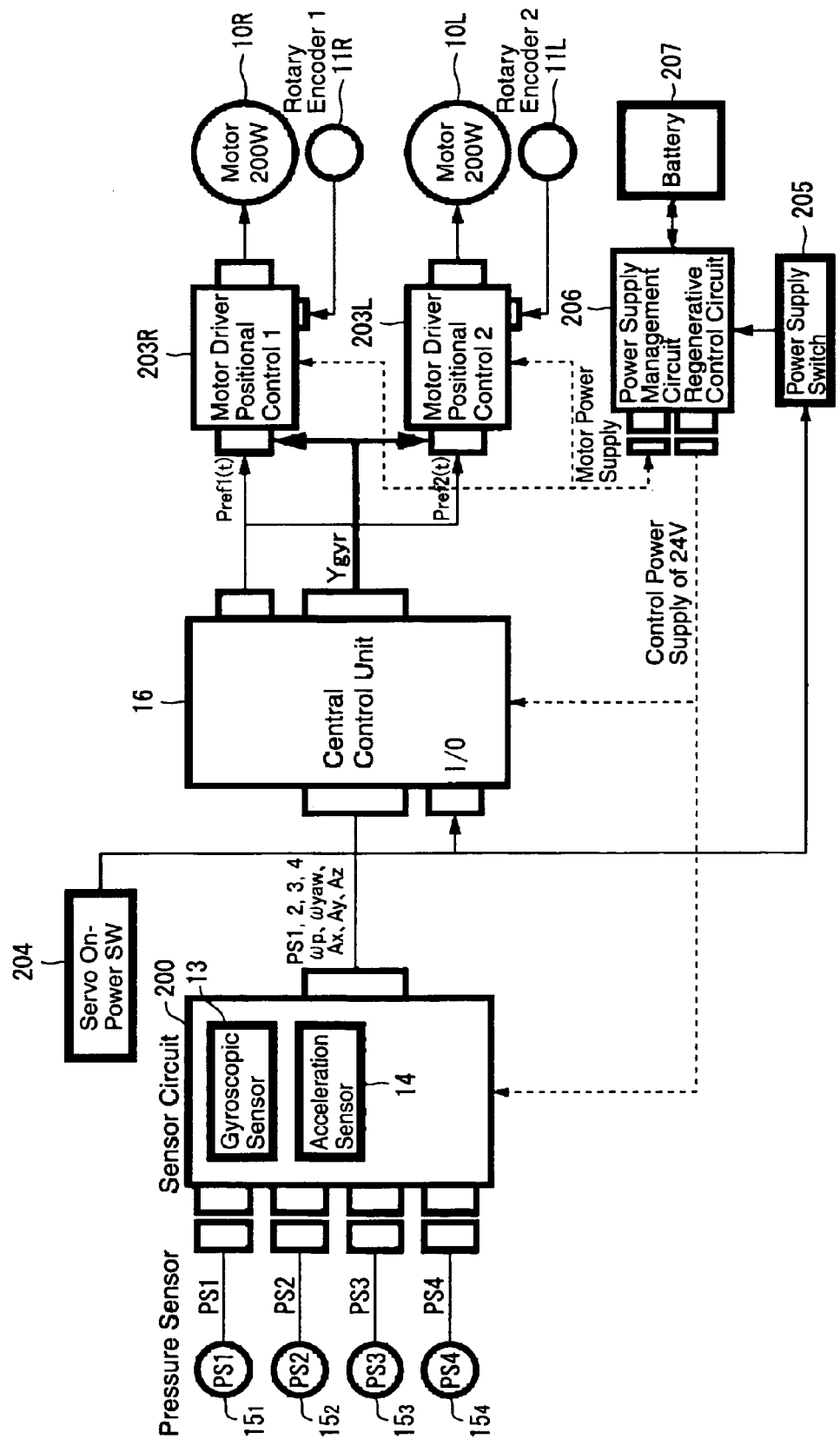
FIG. 22 is a diagram for explaining the whole configuration of each circuit in a coaxial two-wheeled vehicle 1.

Further, a system configuration of the whole apparatus of an embodiment of the coaxial two-wheeled vehicle, to which the traveling apparatus and the method for controlling thereof according to the present invention are applied, is similar to the one shown in the above described FIG. 22. Then in such apparatus, a specific control is performed as shown in a flow chart of FIG. 48.

Figure 48:
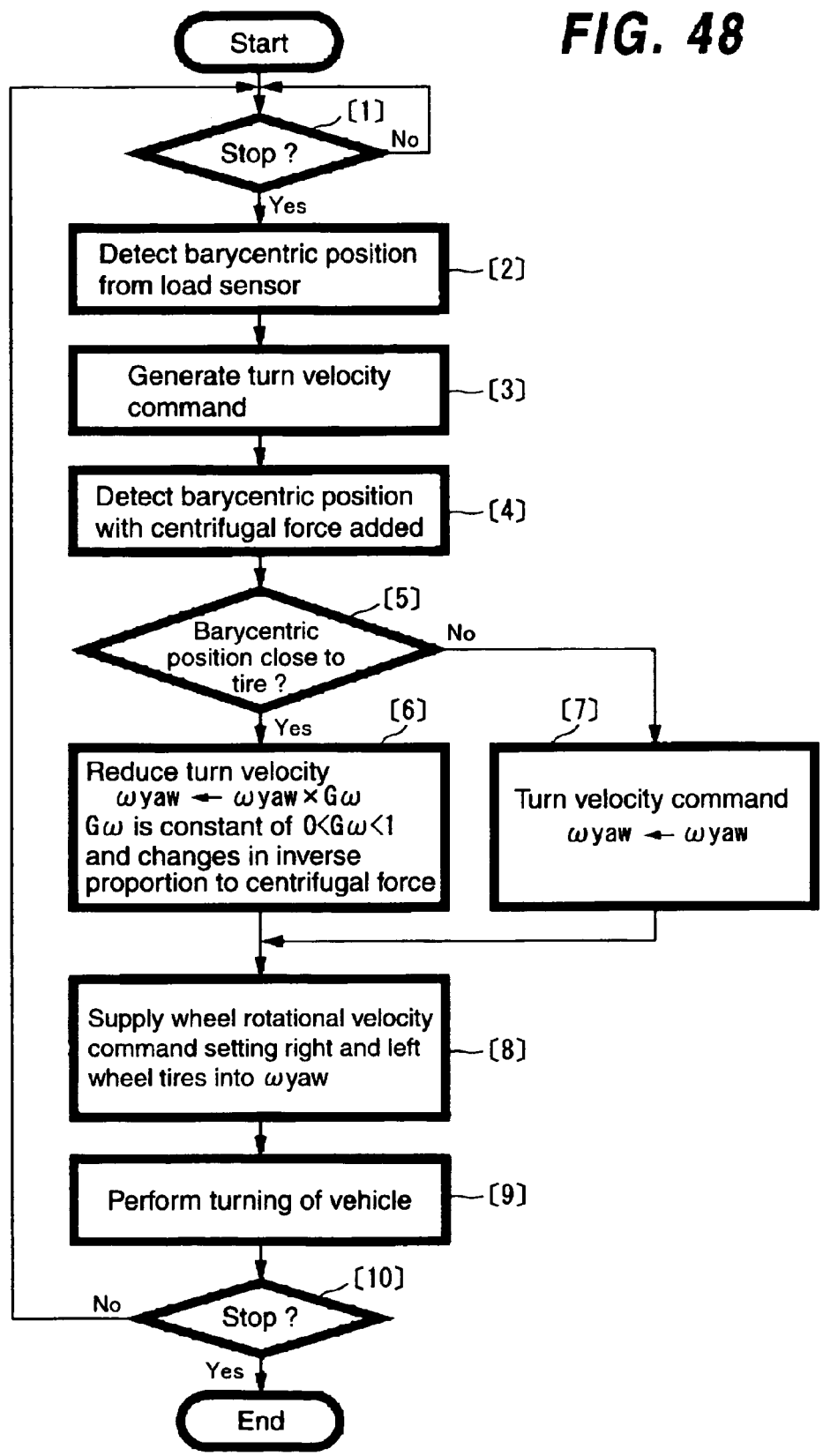
FIG. 48 is a flow chart showing an operation of an adjusting mechanism of a turn velocity in accordance with centrifugal force.

In FIG. 48, when an operation is started, first it is judged at a step [1] whether a turn operation by means of a rider's barycentric position is performed or not, and if it is not performed (No), the step [1] is repeated. Then, when the turn operation is performed, the barycentric position is detected from a load sensor at a step [2]. Further, a turn velocity command is generated at a step [3]. Further, the barycentric position to which centrifugal force is added is detected at a step [4].

Then, it is judged at a step [5] whether the barycentric position is close to a tire or not. If it is close to the tire (Yes), processing to reduce the turn velocity is performed at a step [6]. Hereupon, a computation is performed in which the sensor signal ωyaw from the gyroscopic sensor 13 in the above mentioned FIG. 22, for example, can be set into ωyaw←ωyaw×Gω, where, Gω is a constant of 0<Gω<1, and it is a variable which changes in inverse proportion to a strength of the centrifugal force.

Further, when the barycentric position is not close to the tire (No) at the step [5], the sensor signal ωyaw is set to ωyaw←ωyaw at a step [7]. Then, a wheel rotational velocity command which sets a tire velocity of the right and left wheels to ωyaw is supplied at a step [8]. Accordingly, the turn of a vehicle is performed at a step [9]. Further, it is judged at a step [10] whether the traveling is stopped or not, and if it is not stopped (No), the processing is returned to the step [1]. Moreover, if it is stopped at the step [10], the processing is ended.

Figure 49:
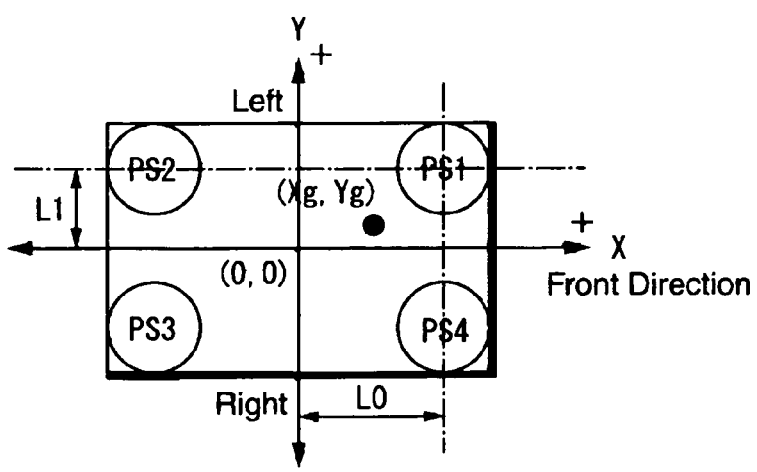
FIG. 49 is a diagram showing the disposition of pressure sensors on a table.

Thus, the processing to reduce the turn velocity is performed when the barycentric position comes close to the tire. Furthermore, the processing is specifically performed as follows. The load sensor in the above described apparatus has a structure as shown in FIG. 49, for example. In this structure, the coordinates (Xg, Yg) of the barycenter are obtained from the following formulas.

$W=PS1+PS2+PS3+PS4-W0$ [N]: $W0$ is a vehicle weight with no-load.

$W1=(PS1+PS4)/2-W10$ [N]: $W10$ is a vehicle weight with no-load.

$W2=(PS2+PS3)/2-W20$ [N]: $W20$ is a vehicle weight with no-load.

$W3=(PS1+PS2)/2-W30$ [N]: $W30$ is a vehicle weight with no-load.

$W4=(PS3+PS4)/2-W40$ [N]: $W40$ is a vehicle weight with no-load.

$Xg=L0*(W1-W2)/(W1+W2)$ [m]

$Yg=L1*(W3-W4)/(W3+W4)$ [m]

Hereupon, when the W is a certain weight or more, a forward movement or a backward movement is performed depending on a sign and value of Xg. At that time, a command of the tire becomes the following formulas, where the time is t.

$Pr\ efx(t)=Xg \times Gx \times t$ [rad] ($Gx$ is a positive constant)

$Pr\ ef1(t)=Pr\ ef2(t)=Pr\ efx(t)$ [rad]

On the other hand, a pressure sensor signal is changed by the load induced torque T1 as a load torque correction command, and the load induced torque T1 is measured with the above formula. A torque which balances out the T1 is computed from the measured value using the following formula. The computed signal is a presumed value T'1 of the load induced torque.

$T'1=W \times Xg/2$ [Nm]

Figure 14:
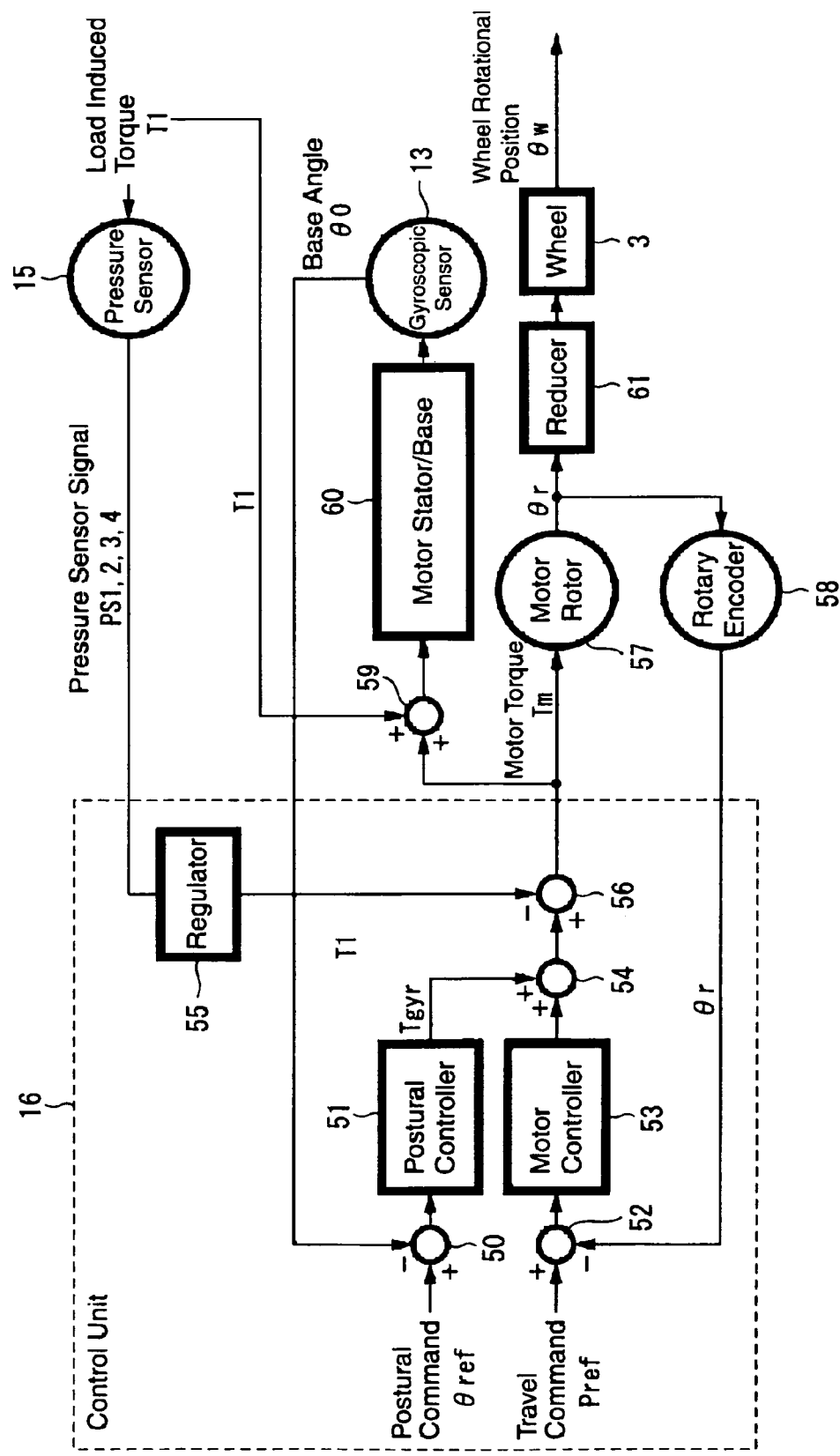
FIG. 14 is a block diagram showing a control mechanism for postural stabilization control and traveling control in the case where only one wheel is considered to be provided.
Figure 15:
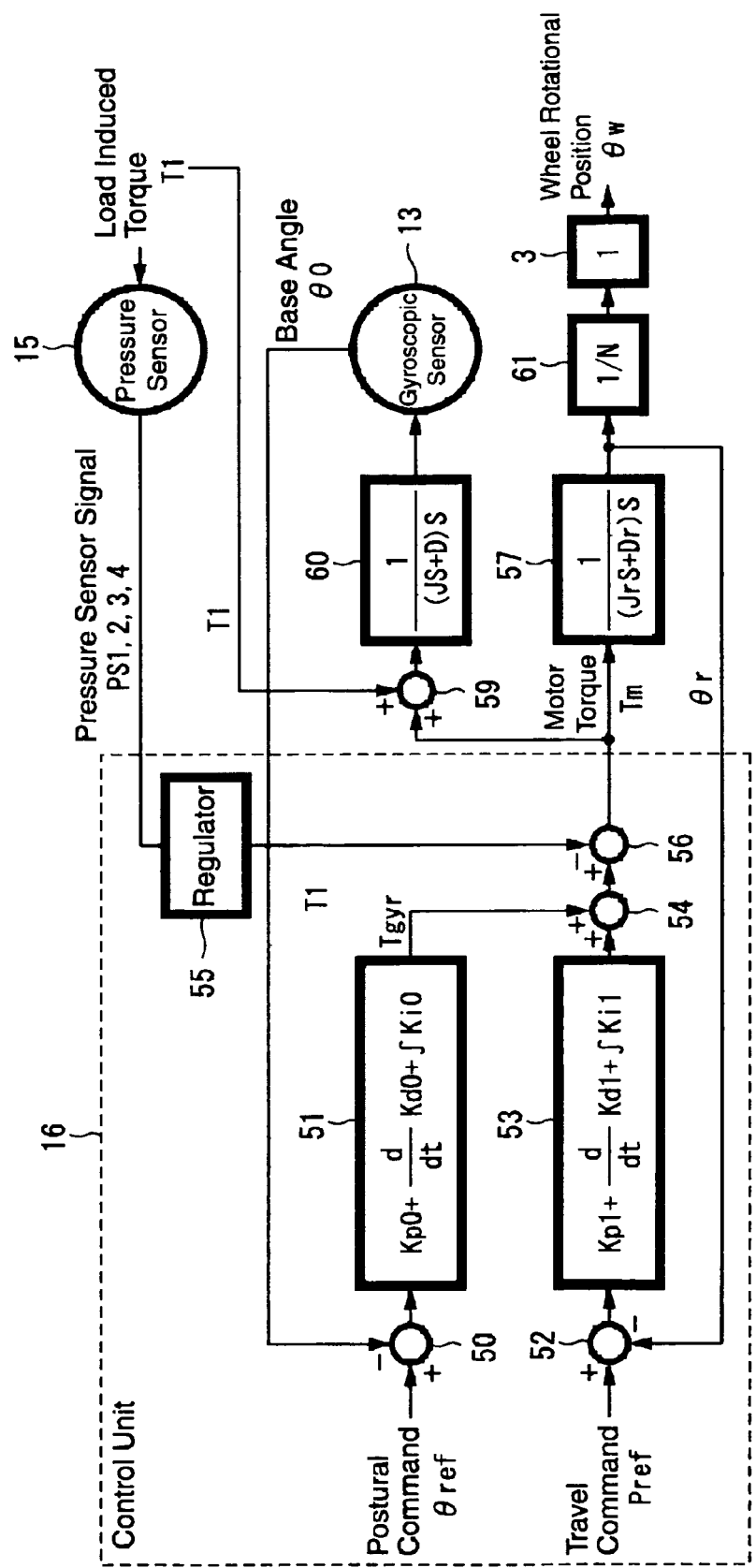
FIG. 15 is a diagram showing the block diagram of FIG. 14 as a mathematical model.
Figure 16:
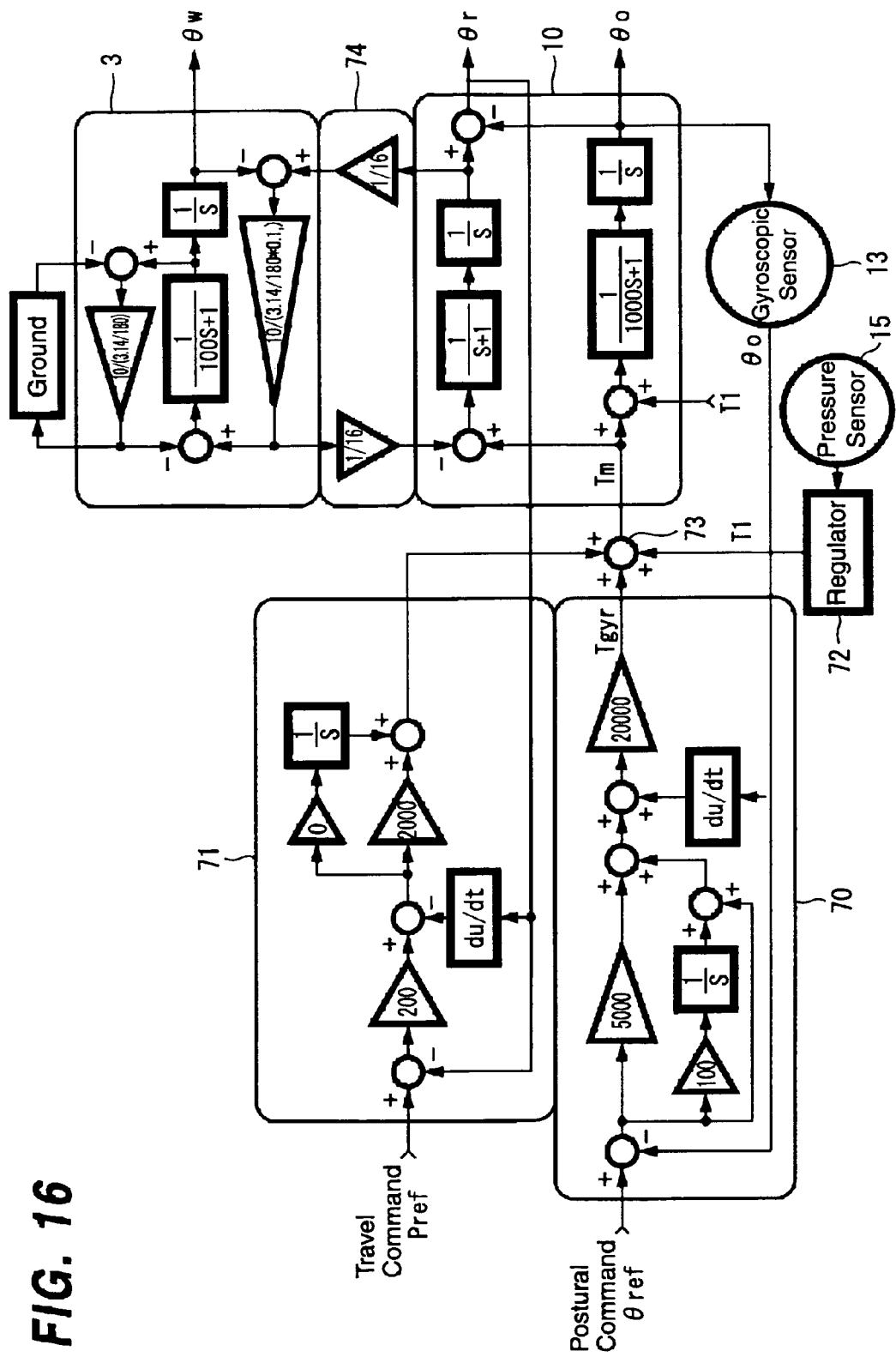
FIG. 16 is a diagram showing in detail a specific example of the mathematical model shown in FIG. 15.

This operation is performed by the regulator O in FIG. 14.

Further, the turn command is schematically explained. That is, when the turn is made using outputs of pressure sensors, PM is assumed to be the barycentric coordinate signal Yg in FIG. 49.

PM=Yg

Hereupon, when positional commands of the right and left wheels at the time t are Rref1(t) and Rref2(t) [rad], and when a travel velocity Prefx(t)/dt is zero, the commands become opposite phase commands to each other and the commands to the right wheel and the left wheel are described by the following formulas.

$Rref1(t)=PM \times G_0 \times t$ [rad]: right wheel command ($G0$ is a positive constant)

$Rref2(t)=-PM \times G0 \times t$ [rad] left wheel command

Therefore, when the travel velocity Prefx(t)/dt is not zero, those become the same phase commands and the commands to the right wheel and the left wheel are described by the following formulas.

$Rref1(t)=Prefx(t)+PM \times G1 \times t$ [rad]: right wheel command ($G1$ is a positive constant)

$Rref2(t)Prefx(t)-PM \times G1 \times t$ [rad]: left wheel command

At this time, it is assumed that the signs of Rref1(t) and Rref2(t) are the same as that of Prefx(t). Further, when those two have different signs, values of Rref1(t) and Rref2(t) are made to be zero.

Figure 17:
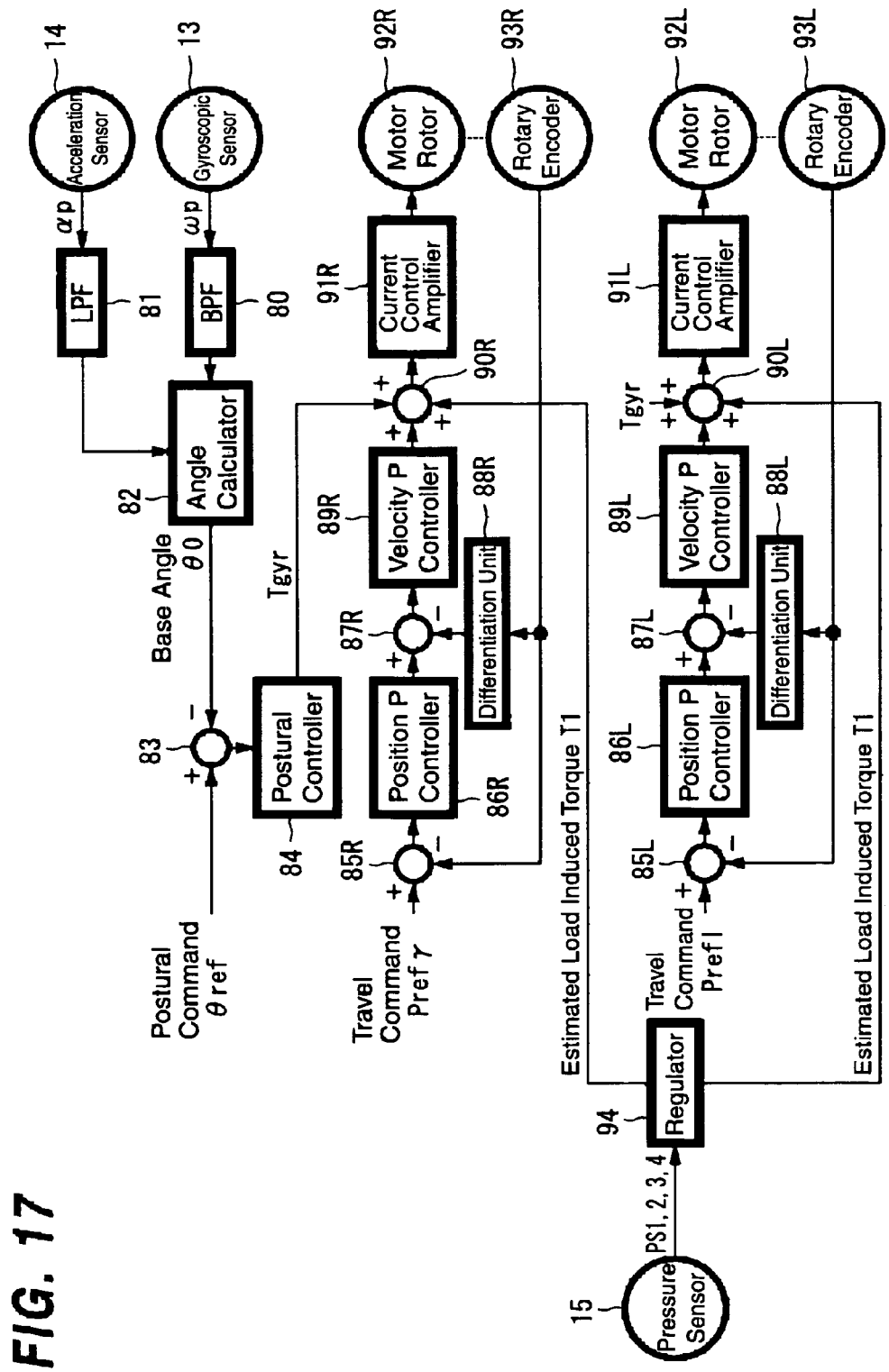
FIG. 17 is a block diagram showing a control mechanism for postural stabilization control and traveling control in the case where two wheels are provided.
Figure 18:
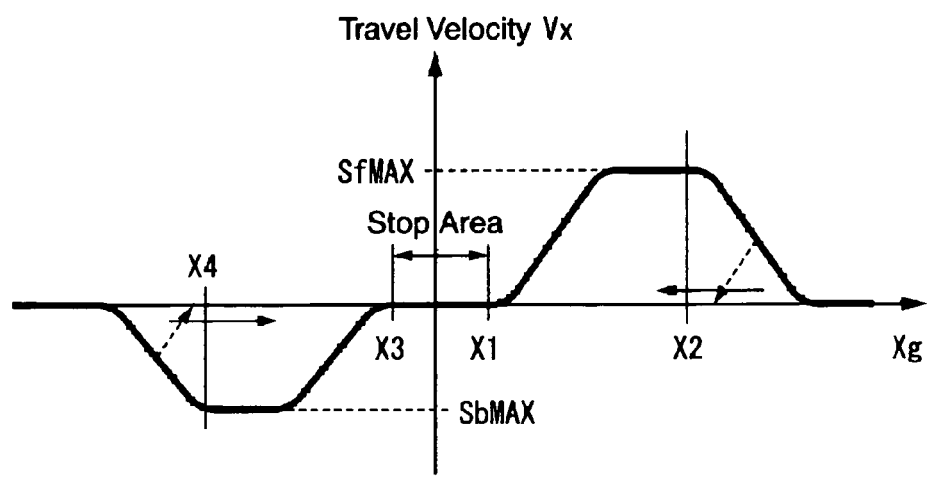
FIG. 18 is a diagram for explaining a travel velocity control in the case of moving forward and moving backward.
Figure 19:
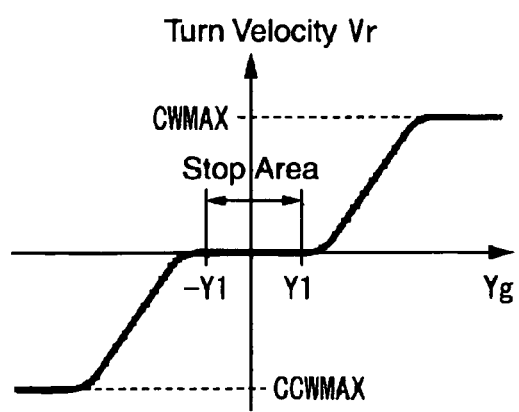
FIG. 19 is a diagram for explaining a travel velocity control in the case of making a turn.
Figure 20A:
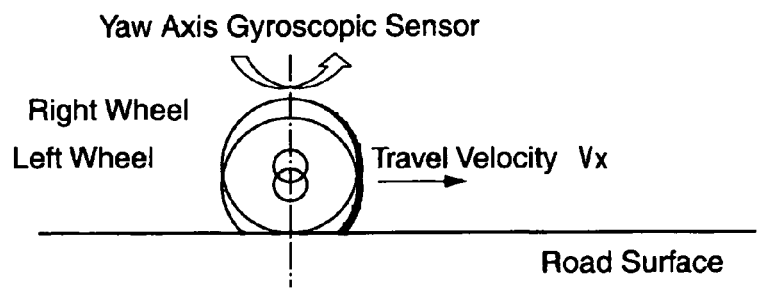
FIG. 20 is a diagram for explaining a control method in the case where a signal of a gyroscopic sensor around a yaw axis is detected when moving straight ahead.
Figure 20B:
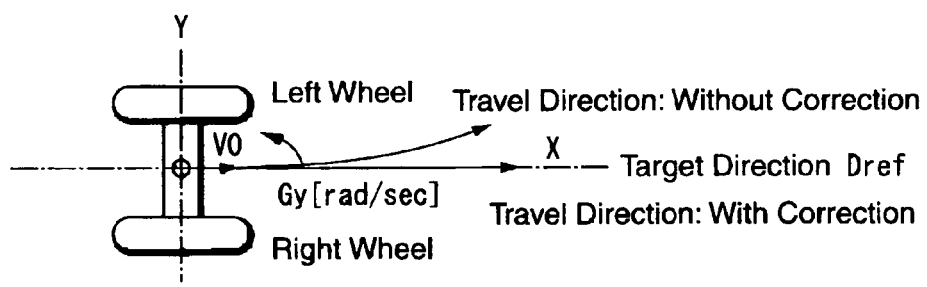
Figure 20C:
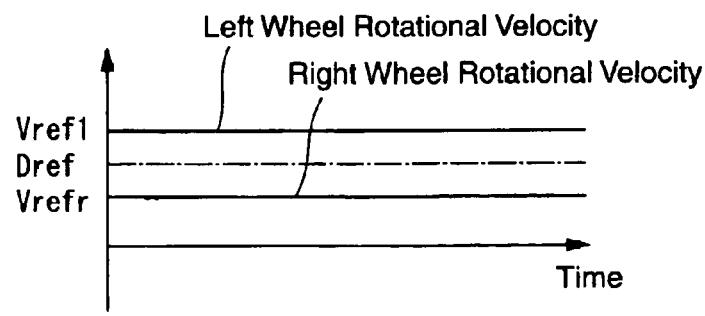
Figure 21:
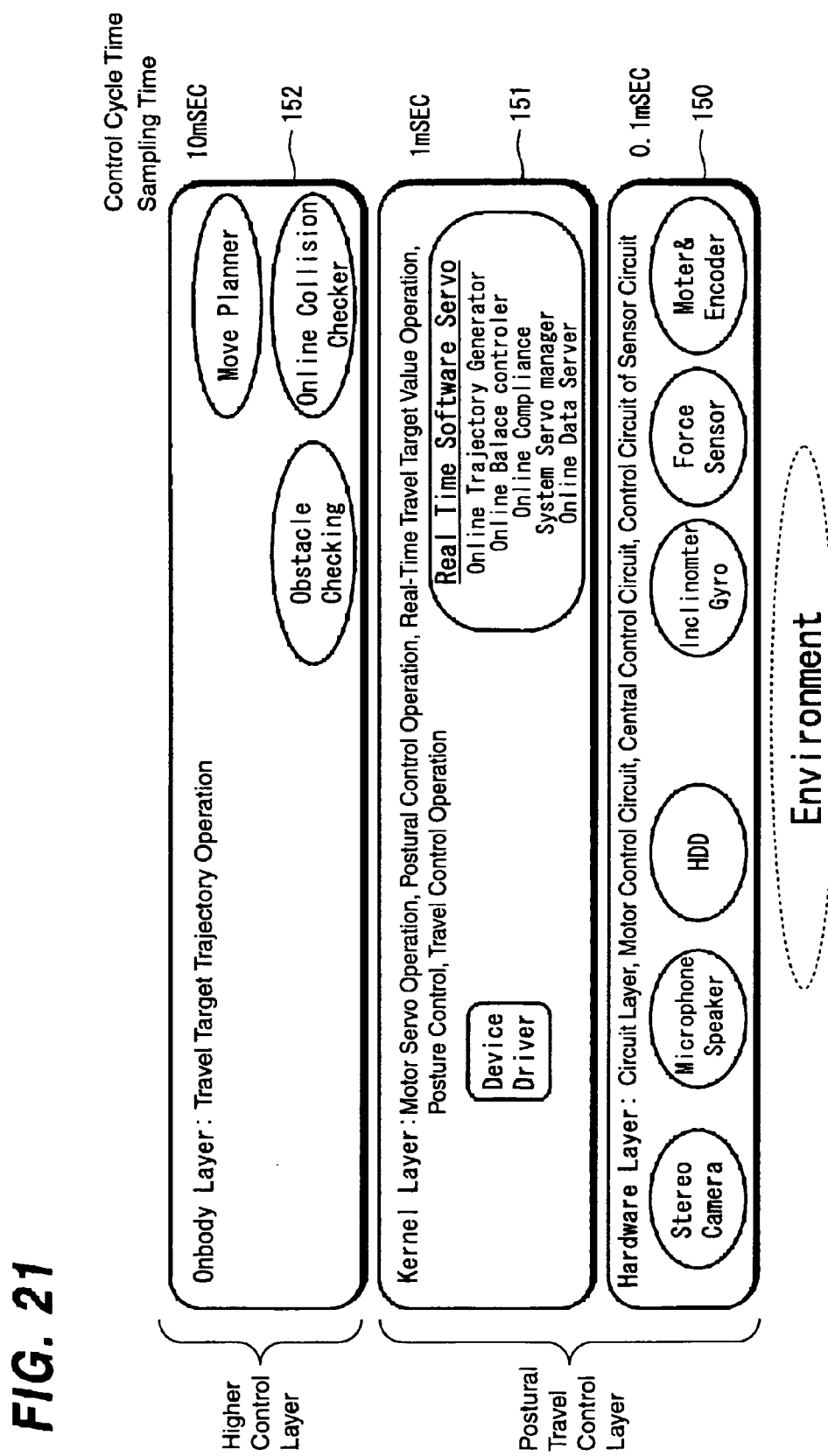
FIG. 21 is a diagram for explaining a software configuration of the coaxial two-wheeled vehicle.

By those Rref1(t) and Rref2(t), the right and left tires rotate at rotational velocity of $\Omega 1$ and $\Omega 2$ [rad/sec] in a circuit shown in FIG. 17. Further, a turn radius R and a turn velocity ωyaw are determined depending on a difference between the $\Omega 1$ and $\Omega 2$. Furthermore, since an upper limit of the turn velocity ωyaw is defined by the turn velocity determined in FIG. 18, the rider can make a turn while keeping the posture stably.

Further in detail, the control is performed as described hereunder. Specifically, the quintic function operation is used in the travel velocity command generator 212 in the above mentioned FIGS. 23A and 23B. Then, when the velocity command is V0 at the time of t=0, it is necessary to generate in the travel velocity command generator 212 the velocity command Vref(t) to change the velocity continuously so that the velocity becomes Vx at the time of t1.

Then, when an attainable commanded travel velocity signal Vx is supplied to an input signal by the travel velocity command generator 212, the rotational command Pref(t) of the motor is computed by an operation of the following formula. Since the acceleration changes continuously in the rotational command Pref(t) computed in this manner, there is such effectiveness that a vibration of a system can be suppressed.

Specifically, when at the time t and time until reaching is Δt, the velocity command Vref(t) at the time t is computed using the following formula.

$Vref(t)=(1/4)t^4-(2/3)\Delta t \times t^3+(1/2)\Delta t^2 \times t^2+V0$ [rad/sec]

At this time, the rotational command Pref(t) of the motor becomes an integrated value of Vref(t) in the above formula and is described by the following formula.

Here, P0 in the following formula is a value of the rotational positional command at t=0.

$$Prefx(t) = \int V(t)dt + P0$$
$$= (1/20)t^5 - (2/12)\Delta t \times t^4 + (1/6)\Delta t^2 \times t^3 + P0 \text{ [rad]}$$

Thus, since Prefx(t) is given by the quintic function of the time t according to the above formula, the traveling can be performed in a continuous motion. Accordingly, it becomes possible to perform the traveling without exciting a resonance vibration that is mechanically caused.

Figures 23, 23A:
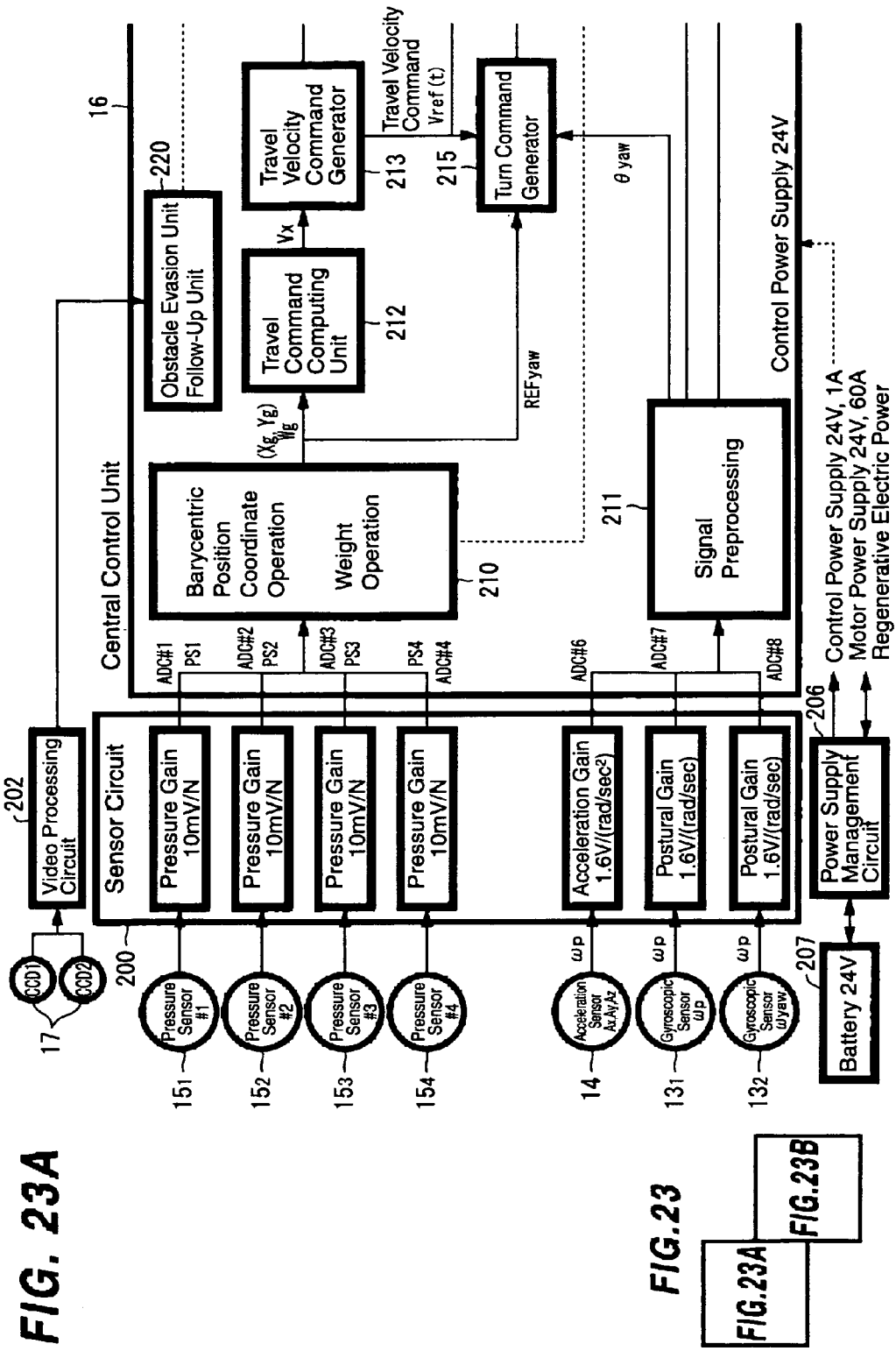
FIGS. 23A and 23B are diagrams for explaining a detailed internal configuration of the whole configuration shown in FIG. 22, in which the travel velocity control when moving forward and moving backward is explained.
Figure 23B:
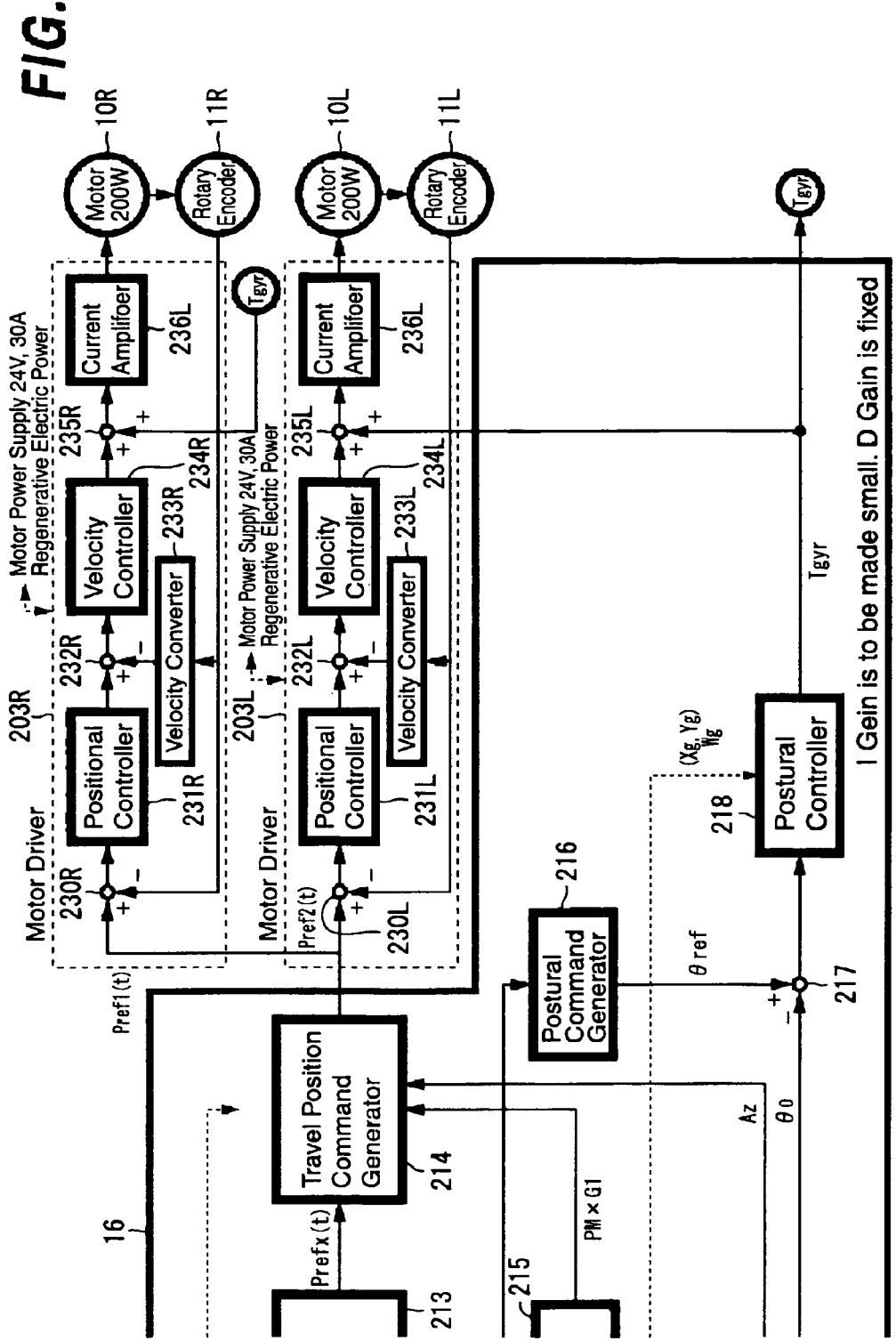
Figure 24:
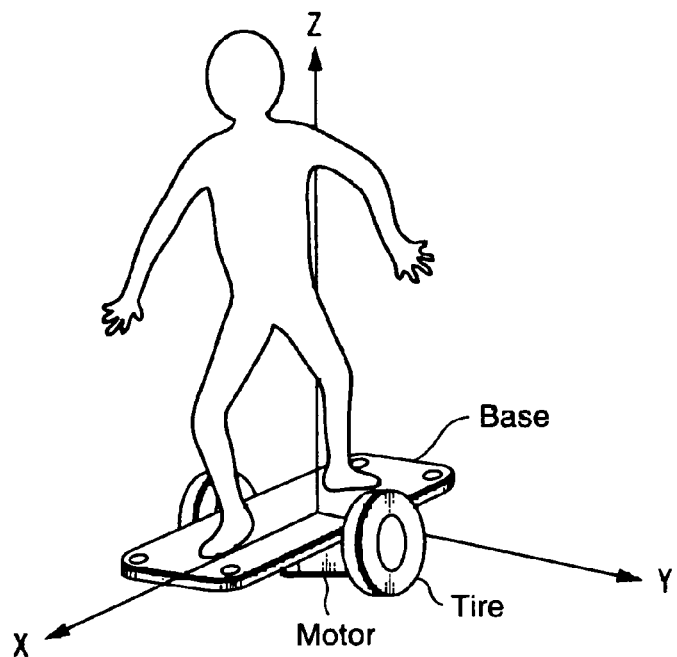
FIG. 24 is a perspective view showing an external appearance of an example of a coaxial two-wheeled vehicle which has previously been proposed by the applicant of the present invention.
Figure 25:
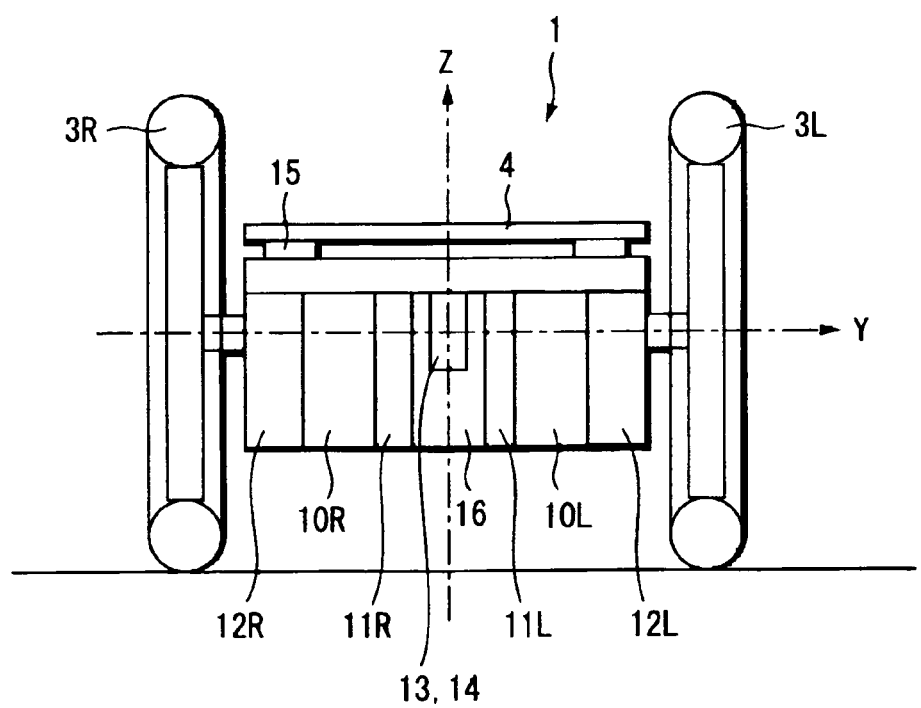
FIG. 25 is a lateral sectional view for explaining a base of a coaxial two-wheeled vehicle.
Figure 26A:
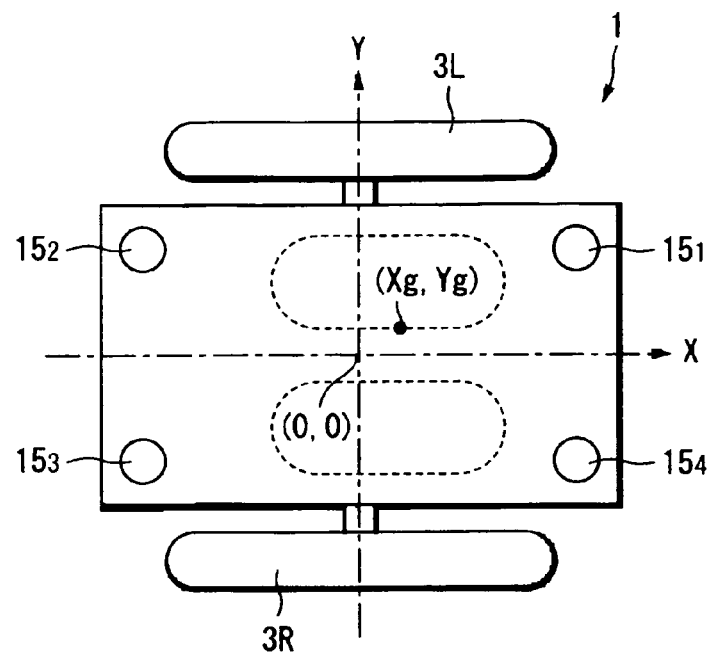
FIGS. 26A and 26B are diagrams showing pressure sensors which are provided in a base of a coaxial two-wheeled vehicle, in which 26A is a plan view and 26B is a lateral view.
Figure 26B:
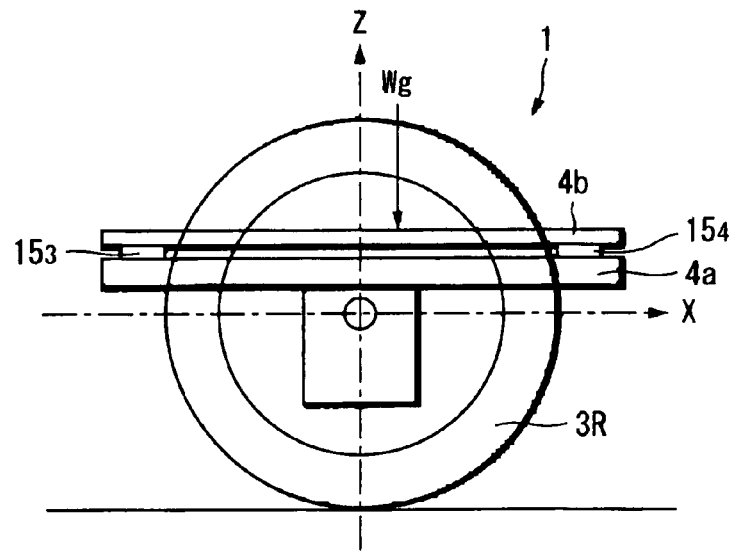
Figure 27:
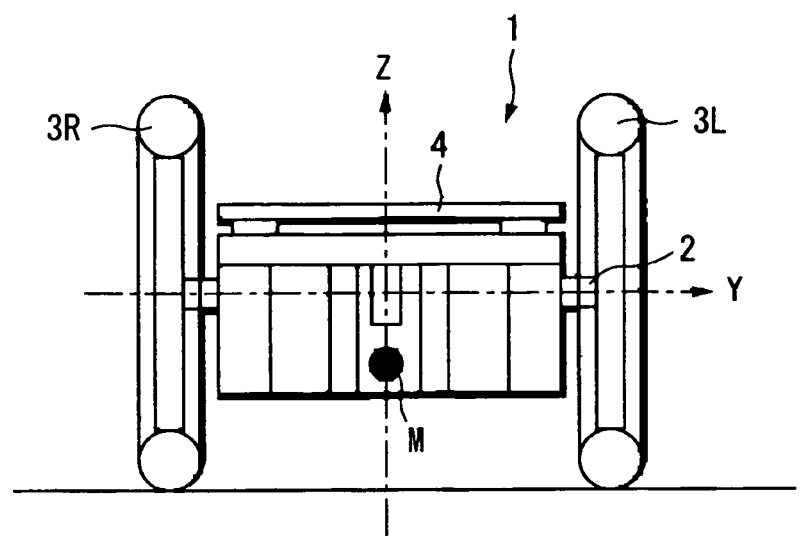
FIG. 27 is a diagram showing a positional relationship between a weight center and an axle of a two-wheeled vehicle.

Furthermore, with respect to the turn command generator and the travel positional command generator in FIGS. 23A and 23B, the turn command is performed by means of the coordinate position Yg of the Y-axis of the barycentric position obtained from the pressure sensor. A value of the coordinate signal Yg of the pressure sensor is handled as PM and the motors are rotated to make a turn by the following formulas.

In other words, in the case of travel velocity Vref(t)=0, the commands of the right wheel and the left wheel Rref1 and Rref2 become the opposite phase commands having different signs shown in the following formulas.

$Rref1(t)=PM \times G0 \times t$ [rad]: right wheel command ($G_0$ is a positive constant. $PM=Yg$)

$Rref2(t)=-PM \times G_0 \times t$ [rad]: left wheel command

Hereupon, in the case of travel velocity Vreft≈0, the commands of the right wheel and the left wheel Rref1(t) and Rref2(t) become the same phase commands having the same sign as shown in following formulas. If the signs of Pref1 and Pref2 become different from each other as a result of the operation of the following formulas, a command having an opposite sign to the sign of Prefx(t) as the result of the operation is made to be zero.

Rref1(t)=Prefx(t)+PM×G1×t [rad]: right wheel command, where the sign of Pref1 and the sign of Prefx are the same. When those are different, Pref1=0. G1 is a positive constant.

Rref2(t)=Prefx(t)−PM×G1×t [rad]: left wheel command, where the sign of Pref2 and the sign of Prefx are the same. When those are different, Pref2=0. G1 is a positive constant.

Subsequently, in order to reduce an error of the turn velocity due to a state of a road surface or a difference in air pressure between the right and left wheels, the turn velocity control ωyaw is performed by applying the control of the turn velocity ωyaw. The turn velocity control can be performed by carrying out the following control operations of Rref1(t) and Rref2(t) which are obtained from the above formulas. Here, with respect to the turn velocity of the vehicle, θyaw is a yaw axis gyroscopic sensor signal detected by the gyroscopic sensor of the yaw axis mounted on the table.

In other words, the turn velocity ωyaw can be controlled by carrying out the following operations comparing the θyaw signal to each of Vref1(t) and Vref2(t), when differentiated signals of Rref1(t) and ref2(t) are put as Vref1(t) and Vref2(t).

ωerr=(Vref1(t)−Vref2(t))−θyaw [rad/sec]

Rref1(t)=Prefx(t)+PM×G1×t−ωerr×G2×t [rad]: right wheel command (G2 is a positive constant)

Rref2(t)=Prefx(t)−PM×G1×t+ωerr×G2×t [rad] left wheel command

The right and left tires are rotated at the rotational velocity Ω1 and rotational velocity Ω2 [rad/sec] by those Rref1(t) and Rref2(t) (refer to FIG. 17). The turn radius R and the turn velocity ωyaw are determined according to a difference between those Ω1 and Ω2. Moreover, since the upper limit of the turn velocity ωyaw is defined by the turn velocity determined in FIG. 18, the rider can make a turn while maintaining the posture stably.

The actual turn velocity of the vehicle is detected by the gyroscopic sensor of the yaw axis incorporated in the vehicle, and in comparison to a turn velocity having a possibility of falling down obtained by the above described operations, when the actual turn velocity of the vehicle exceeds the dangerous turn velocity, the difference value between the above described Rref1(t) and Rref2(t) or the velocity is reduced to lessen the application of centrifugal force, so that the rider can maintain the posture stably. The operation formulas thereof are described by the following formulas.

eref=Rref1(t−1)−Rref2(t−1), where (t−1) is a command value at the time t−1

Rref1(t)=Rref1(t−1)−eref [rad]

Rref2(t)=Rref2(t−1)+eref [rad]

or,

Rref1(t)=Rref1(t−1)×G3 [rad]: G3 is an attenuation coefficient of 0≤G3<1.

Rref2(t)=Rref2(t−1)×G3 [rad]

Therefore, in this embodiment, when the turning travel is performed according to the shift of the barycentric position to the right and left, it is detected that the barycentric position has come close to the position of the wheel, and the rotational velocity of the wheel is restricted, so that an abrupt turn that the rider may fall down by the centrifugal force is prevented from occurring and stable traveling can be obtained without fail.

Accordingly, a possibility in conventional apparatuses that the rider may fall down by the centrifugal force when making an abrupt turn, is easily removed.

Figure 50:
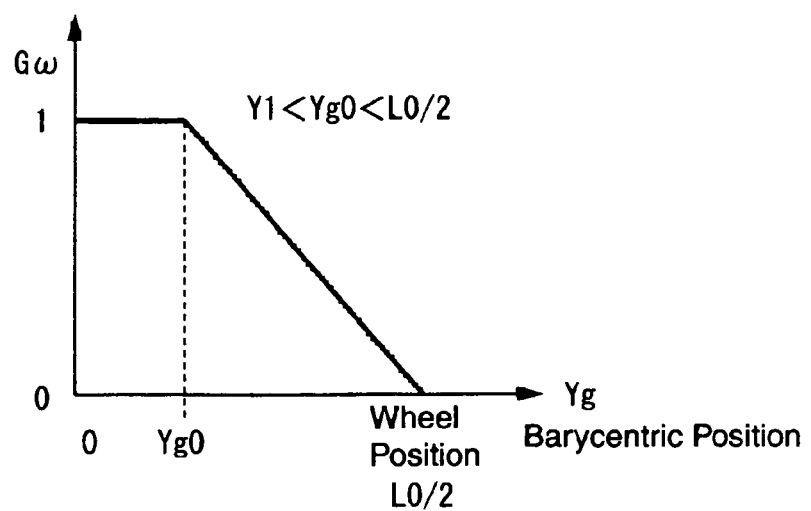
FIG. 50 is a graph showing a change of a turn velocity adjustment coefficient Gω.
Figure 51:
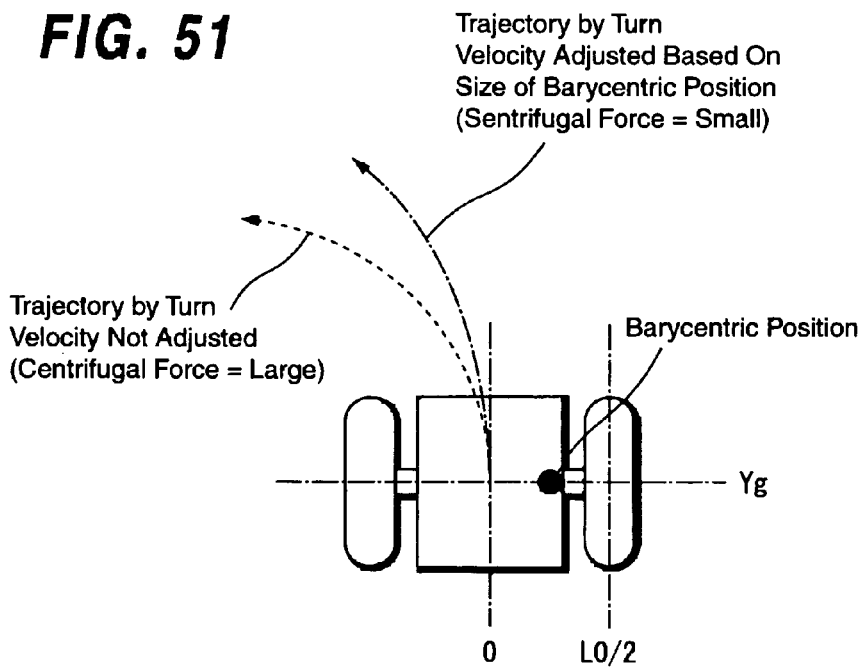
FIG. 51 is a trajectory diagram according to the turn velocity that is adjusted based on a size of a barycentric position.

Further, in the above described embodiment, a change in a turn velocity adjustment coefficient Gω is shown in FIG. 50. Specifically, with respect to a load signal in the above described load sensor, a resultant force made of the centrifugal force and a man's weight is applied to the base. When the application point thereof is detected, the barycentric position becomes close to the tire position as shown in FIG. 51, in the case where the man falls down by the centrifugal force. In this case, when the barycentric position shifts to the outside of the tire position, the rider falls down. In order to prevent the falling down from occurring, the turn velocity adjustment coefficient Gω such as the one shown in FIG. 50 is adjusted by reducing the turn velocity such that the barycentric position can not come close to the tire position when making a turn, so that the rider can make a turn stably.

Figure 52:
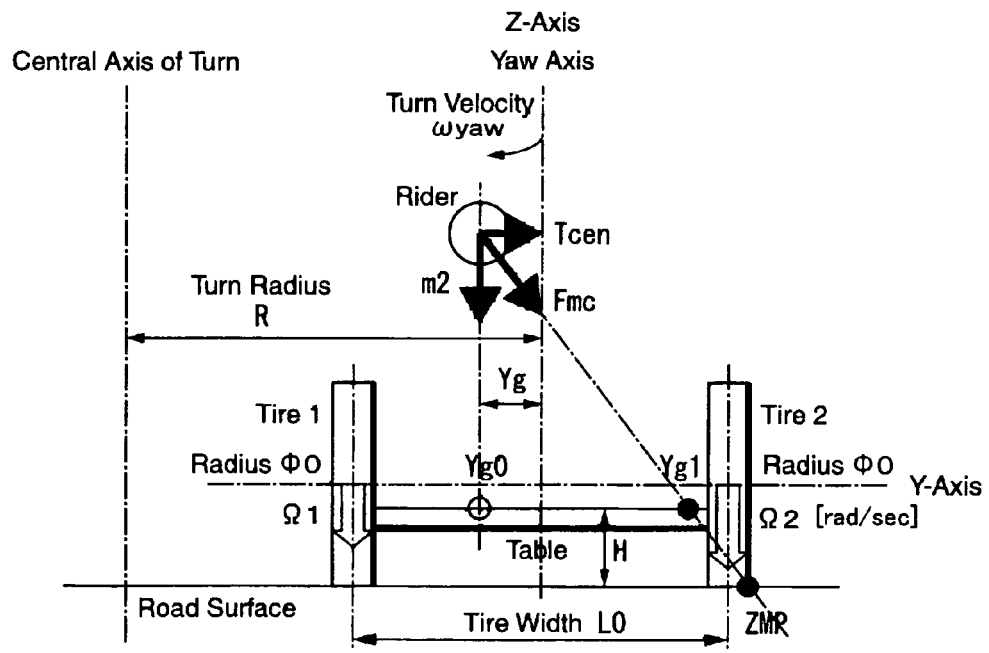
FIG. 52 is a diagram showing a relationship among the barycentric position, turn velocity and a load position.

Further, a relationship among the barycentric position, the turn velocity and the load position is shown in FIG. 52. In FIG. 52, when a ZMP position, which is a point where a vector Fmc of a resultant force made of a centrifugal force vector Tcen applied to the rider's barycentric position and a gravitational vector m2 is applied to the road surface, is outside the ground-contacting positions between both tires, the body of the table and the rider fall down in the centrifugal direction by the centrifugal force. Moreover, when the ZMP position in FIG. 52 is between the both tires, the posture can be kept stable.

However, there is such a problem that the rider may shift the posture up and down and/or from side to side or an actual barycentric position can not be measured directly due to a height difference between an adult and child. In order to solve the above problems, a load position Yg1 on the table, which becomes the ZMP position on the road surface, is detected using the pressure sensor disposed on the table, so that it becomes possible to distinguish whether the ZMP is at a position outside the tires or not.

In other words, when the centrifugal force is zero and the load position is Yg0 in FIG. 52, the ZMP is judged to be between both tires, and when the centrifugal force is generated, the load position changes to Yg1. This changed load position Yg1 on the table is detected by the pressure sensor disposed as shown in FIG. 49, so that it is possible to distinguish the ZMP position in the range of falling down. Thus, the turn velocity that is Yg and the turn velocity Gω of FIG. 50 is adjusted according to the position of Yg1, so that the rider can be prevented from falling down.

Thus, according to the above described embodiment,

1. Even if an abnormality occurs in the control unit to be unable to operate, the vehicle stops by the friction of the tires and the vehicle is kept to have the barycentric position at the most stable position due to the reason that a gravitational center exists on or below the wheel axle, so that the vehicle is kept horizontal by the friction of the tires not to fall down easily and a serious accident can be prevented from occurring.

Figure 53B:
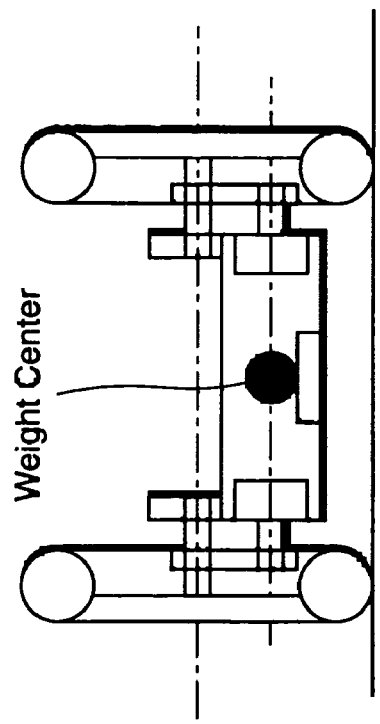
FIGS. 53A and 53B are diagrams showing the relationship among the barycentric position, turn velocity and load position.
Figure 53A:
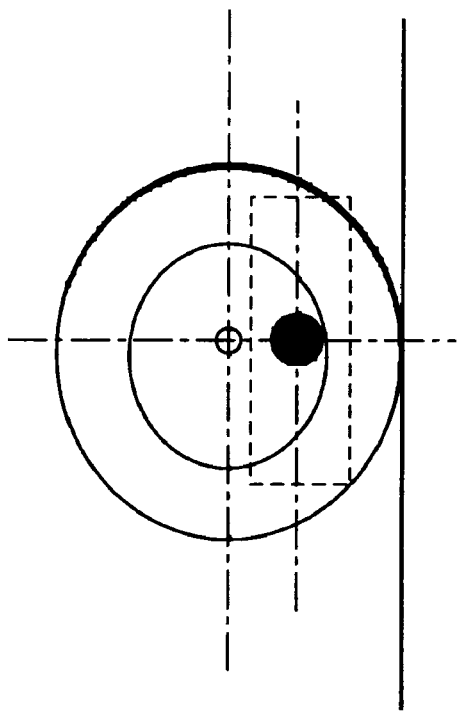

2. When the motor torque is generated by the motor to drive the wheel, the vehicle can move with keeping the posture in which the barycenter is stable.
3. When the motor torque is generated by the motor to drive the wheel, the vehicle can move with keeping the body horizontal.
4. Since the load can be detected, stable and constant performance is maintained against a fluctuation of the load (refer to FIGS. 53A and 53B).
5. Even if a man does not ride, traveling can be performed stably by means of the pressure sensor.
6. Even if there is no handle equipped, a man can operate the vehicle using the pressure sensor by shifting the barycentric position of his/her weight to decide both the travel direction and the travel velocity based on the barycentric position thereof or by changing the right and left barycentric position at the time of a halt to perform driving for a turn.
7. Even if there exists a difference in the radius of two tires due to the difference in air pressure of two wheels, traveling straight can be carried out by the feed-back control over the gyroscopic sensor of the yaw axis to make the rotational velocity of the right and left wheels variable. Further, even if there exists a difference in road surface with respect to the right and left wheels, the traveling straight can be carried out by making the rotational velocity of the right and left wheels variable.
8. Due to a flexible tire, the ground-contacting area with the road surface becomes large and therefore a rolling frictional resistance becomes large. Therefore, if the man rides, the vehicle can stand stably.

Further, in the above described embodiment, such structure as shown in FIGS. 54A and 54B can be employed for the tires. The tire shown in FIGS. 54A and 54B is formed of a rubber material (such as natural rubber or chloroprene rubber) having flexibility and vibration-proof quality and has the structure including a concavo-convex surface in which a convex portion is disposed in turn by shifting the position alternately on the right side and on the left side. Moreover, a central portion of the tire becomes a groove, and an unevenness of the road surface is absorbed by the projecting portions of the vibration-proof rubber to prevent vibration. The central portion functions as the groove, and areas of the concave and convex portions have the same area ratio.

Furthermore, the tire has such a characteristic in which with respect to the ground-contacting portion between the tire and the road surface, the contacting area can be made large by the transformation of the convex portion due to the weight of the vehicle so that the rolling frictional resistance increases; and if the tire rotates in the clockwise direction (CW) and in the counterclockwise direction (CCW), and if the tire has the concavo-convex surface due to a phase difference on the right side and on left side, a uniform road surface resistance can be obtained; so that the posture of the vehicle can be easily controlled by means of the inverted pendulum control or by means of the ZMP (Zero Moment Point) control by the vehicle. In addition, since a grooved area and a projected area of the tire are equal, the projection of the portion in contact with the road surface is transformed to fully contact with the road surface, thereby increasing the rolling friction.

With the above tire structure, since large rolling friction is obtained, the stable posture can be maintained. Further, according to such structure, low rigidity is obtained with respect to the X-axis and the rigidity in the direction of the Y-axis can be made high, so that the vibration of the vehicle regarding the Y-axis and a sway regarding the roll axis can be reduced.

Thus, according to the above described traveling apparatus, a traveling apparatus includes: a means for driving a plurality of wheels independently and a chassis connecting the plurality of wheels, in which a means for detecting a barycentric shift of a rider is provided in the chassis to perform traveling by respectively setting rotational velocity of the plurality of wheels in accordance with information on the detected shift of the barycenter, wherein turning is performed in accordance with a shift of the barycentric position to the right and left and also a control means is provided for detecting that the barycentric position has come close to the position of the wheels and for restricting the rotational velocity of the plurality of wheels to a predetermined limites value, so that the occurrence of an abrupt turn in which the rider may fall down by the centrifugal force can be prevented and stable traveling can be obtained without fail.

Furthermore, according to the method for controlling the above described traveling apparatus, a method for controlling a traveling apparatus is provided in which the traveling apparatus includes a plurality of wheels independently driven, a chassis connecting the plurality of wheels, and the chassis is provided with a means for detecting barycentric shift of a rider to perform traveling by respectively setting rotational velocity of the plurality of wheels in accordance with information on the detected barycentric shift, wherein turning is performed in accordance with a shift of the barycentric position to the right and left and the barycentric position that comes close to the position of the wheels is detected to restrict the rotational velocity of the plurality of wheels to a predetermined limites value, so that the occurrence of an abrupt turn in which the rider may fall down by the centrifugal force can be prevented and stable traveling can be obtained without fail.

Figures 55A, 55B:
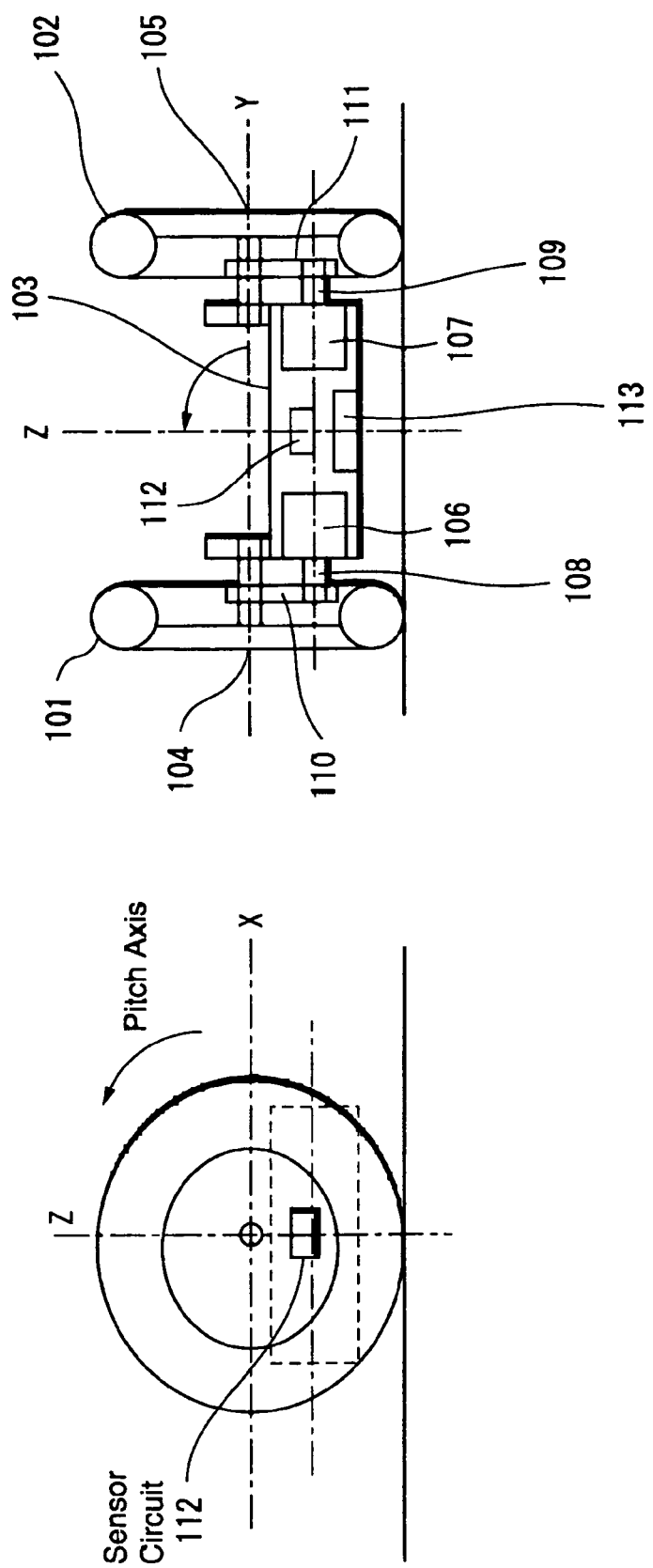
FIGS. 55A and 55B are diagrams showing a structure of an embodiment of a coaxial two-wheeled vehicle to which a traveling apparatus and a method for controlling thereof according to the present invention is applied, in which 55A is a front view and 55B is a lateral view.

Hereinafter, another explanation is made to the present invention by referring to accompanied drawings. FIGS. 55A and 55B are diagrams showing a structure of another embodiment of a coaxial two-wheeled vehicle to which a traveling apparatus and a method for controlling thereof according to the present invention are applied, where FIG. 55A is a front view and FIG. 55B is a lateral view.

For example, right and left wheels 101 and 102 are provided in FIGS. 55A and 55B. Those two wheels 101 and 102 are arranged such that respective wheel axles 104 and 105 are disposed on a straight line of a table (chassis) 103. Further, right and left motors 106 and 107 are respectively disposed close to the wheels 101 and 102 on the table 103, and rotary shafts 108 and 109 of those right and left motors 106 and 107 are connected to the wheel axles 104 and 105 respectively through transmission portions (reducers) 110 and 111, so that the wheels 101 and 102 can be rotationally driven.

Further, a sensor circuit 112 of such as a gyroscopic sensor or an acceleration sensor to detect a posture of a rider is mounted on the table 103. Further, a sensor signal detected by the sensor circuit 112 is supplied to a control unit 113 to perform a control over driving of the motors 106 and 107, to perform a control over a posture of the table 103 with respect to the roll axis and the pitch axis, and to perform a control over charging a secondary battery 115 (not shown in the figure) with regenerative energy by a charging circuit 114 (not shown) which is disposed close to the control unit 113.

Figure 45:
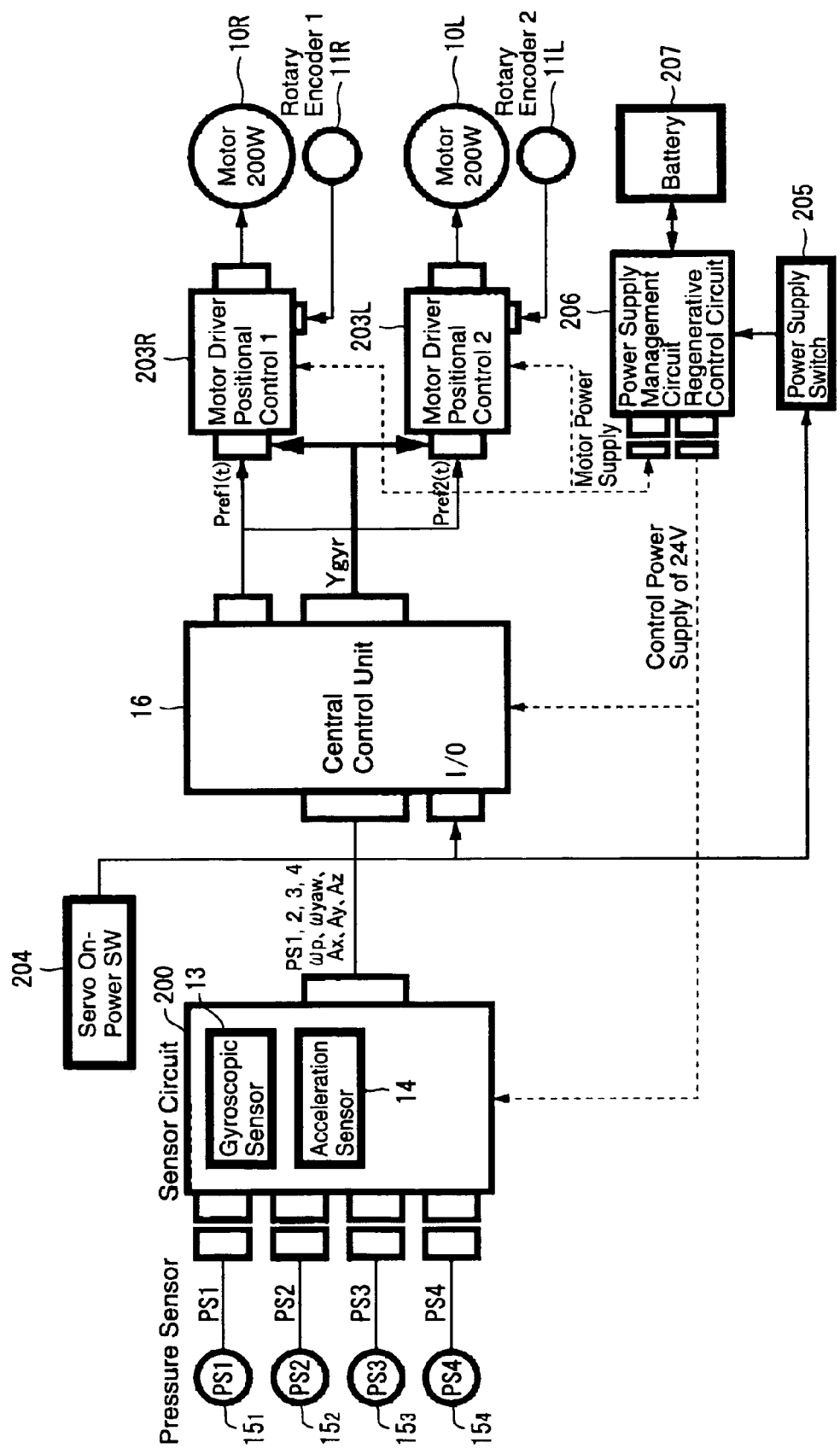
FIG. 45 is a diagram for explaining the whole configuration of each circuit in a coaxial two-wheeled vehicle 1.

Further, a system configuration of the whole apparatus of another embodiment of the coaxial two-wheeled vehicle to which the traveling apparatus and the method for controlling thereof according to the present invention are applied is similar to the one shown in the above mentioned FIG. 45. Then, in such apparatus, a specific operation is performed as explained hereunder.

Figure 56:
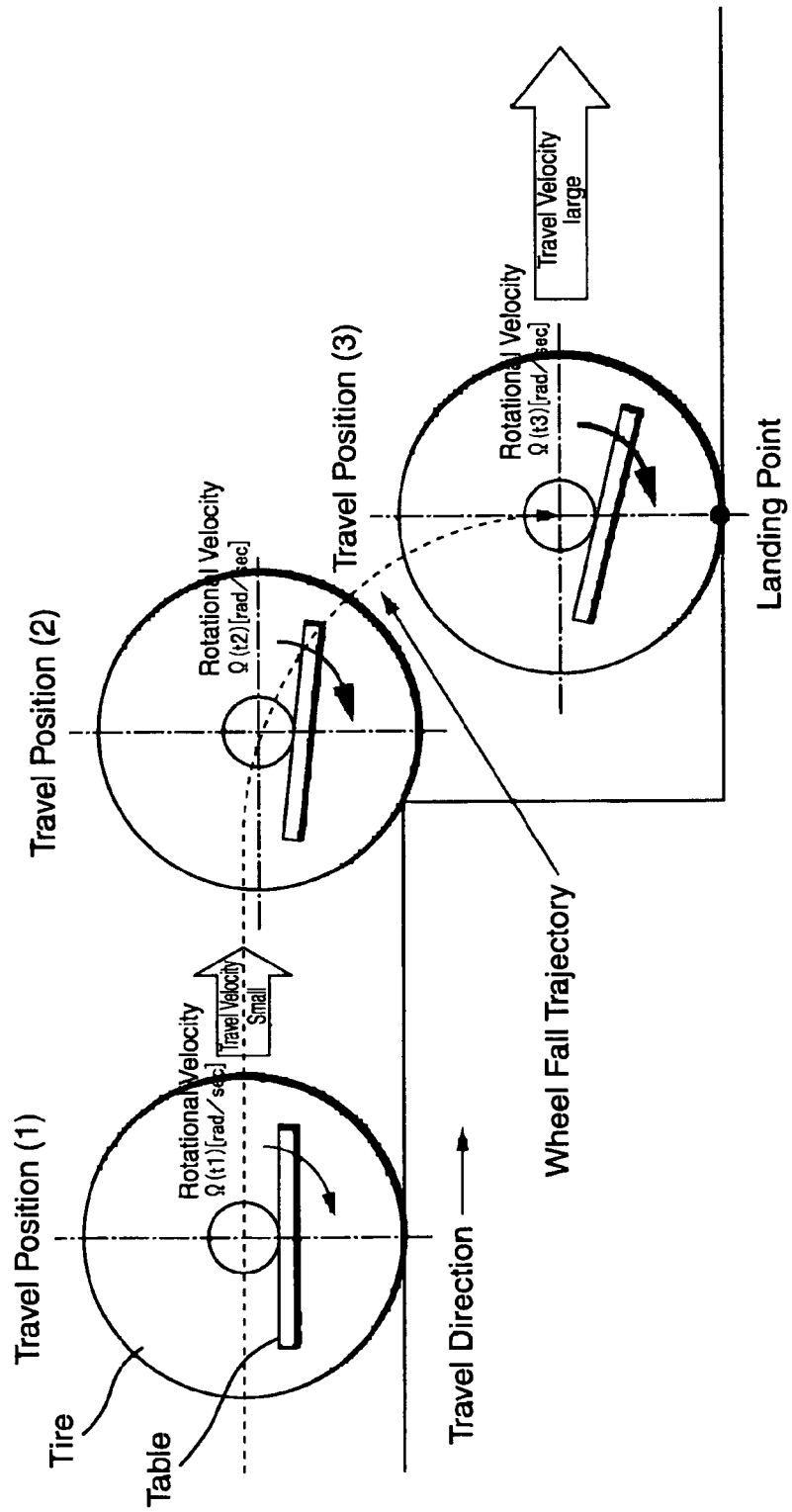
FIG. 56 is a diagram for explaining a change of a traveling state on a road surface having a level difference by a control of an inverted pendulum.

Specifically, as shown in FIG. 56, when the two-wheeled vehicle driven by the motor control performs traveling on a floor having a level difference, the vehicle is subjected to a natural fall with a trajectory determined by the travel velocity. At this time, since the floor reactive force of the table is lost, the posture cannot be maintained using the motor control. Further, since the floor reactive force does not exist during the fall, the motor is driven to a high velocity rotation and becomes an unstable state if a table postural angle changes.

On the other hand, since a rotational direction and a rotational velocity of the motor at this time changes depending on the table postural angle, a direction at a time of landing cannot be determined and as a result the vehicle becomes extremely unstable to cause a problem that the rider may fall down to induce a disaster. The present invention proposes a method for controlling the traveling apparatus safely to avoid such dangerous state.

With respect to a conventional apparatus, the two-wheeled traveling vehicle has been controlled by the control principle of the inverted pendulum. In the inverted pendulum control, when there is a considerable level difference on the floor as shown in FIG. 56 for example, the rider tends to take an inclined posture in the forward direction (travel direction) at a position just before falling (travel position (2)), and therefore a force to move forward at high velocity in the direction of falling is applied to the wheel by a control operation.

Due to the above, the vehicle lands in a state where the motor is driven at high velocity rotation and is made to move forward at high velocity at the time of landing. Thus, when the vehicle moves forward at high velocity at the time of landing, the rider becomes incapable of maintaining the posture and he/she is exposed to a danger of falling down to face an extremely dangerous situation. In order to solve such problem, the postural control by the ZMP is used in the present invention instead of the control by the inverted pendulum.

In other words, a falling state is presumed by using state signals (postural position, position/velocity/acceleration of X-Y-Z axes, angle/angular velocity/angular acceleration of pitch-roll-yaw axes) of the vehicle at this time and the control is performed such that the wheel is not driven to high velocity at the time of falling, so that the travel velocity at the time of landing can be restrained to land safely.

In addition, in case of the control by the inverted pendulum, when the vehicle advances in the travel direction and when the posture changes at a point of time when there is a level difference, the control is performed to maintain the posture, thereby making a tire rotational velocity $\Omega(t)$ [rad/sec] a high velocity rotation. Because of the above, the vehicle moves at such a high travel velocity as the one shown by an arrow due to a road surface reactive force at the time of landing and the rider is in a dangerous state.

Figure 57:
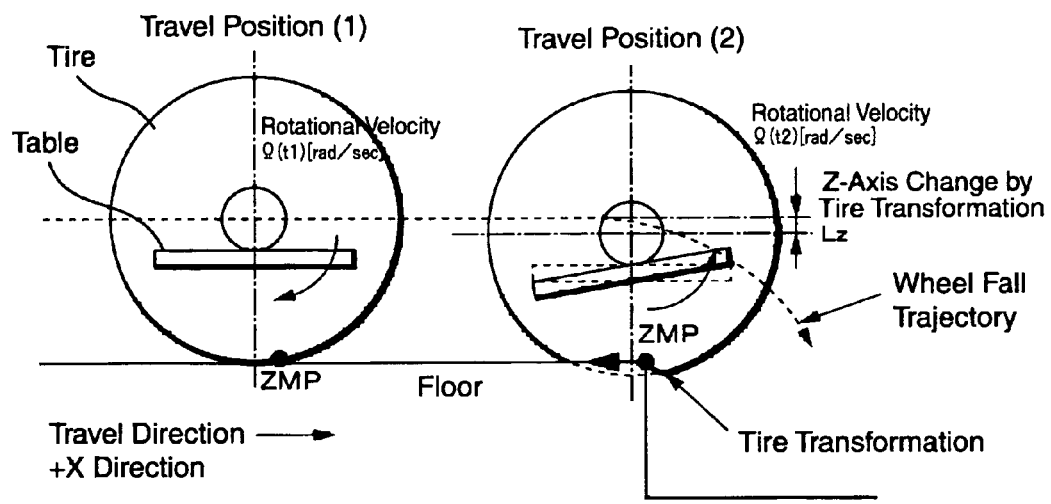
FIG. 57 is a diagram for explaining a control over traveling on a floor having a level difference by a control of a ZMP.

Hereupon, when there is the level difference, a floor area becomes small at a position of the level difference on the floor as shown in FIG. 57. Then, the tire is transformed to generate a change on the Z-axis (travel position (2)). Further, the vehicle body further advances to move forward in the direction of falling, the tire is transformed further and the change on the Z-axis becomes larger. Thus, the change on the Z-axis is detected, the level difference can be recognized, the falling state can be predicted in advance, and the rotational velocity of the wheel can be controlled to land safely. In other words, since the ZMP can be controlled to be kept on the floor reaction force from the travel position (1) to the travel position (2), the posture can be maintained stably.

On the other hand, the change on the Z-axis is generated at the travel position (2) and is detected by the Z-axis acceleration sensor. Since the position of the level difference can be thus specified, the table angle can be changed at the travel position (2) as shown in FIG. 57 to change the posture such that the rider's barycentric position is in the direction to avoid the fall. At this time, the ZMP changes into such a direction shown by an arrow at the travel position (2), and a falling velocity from the level difference is attenuated. Thus, by changing the ZMP, the vehicle can be moved in the direction in which the state of falling from the level difference can be avoided.

On the other hand, when the velocity in the travel direction (+X direction) is increased, the level difference is crossed over to fall due to the inertial force of the vehicle and the rider. In such case, the table postural angle is changed at the travel position (2) in the same manner as described above to attenuate the travel velocity; however, when the travel velocity is increased, the ZMP exceeds the level difference to result in falling. In the falling state, a signal output of the acceleration sensor of the Z-axis rapidly changes and the falling state can be detected. When a fall acceleration [1G] (9.8 m/sec$^2$) is detected by the Z-axis acceleration sensor, a motor torque output is made to be zero.

Then, the tire can be easily rotated by an external force. Thus, when the landing is performed in a state where the motor torque is made into zero, the tire is rotated freely by the reactive force of the contacting road surface. Therefore, since the tire freely rotates by the floor reactive force at the time of landing to absorb kinetic energy, the floor reactive force from the road surface is attenuated to the rider.

Moreover, although the table postural angle changes depending on the rider's posture, the posture immediately before falling is maintained in the state of falling according to the law of inertia. In other words, since the rider is in a stable posture before falling, the rider falls with an appearance of the posture of that state. When the landing is performed in this state, the tire freely rotates in response to the condition of the road surface at the time of contacting the road surface, so that a change in X direction by the floor reactive force is absorbed and the posture can stably be maintained by the law of inertia.

Figure 58:
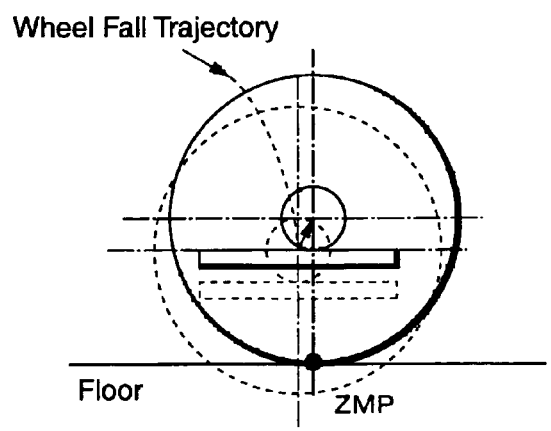
FIG. 58 is a diagram for explaining a postural control at a time of falling.

However, since there exists only an action for the rider to keep the posture stable after landing, the table postural angle becomes unstable. Therefore, the motor is required to recover the control promptly and to control the table postural angle stably. As shown in FIG. 58, change on the Z-axis is generated to make the tire transformed and restored in the state of landing and since the Z-axis acceleration sensor signal changes, the landing state can be detected. After landing, the motor promptly controls the posture so that the table postural angle can stably be controlled such that the ZMP is kept on the floor reactive force, as a result, the rider can maintain the posture stably.

Thus, it becomes possible that the rider continues the traveling while maintaining the posture even at the time of landing after the fall. Note that, the above description is based on the premise that at this time the rider prepares the posture for landing by changing the appearance to maintain the posture without depending on the table angle during the fall. Moreover, the control unit performs the control according to flow charts of FIGS. 59, 60 and 61, so that the posture can be maintained.

Figure 59:
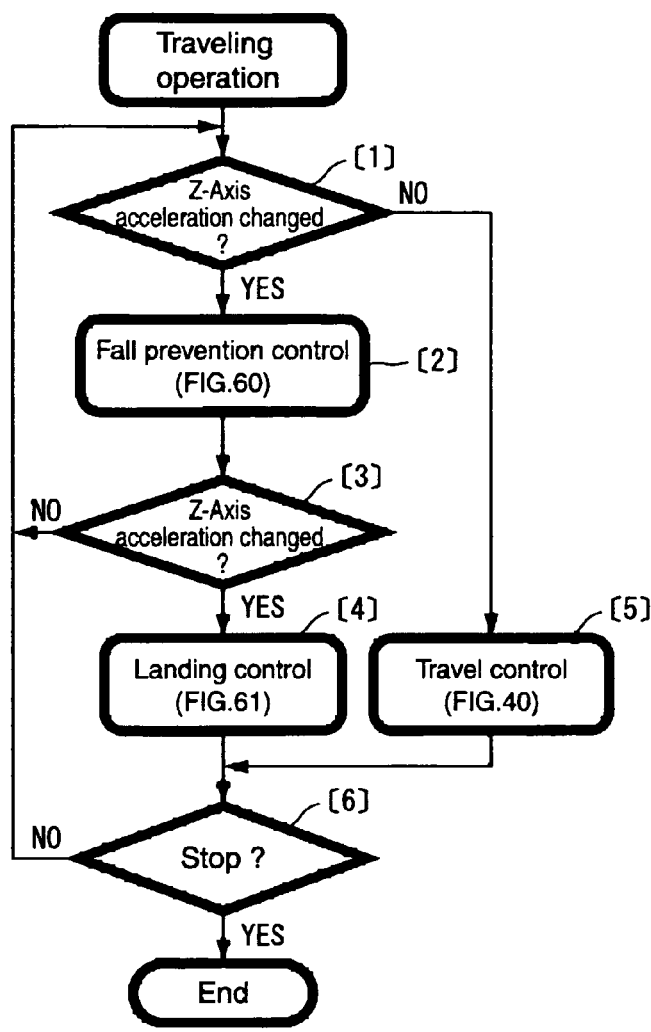
FIG. 59 is a flow chart of a traveling operation.
Figure 60:
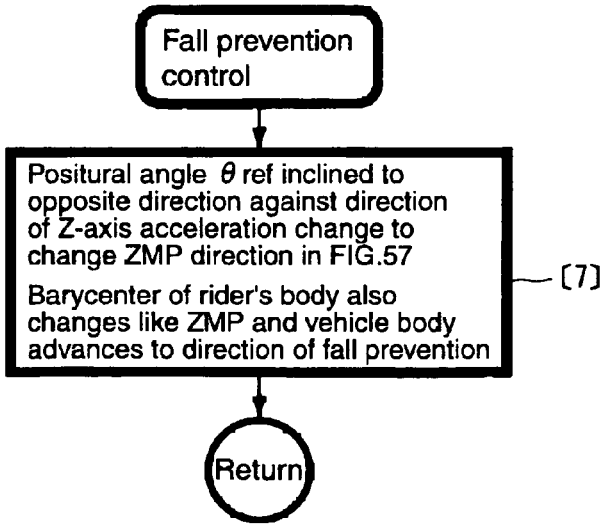
FIG. 60 is a flow chart of a fall prevention operation.

Specifically, in FIG. 59, it is judged at a step [1] whether or not there is a change in the Z-axis acceleration during a traveling operation, and when there is the change (Yes), a fall prevention control as shown in FIG. 60 is performed at a step [2]. Furthermore, it is judged again at a step [3] whether or not there is the change in the Z-axis acceleration, and when there is the change (Yes), a landing control as shown in FIG. 61 is performed at a step [4].

Figure 40:
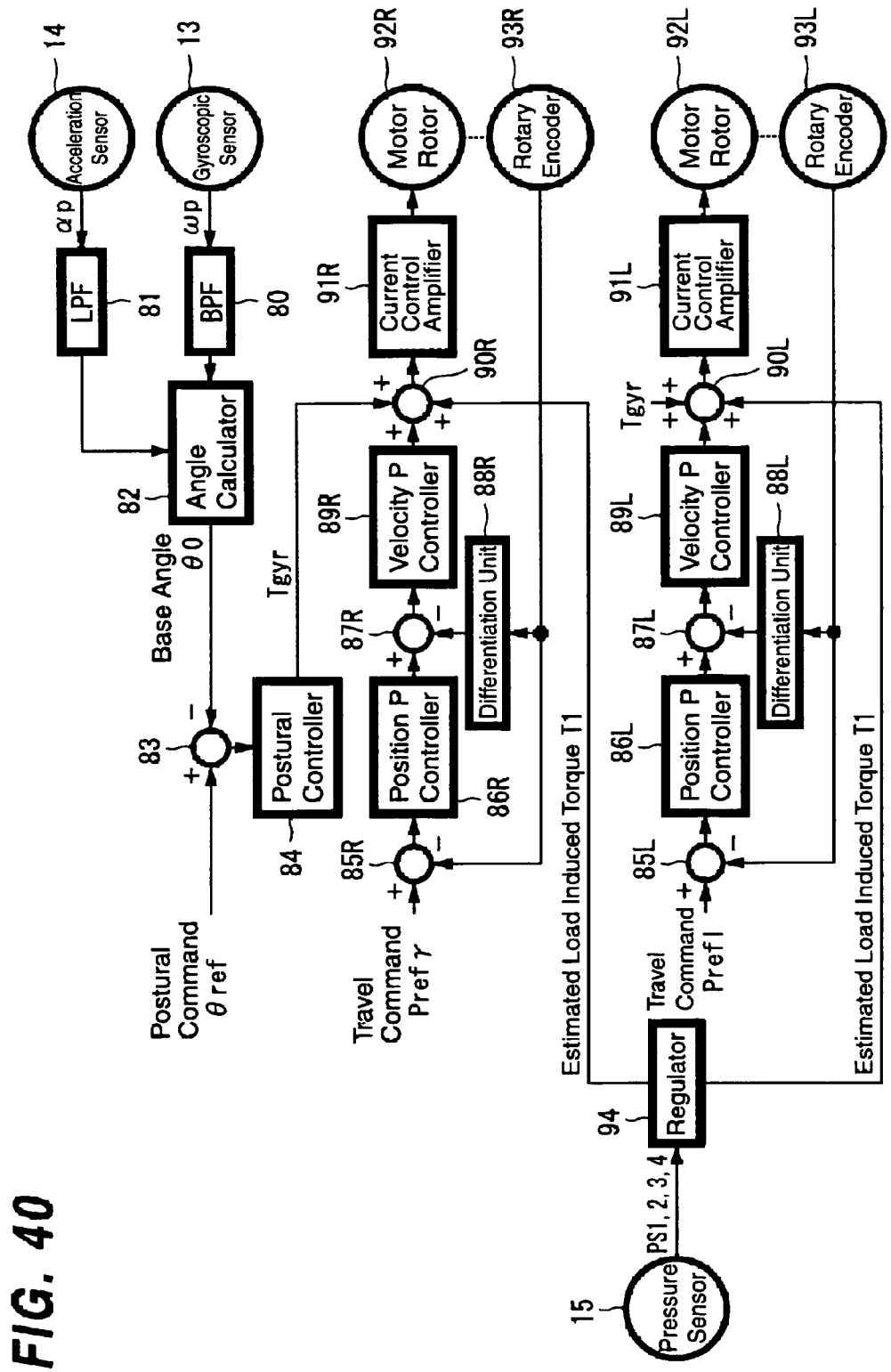
FIG. 40 is a block diagram showing a control mechanism for postural stabilization control and traveling control in the case where two wheels are provided.

In addition, when there is no change (No) in the Z-axis acceleration at the step [1], the travel control as shown in the above mentioned FIG. 40 is performed at a step [5]. Moreover, when there is no change (No) in the Z-axis acceleration at the step [3], the processing is returned to the step [1]. Furthermore, after the processing of the steps [4] and [5] is performed, it is judged at a step [6] whether or not the traveling is stopped, and when it is not stopped (No), the processing is returned to the step [1], but when it is stopped, the processing is ended.

Moreover, in the fall prevention control of the above mentioned FIG. 60, when this processing is required, a postural angle θREF is inclined in an opposite direction to the direction of the change of the Z-axis acceleration at a step [7] to change the direction of the ZMP as shown in FIG. 57. Accordingly, the barycenter of the rider's body also changes similarly to the ZMP so that the vehicle can advance in the direction of the fall prevention. Then, after the processing is completed, the flow is returned to an original routine. Thus, the fall prevention control of the step [2] is performed.

Figure 28:
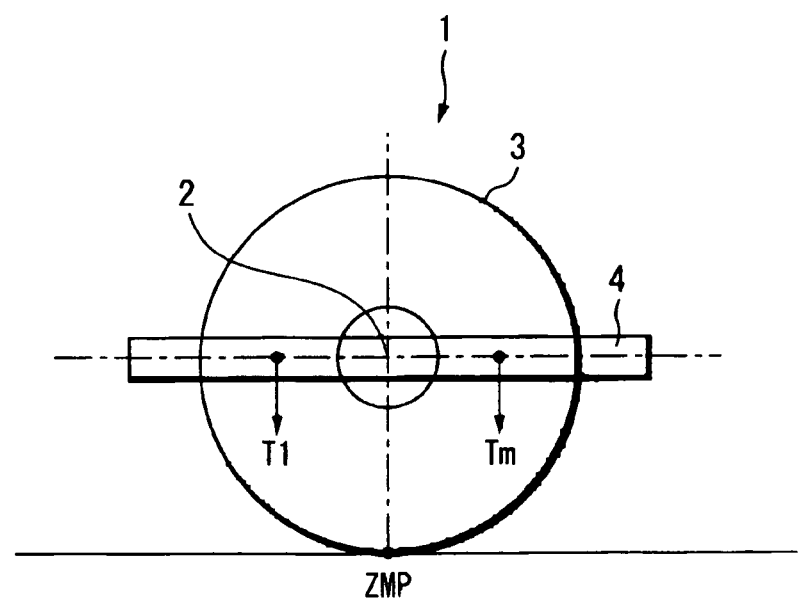
FIG. 28 is a diagram for explaining a balance between a load induced torque and a motor torque.
Figure 29:
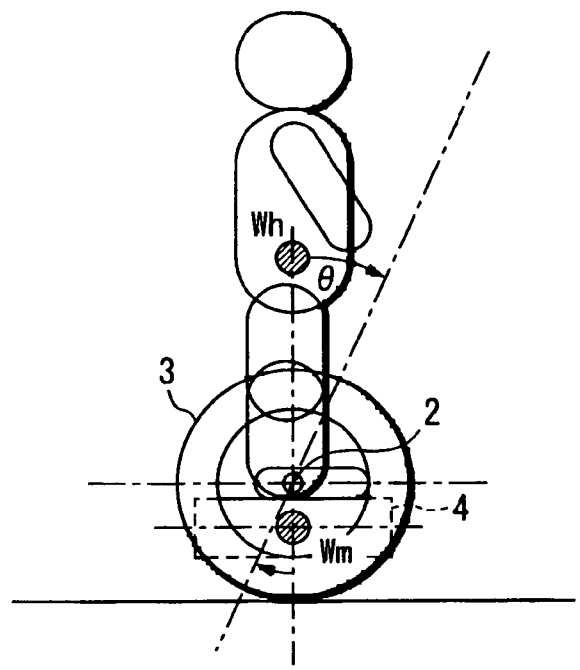
Figure 30:
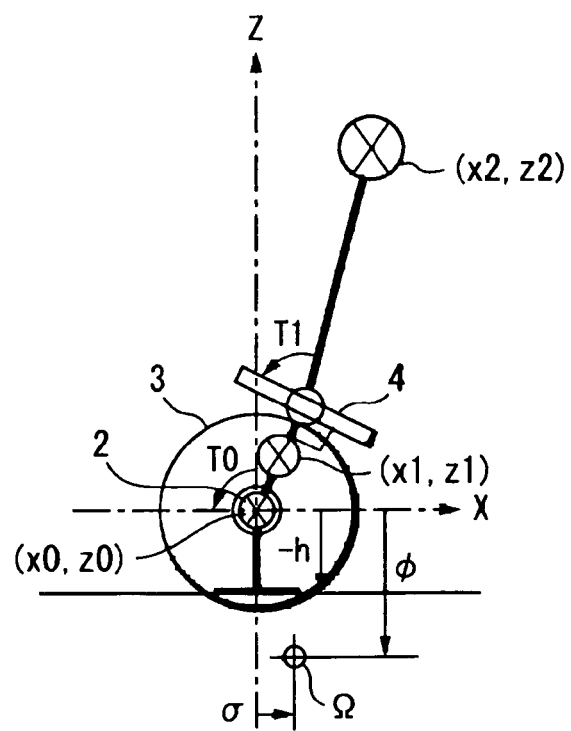
FIG. 30 is a diagram for explaining a dynamic model for maintaining a posture on a base.
Figure 31:
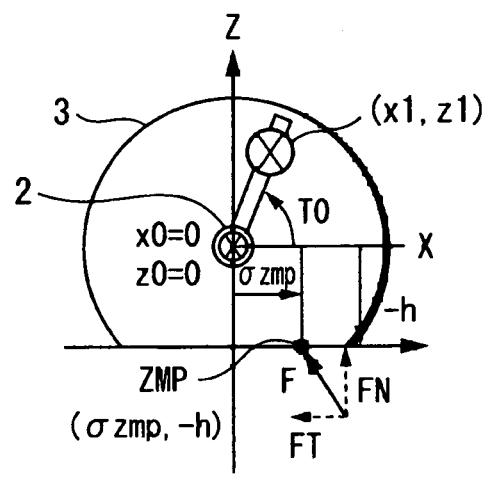
FIG. 31 is a diagram for explaining a dynamic model for maintaining a posture on a base.
Figure 32:
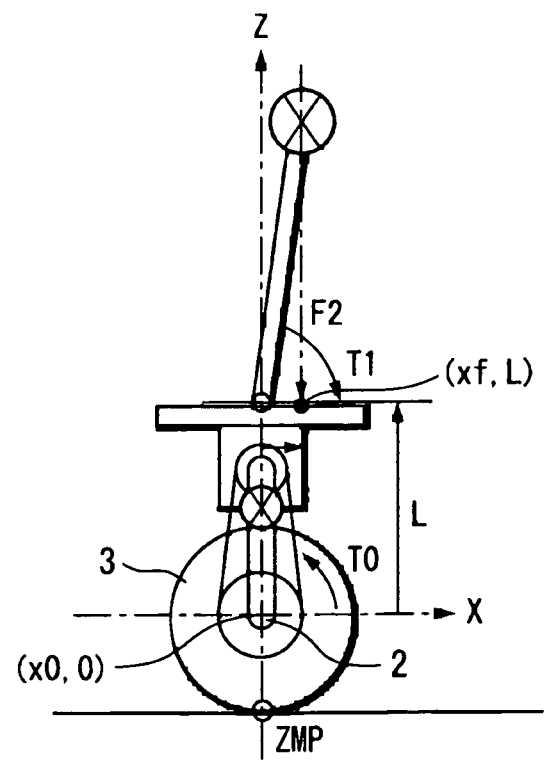
FIG. 32 is a diagram for explaining a dynamic model for maintaining a posture on a base.
Figure 33:
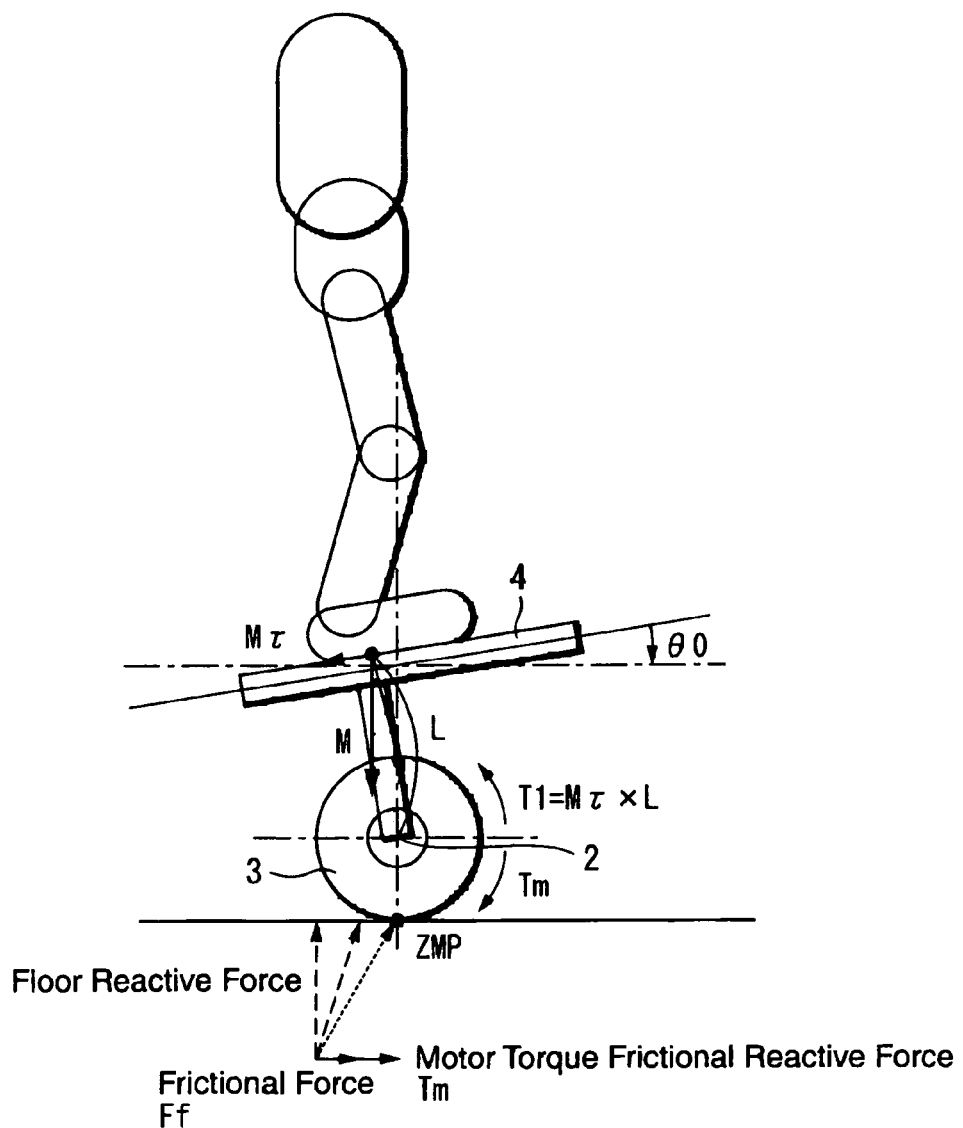
FIG. 33 is a diagram for explaining a dynamic model in a coaxial two-wheeled vehicle.
Figure 34:
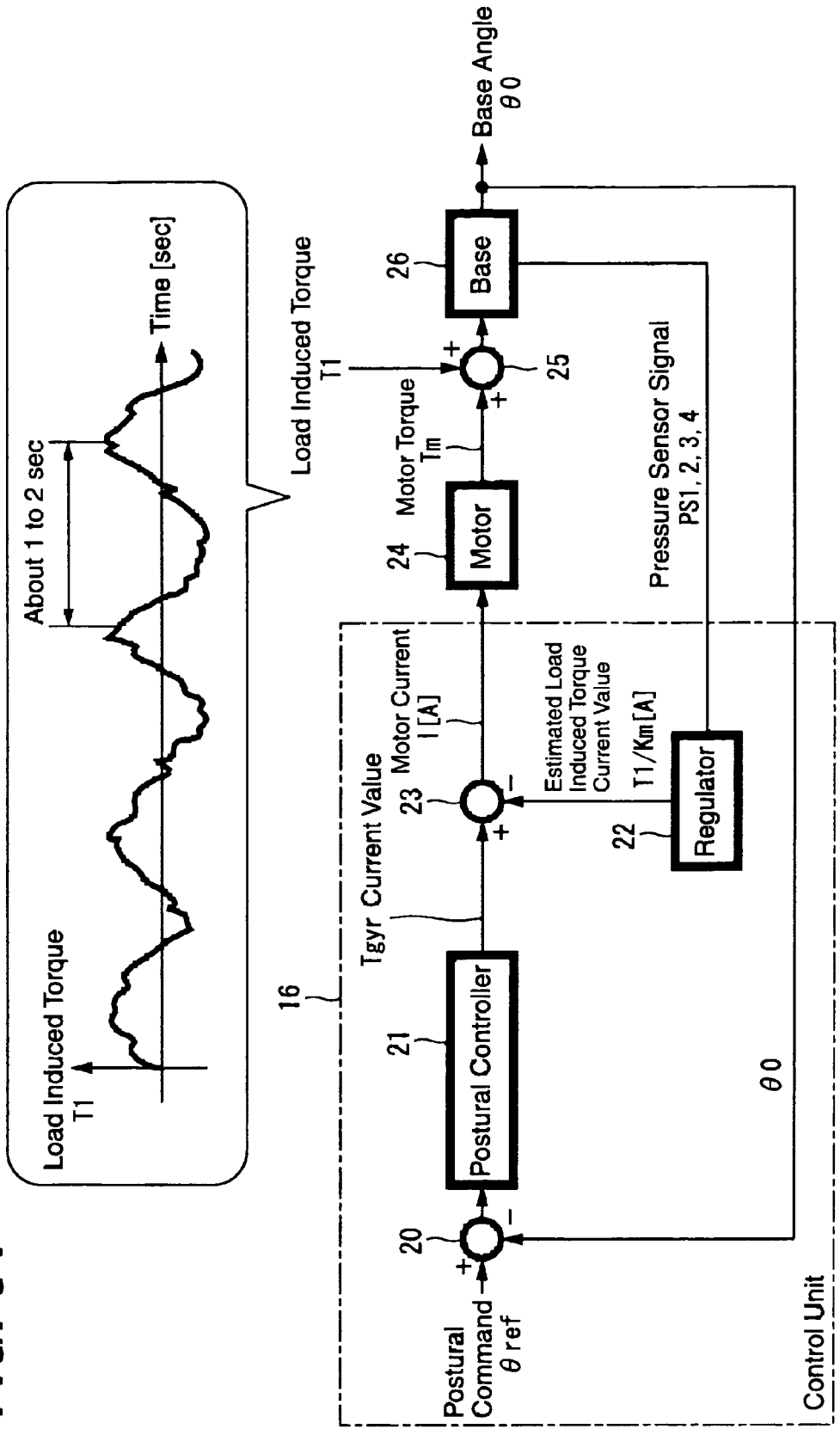
FIG. 34 is a diagram showing a control mechanism for postural stabilization control.
Figure 35:
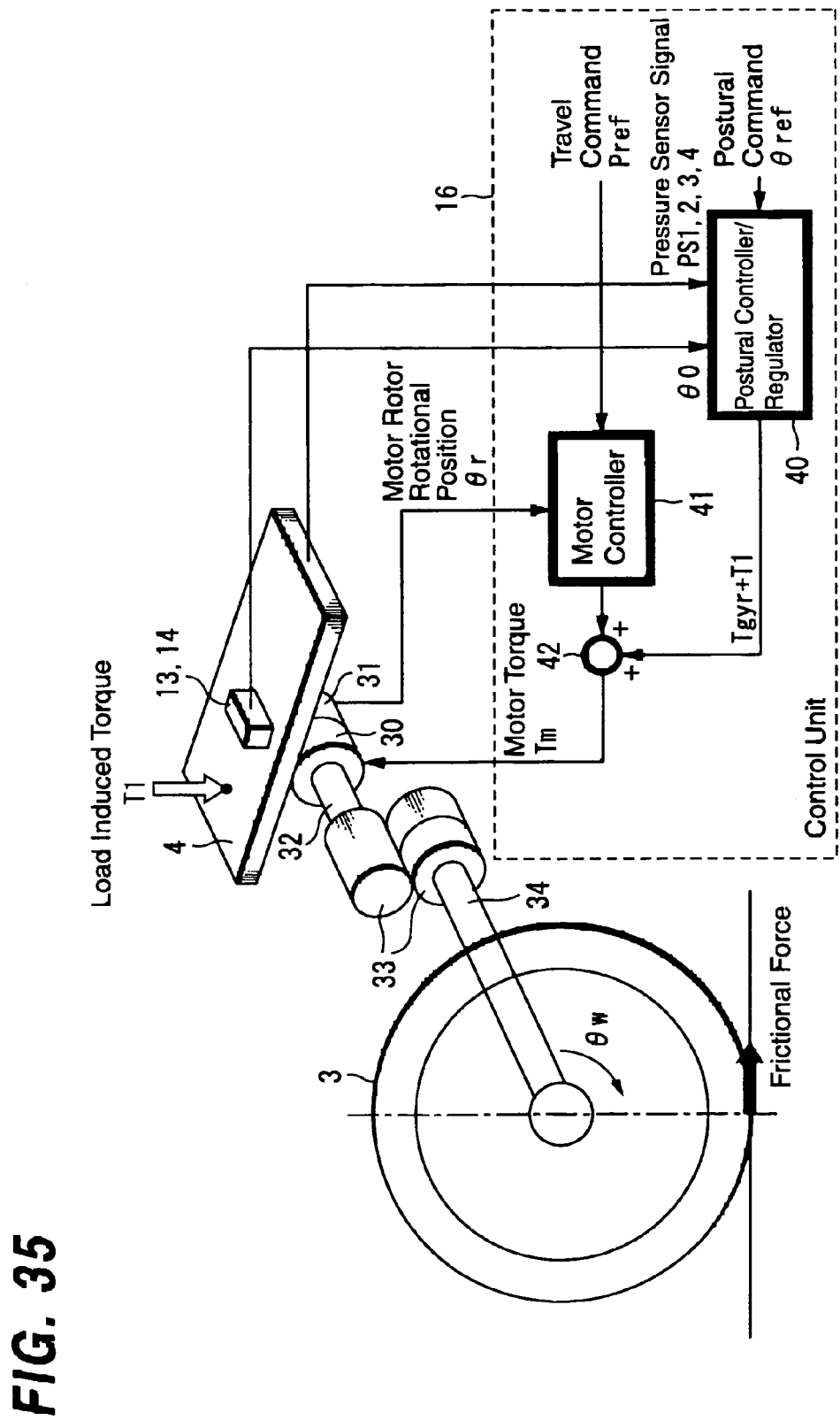
FIG. 35 is a diagram showing a control mechanism for postural stabilization control and traveling control in the case where only one wheel is considered to be provided.
Figure 36:
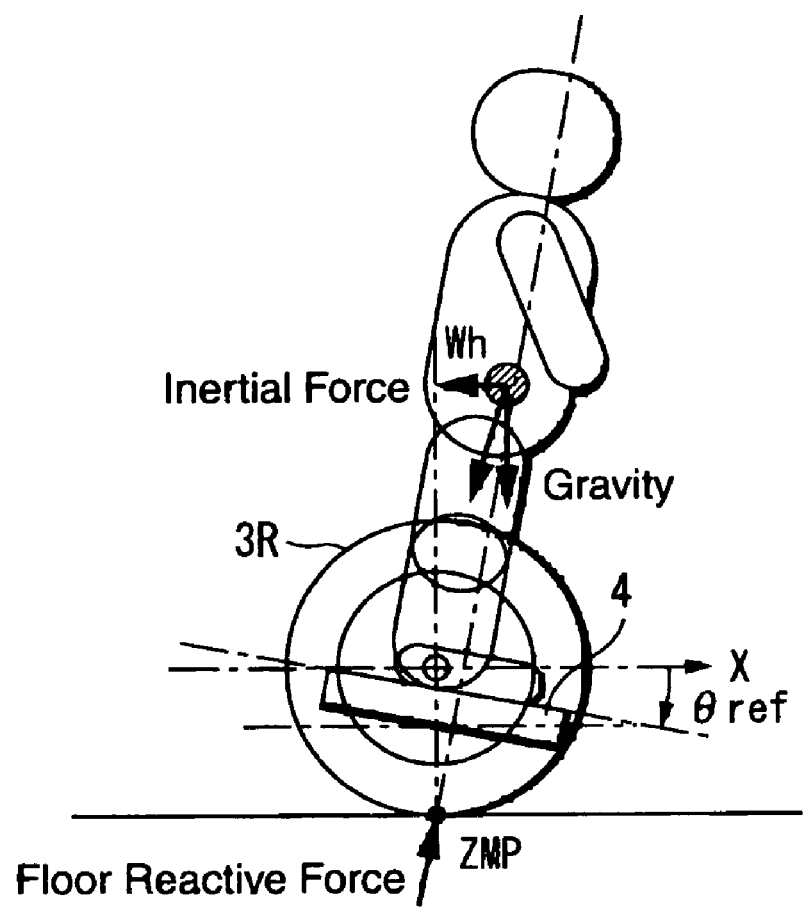
FIG. 36 is a diagram for explaining a postural command in a coaxial two-wheeled vehicle.
Figure 37:
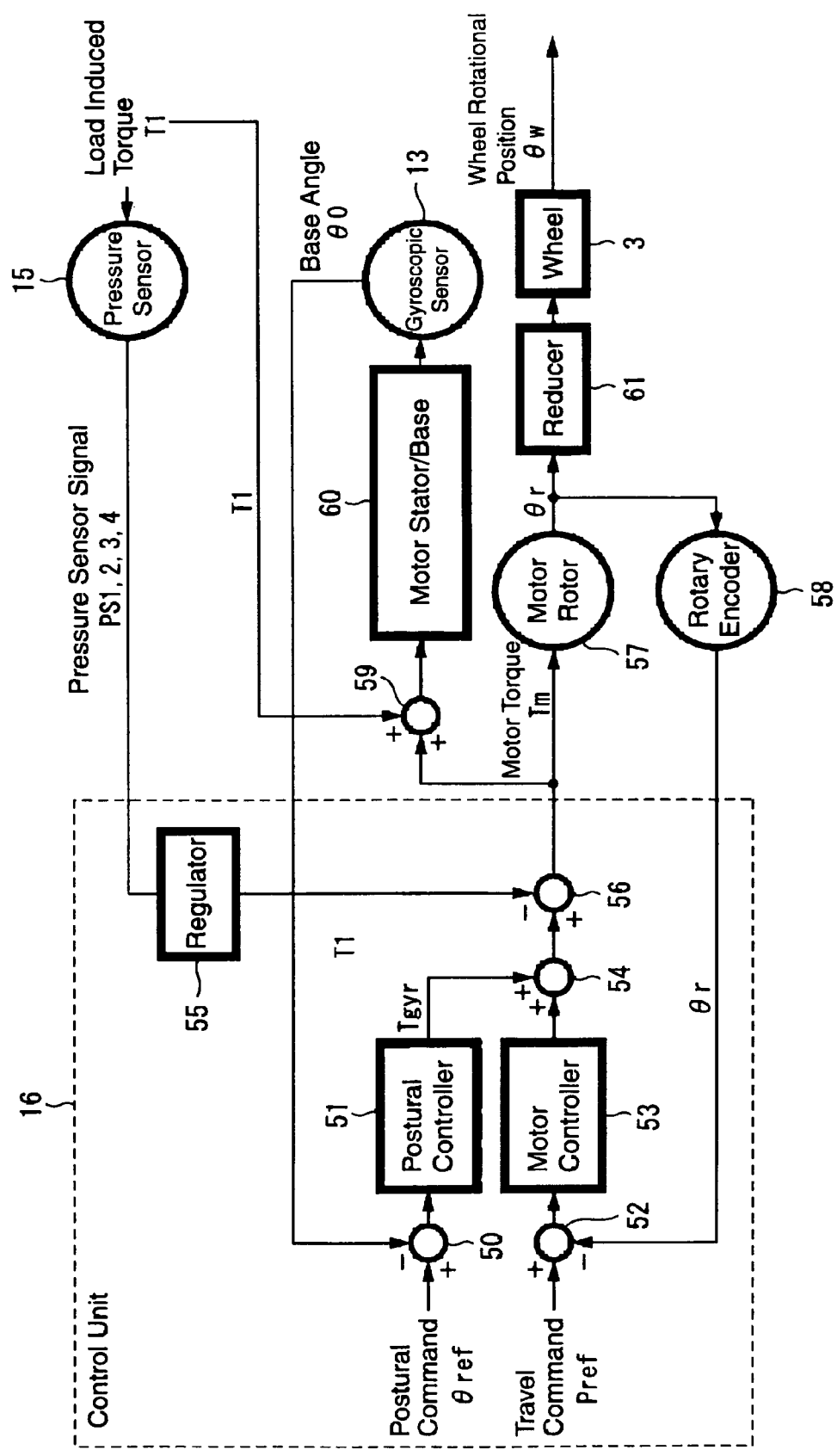
FIG. 37 is a block diagram showing a control mechanism for postural stabilization control and traveling control in the case where only one wheel is considered to be provided.
Figure 38:
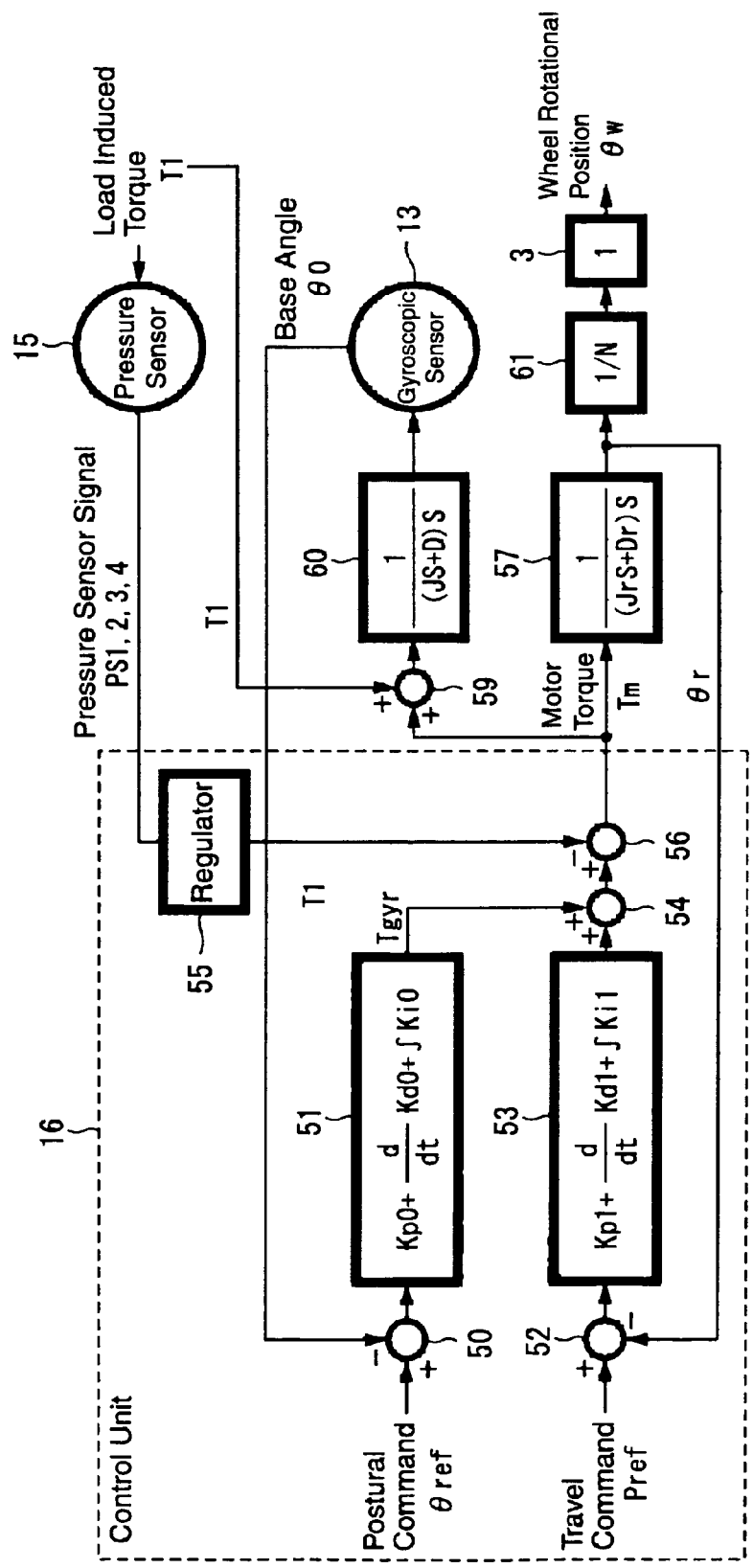
FIG. 38 is a diagram showing the block diagram of FIG. 37 as a mathematical model.
Figure 39:
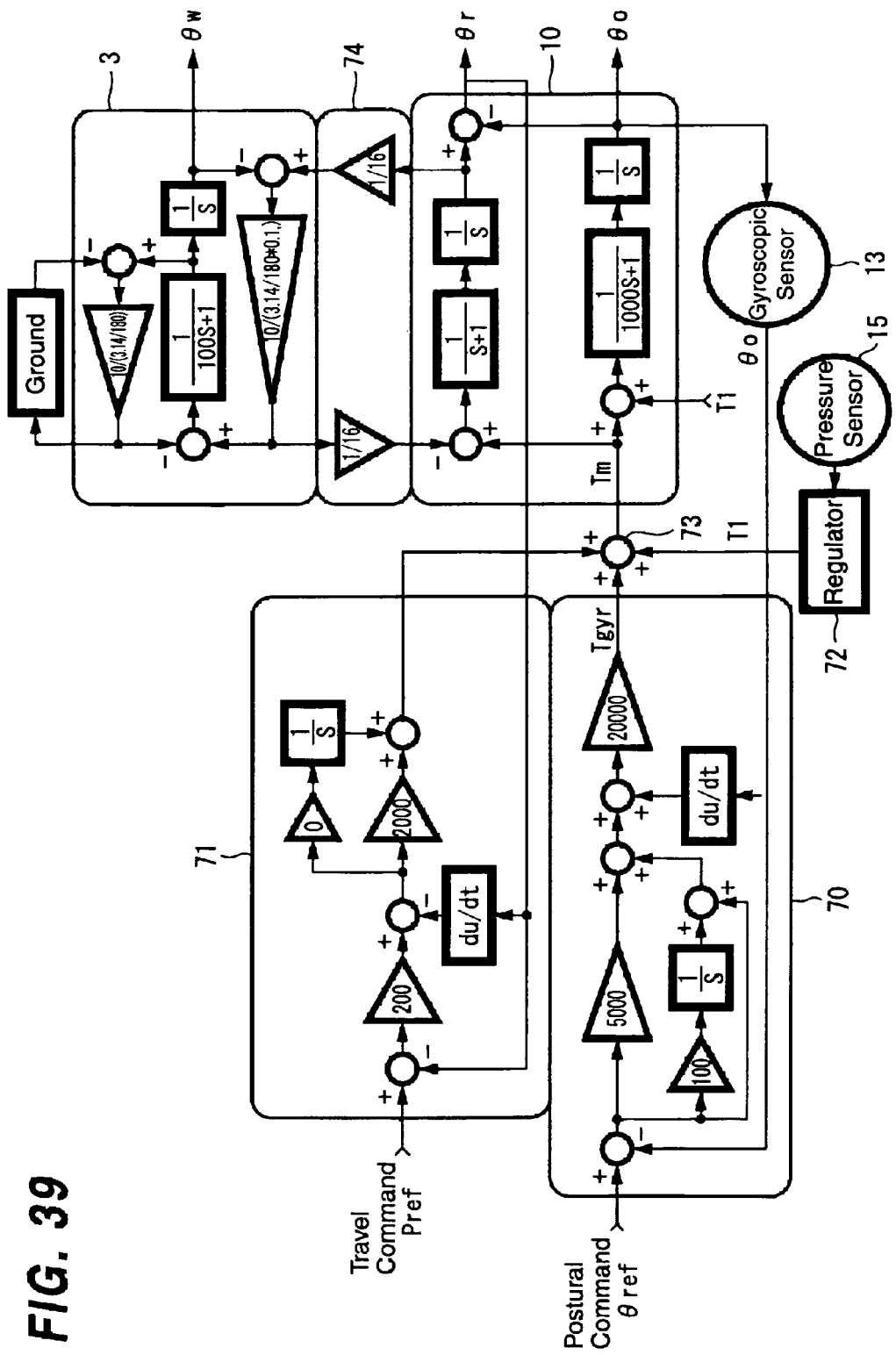
FIG. 39 is a diagram showing in detail a specific example of the mathematical model shown in FIG. 38.
Figure 61:
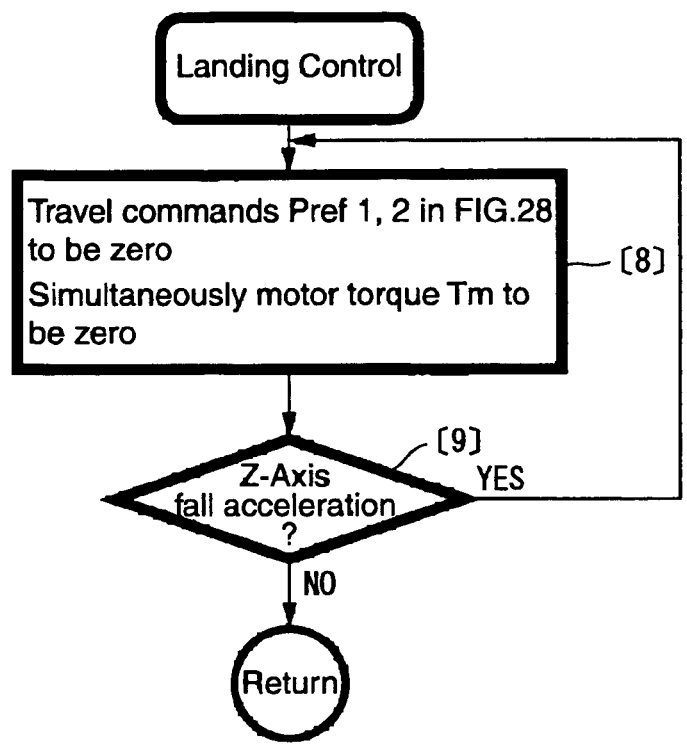
FIG. 61 is a flow chart of landing after the fall.

Furthermore, in the landing control of FIG. 61, when this processing is required, the travel commands Pref1 and Pref2 shown in the above mentioned FIG. 28 are made to be zero at a step [8] and at the same time, the motor torque Tm is made to be zero. Furthermore, the Z-axis fall acceleration is distinguished at a step [9], and when the fall is under way (Yes), the processing is returned to the step [8], but when the fall is finished (No), the processing flow is returned to the original routine. Thus, the landing control of the step [4] is performed.

Figure 62:
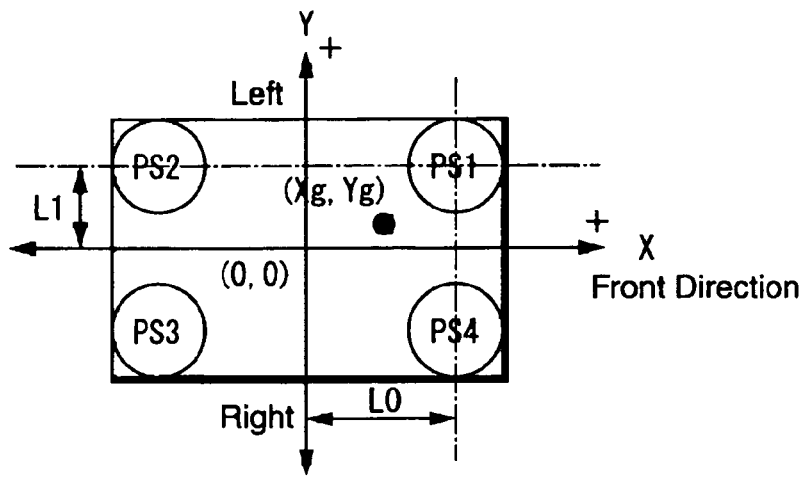
FIG. 62 is a diagram showing the disposition of pressure sensors on a table.

Note that, in the above mentioned apparatus, the load sensors for detecting the ZMP are constructed as shown in FIG. 62, for example. Further, the coordinates (Xg, Yg) of the barycenter in this structure are obtained from the following formulas.

$W = PS1 + PS2 + PS3 + PS4 - W0$ [N]: $W0$ is a vehicle weight with no-load.

$W1 = (PS1 + PS4)/2 - W10$ [N]: $W10$ is a vehicle weight with no-load.

$W2 = (PS2 + PS3)/2 - W20$ [N]: $W20$ is a vehicle weight with no-load.

$W3 = (PS1 + PS2)/2 - W30$ [N]: $W30$ is a vehicle weight with no-load.

$W4 = (PS3 + PS4)/2 - W40$ [N]: $W40$ is a vehicle weight with no-load.

$Xg = L0*(W1 - W2)/(W1 + W2)$ [m]

$Yg = L1*(W3 - W4)/(W3 + W4)$ [m]

Here, when the W is a certain weight or more, a forward movement or a backward movement is performed depending on a sign and value of Xg. At that time, a command to the tire at a time of t is indicated by the following formulas.

$Prefx(t) = Xg \times Gx \times t$ [rad] ($Gx$ is a positive constant)

$Pref1(t) = Pref2(t) = Prefx(t)$ [rad]

On the other hand, a pressure sensor signal changes by the load induced torque T1 as a load torque correction command, and the load induced torque T1 is measured by the above formulas. A torque which balances out the T1 is computed from the measured result using the following formula. This computed signal is a presumed value T'1 of the load induced torque.

$T'1 = W \times Xg/2$ [Nm]

This operation is performed by the regulator of O in FIG. 14.

Further, the turn command is schematically explained. Specifically, when the turn is made using an output of the pressure sensor, PM is assumed to be the barycentric coordinate signal Yg in FIG. 62.

PM=Yg

Hereupon, when positional commands of the right and left wheels at the time t are Rref1(t) and Rref2(t) [rad], and when a travel velocity Prefx(t)/dt is zero, the commands of the right wheel and the left wheel become opposite phase commands and are obtained by the following formulas.

$Rref1(t) = PM \times G0 \times t$ [rad]: right wheel command ($G0$ is a positive constant)

$Rref2(t) = -PM'G0 \times t$ [rad]: left wheel command

Therefore, when the travel velocity Prefx(t)/dt is not zero, both the positional commands have the same phase and the commands of the right wheel and the left wheel are obtained by the following formulas.

$Rref1(t) = Prefx(t) + PM \times G1 \times t$ [rad]: right wheel command ($G1$ is a positive constant)

$Rref2(t) = Prefx(t) - PM \times G1 \times t$ [rad]: left wheel command

At this time, it is assumed that the signs of Rref1(t) and Rref2(t) are the same as that of Prefx(t). Moreover, when the signs thereof are different, values of Rref1(t) and Rref2(t) are made to be zero.

Figure 41:
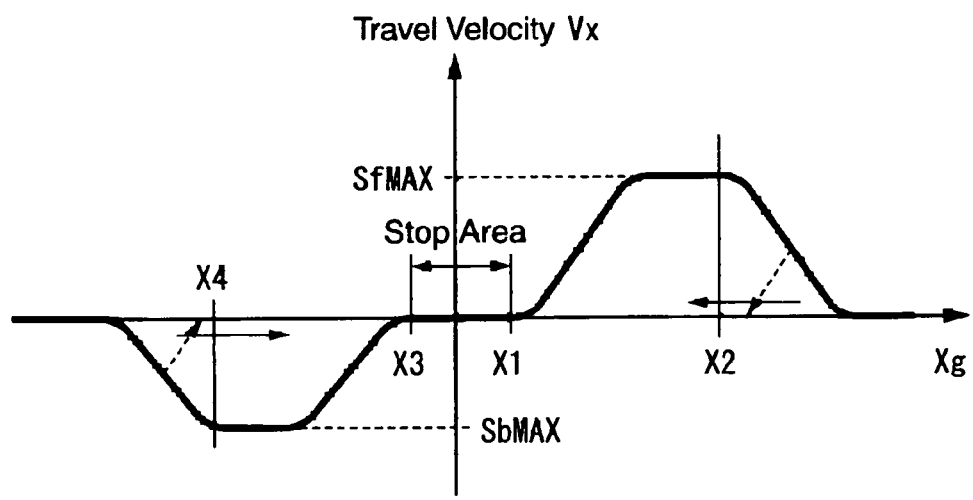
FIG. 41 is a diagram for explaining a travel velocity control in the case of moving forward and moving backward.
Figure 42:
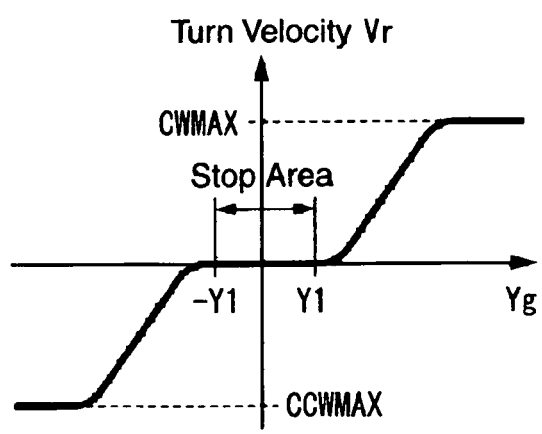
FIG. 42 is a diagram for explaining a travel velocity control in the case of making a turn.
Figure 43A:
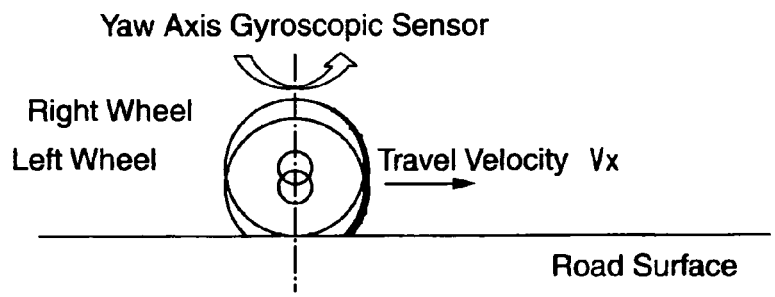
FIG. 43 is a diagram for explaining a control method in the case where a signal of a gyroscopic sensor around a yaw axis is detected when moving straight ahead.
Figure 43B:
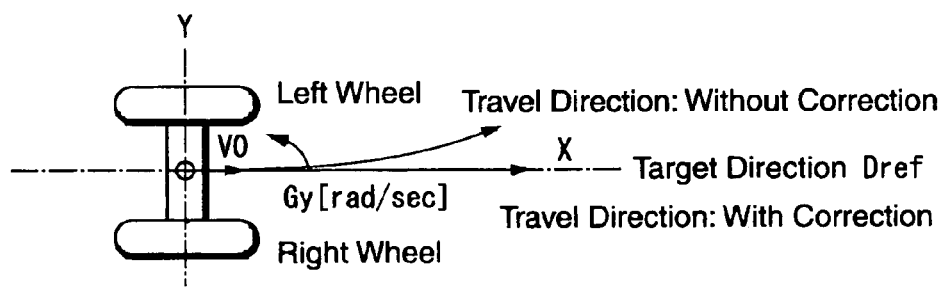
Figure 43C:
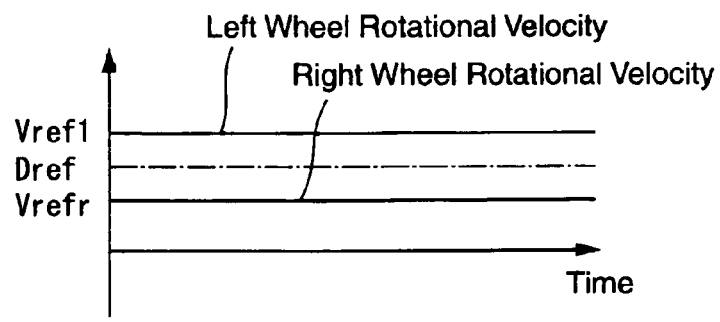
Figure 44:
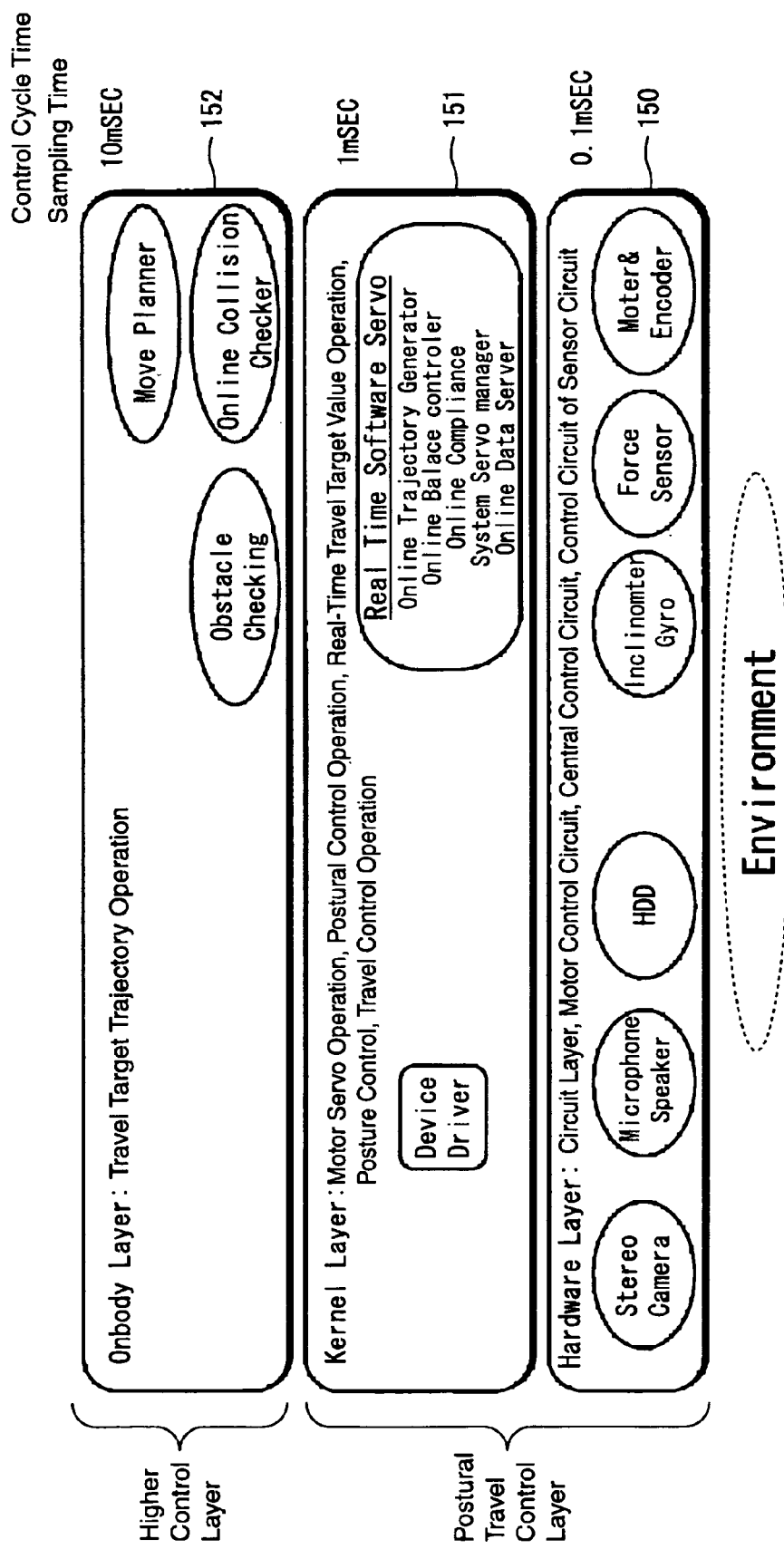
FIG. 44 is a diagram for explaining a software configuration of the coaxial two-wheeled vehicle.

With those Rref1(t) and Rref2(t), the right and left tires rotate at rotational velocity of Ω1 and Ω2 [rad/sec] respectively in the circuit shown in FIG. 40. Further, a turn radius R and a turn velocity ωyaw are determined depending on a difference between those Ω1 and Ω2. Furthermore, since an upper limit of the turn velocity ωyaw is defined by the turn velocity provided in FIG. 41, the rider can make a turn while keeping the posture stable.

Furthermore, in the above described embodiment, a method for controlling a bound at the time of falling from a level difference is hereinafter explained. Specifically, with respect to a signal of the gravitational acceleration sensor or a signal of the load sensor mounted on the table, since the floor reactive force is lost at the time of falling, the signals become zero. When those signals are zero, that is, while being in the air, the postural control can be performed by applying the motor torque to both tire-inertia and table-inertia.

Figure 63:
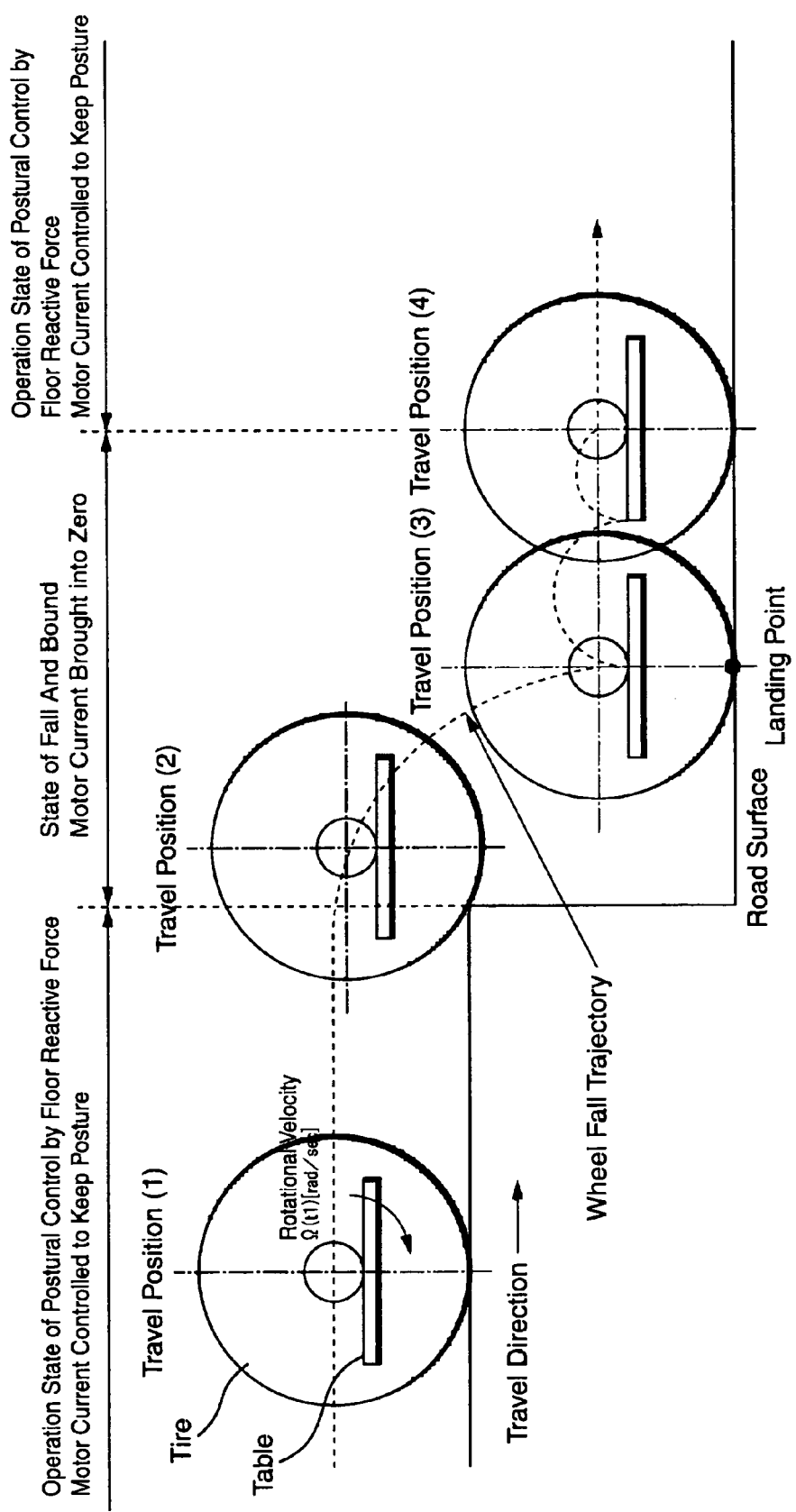
FIG. 63 is a diagram for explaining a motion change and a control state in a bound state at a time of falling from the level difference.

Then, the posture can be controlled by the motor torque as shown in FIG. 66, for example, between a travel position (2) and a travel position (3) in FIG. 63, for example. However, when falling time is indefinite, there is a limit to the time for performing the control, because the control is required to be performed within the period of time until landing is made to the road surface when such control of the inertial moment force using the inertia is performed in the air.

On the other hand, according to the present invention, the motor current is made to be zero; the wheel rotation is made into a state of being rotated by the force which is applied to the tire from the outside (floor reactive force or ground-contacting frictional force) so that a rotational force due to the floor reactive force at the time of landing can be absorbed by the tire; the posture of the table is maintained by the inertial force of the table; a state of being stabilized after the bound is detected by the signal of the acceleration sensor or by the signal of the load sensor; and when it becomes possible to perform the postural control, the control is performed to be stabilized (refer to FIG. 63). Thus, a problem of the bound of the tire can be avoided to control the posture.

Figure 64:
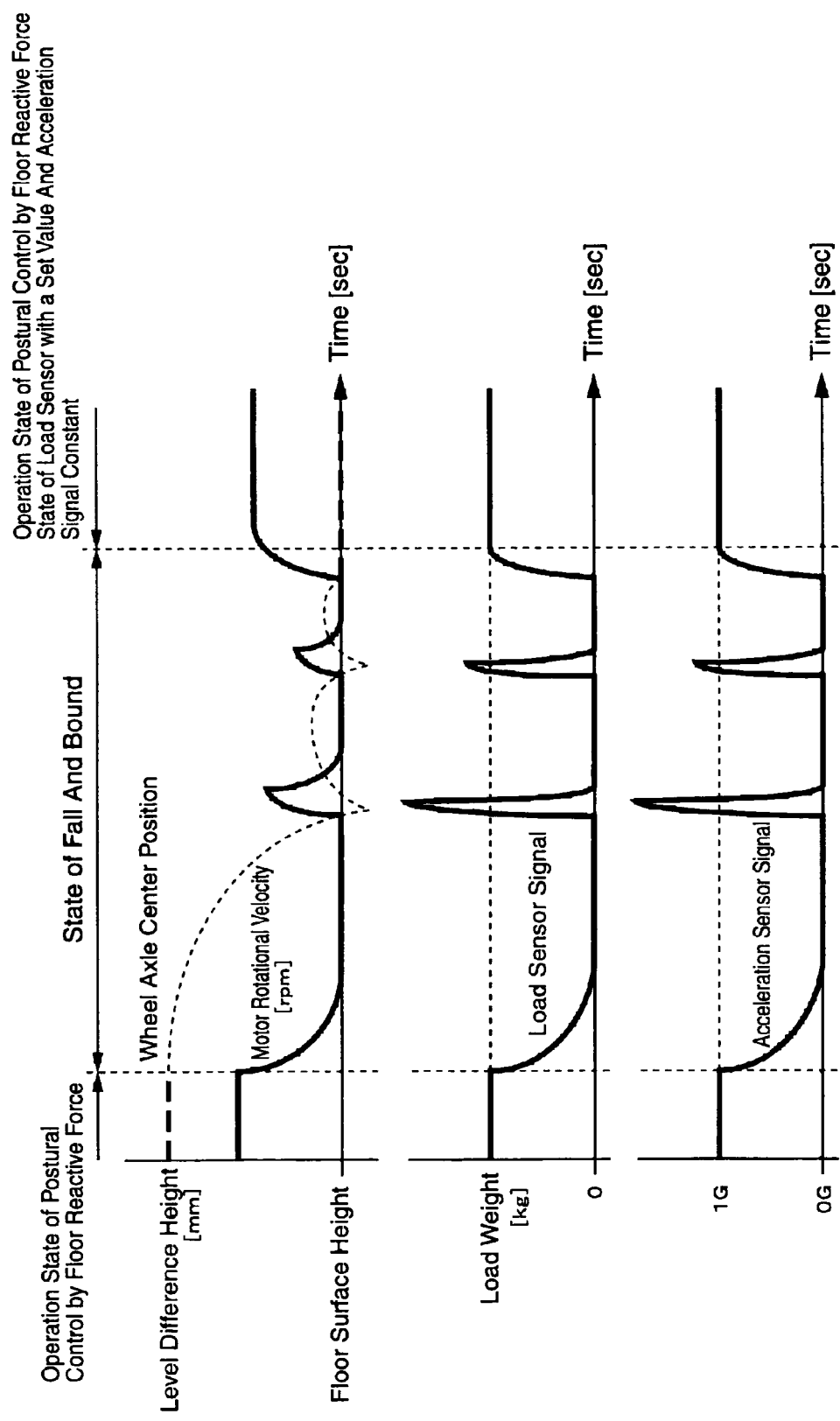
FIG. 64 is a diagram for explaining a change of a sensor signal in the bound state at the time of falling from the level difference.

Furthermore, during a period until becoming a state of stable ground-contacting after bounding by the fall from the level difference, the signals of both the acceleration sensor and the load sensor on the vehicle change as shown in FIG. 64. In other words, the motor current is made to be zero in the falling state and in the bounding state, so that the motor can be rotated by the external force. Accordingly, the posture of the table is brought into a state where the posture is maintained by the inertial force. The state of the stable ground-contacting with the road surface after the fall can be distinguished by obtaining predetermined values of both the load sensor and the acceleration sensor (refer to FIG. 63). Thus, after detecting the state of the ground-contacting, it becomes possible that the rider maintains the posture stably by the postural control.

Moreover, in the above described embodiment, the method for controlling the posture in the free fall is hereinafter explained. Specifically, when a motor torque τm [Nm] is supplied at the time of free fall to a mechanism having the structure as shown in FIGS. 65A and 65B for example, a table rotational velocity and a tire rotational velocity change in accordance with FIG. 66. Thus, with generating the motor torque, a table rotational angle can be controlled at the time of falling.

On the other hand, when a step signal is supplied as the motor torque as shown in FIGS. 65A, 65B and 66, the table is rotated in inverse proportion to the inertial moment of the table; and in the case where the rotational angle at that time is detected as the table angle by the gyroscopic sensor and the period of time until the angle becomes half a value of a target table angle is put as t0 [sec], when a torque −τm [Nm] having the same magnitude and an opposite direction is supplied as the motor torque after the time t0 [sec], the target table angle is achieved in 2×t0 seconds (refer to FIG. 67).

Thus, when the motor torque which gives the angular velocity at the time of free fall is generated, such control is performed that the table postural position becomes stable at the time of landing, that is, becomes horizontal in this case, by making the table rotated using the inertial moment of the tire and the table. Moreover, when there exists no floor reactive force at the time of fall with the motor current controlled in this manner, the table is rotated by generating an angular acceleration torque to keep an inclination angle of the table horizontal, so that the table is kept to be horizontal (refer to FIG. 67).

Furthermore, the method for controlling the posture at the free fall is explained hereunder. Specifically, In FIGS. 65A and 65B, a relationship between the rotational velocity and the rotational angle with respect to the tire and the table at the time of free fall is explained. That is, even at the free fall the tire and the table are controlled by the motor torque to obtain the target angular velocity and angle thereof. Hereupon, a case in which the tire rotational velocity is made to be zero in terms of a relative velocity against the road surface at the time of free fall is shown. In addition, the method is applicable to the fall either by both wheels or by one wheel.

Figure 68B:
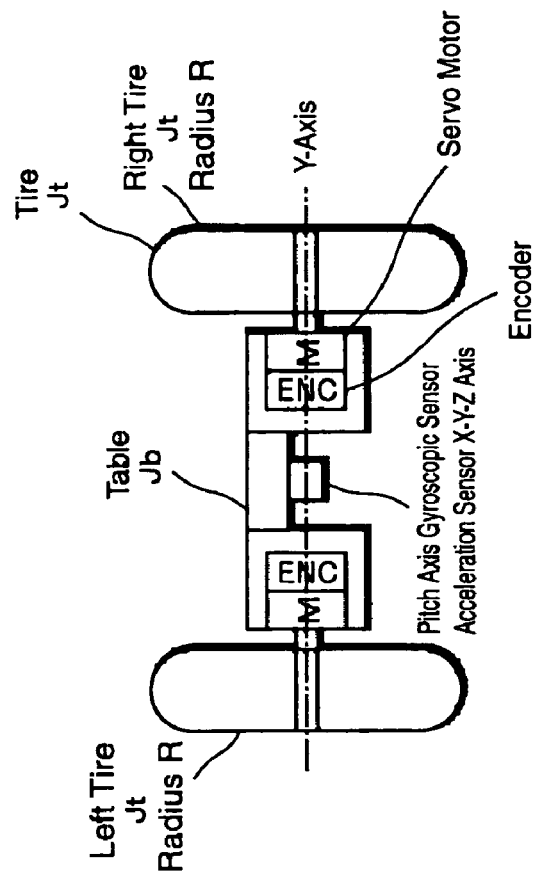
FIGS. 68A and 68B are diagrams showing the structure of the tire and the table, in which 68A is a front view and 68B is a lateral view.
Figure 68A:
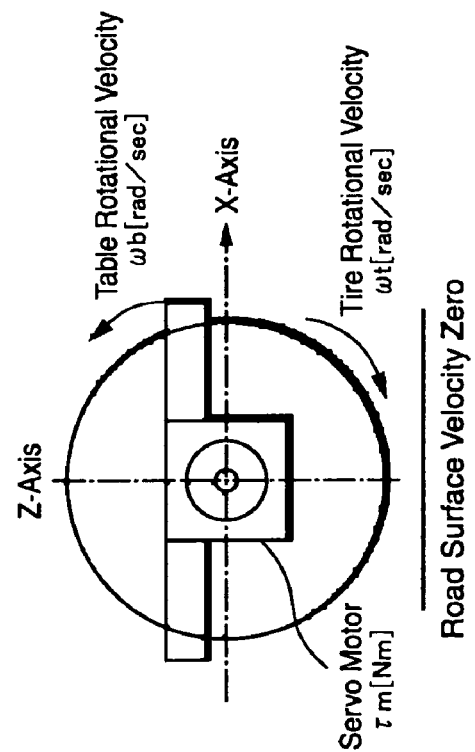

Then, the state of the free fall in a mechanism shown in FIGS. 68A and 68B is detected from a Z-axis signal Gz of the acceleration sensor mounted on the table. When the falling state is distinguished by the acceleration sensor based on a condition of a formula [Gz<1[G]], such command value that satisfies REF=Kv×ΔVEL, where Gz<1[G] is satisfied and
REF=θrref, where Gz<1[G] is not satisfied, is made to be an output of a tire velocity control unit by a command switching unit of FIG. 69, at the same time, an integrated value Vx [rad/sec] of a signal ωb[rad/sec] of the pitch axis gyroscopic sensor, a signal ωr[rad/sec] of a rotor rotational angular velocity detector and a signal Ax [m/sec$^2$] of the X-axis acceleration sensor shown in FIG. 69 are added, and the relative velocity ΔVEL between the road surface and the tire is computed using a formula of [ΔVEL=ωb[rad/sec]+ωr[rad/sec]+Vx[rad/sec]].

In the tire velocity controller (proportional controller or PD controller), an operation of [Vx[rad/sec]=R×∫Ax dt, R=tire radius] is performed with respect to the road surface-tire relative velocity signal ΔVEL thus obtained, and the operation value thereof is supplied as the command value REF [REF=Kv×ΔVEL] of the postural controller, so that the relative velocity between the tire and the road surface can be made into zero.

Figure 69:
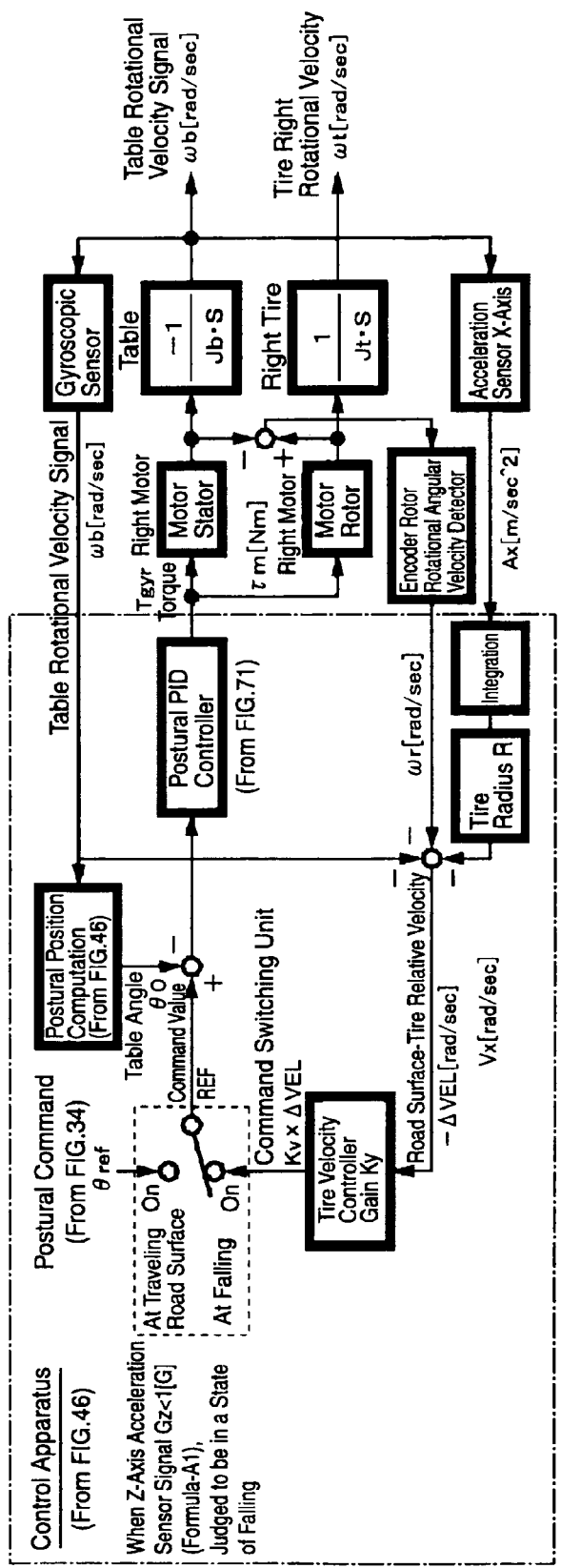
FIG. 69 is a diagram for explaining control over the relative velocity of a tire to a road surface.

In other words, landing is performed with the motor controlled using the above mentioned operation value, so that it is possible to minimize an interfacial frictional force generated from the relative velocity difference between the road surface and the tire, and even if the command switching unit of FIG. 69 is switched from [REF=Kv×ΔVEL] to the postural command θref after landing, the rotational moment force induced by the road surface frictional force is not generated and it is possible to shift to the postural control which makes the table angle horizontal.

Figures 46, 46A:
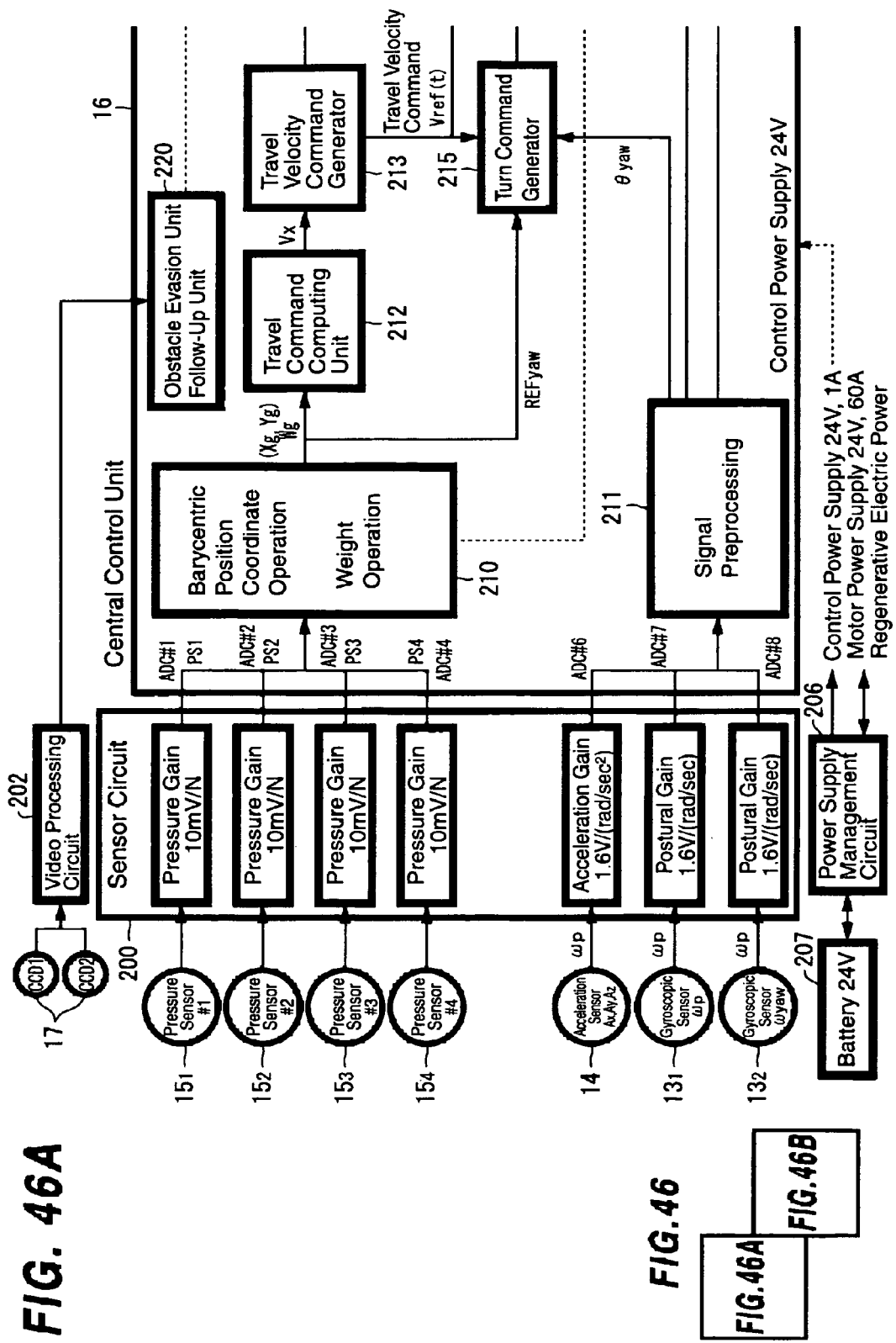
FIGS. 46A and 46B are diagrams for explaining a detailed internal configuration of the whole configuration shown in FIG. 45, in which the travel velocity control when moving forward and moving backward is explained.
Figure 46B:
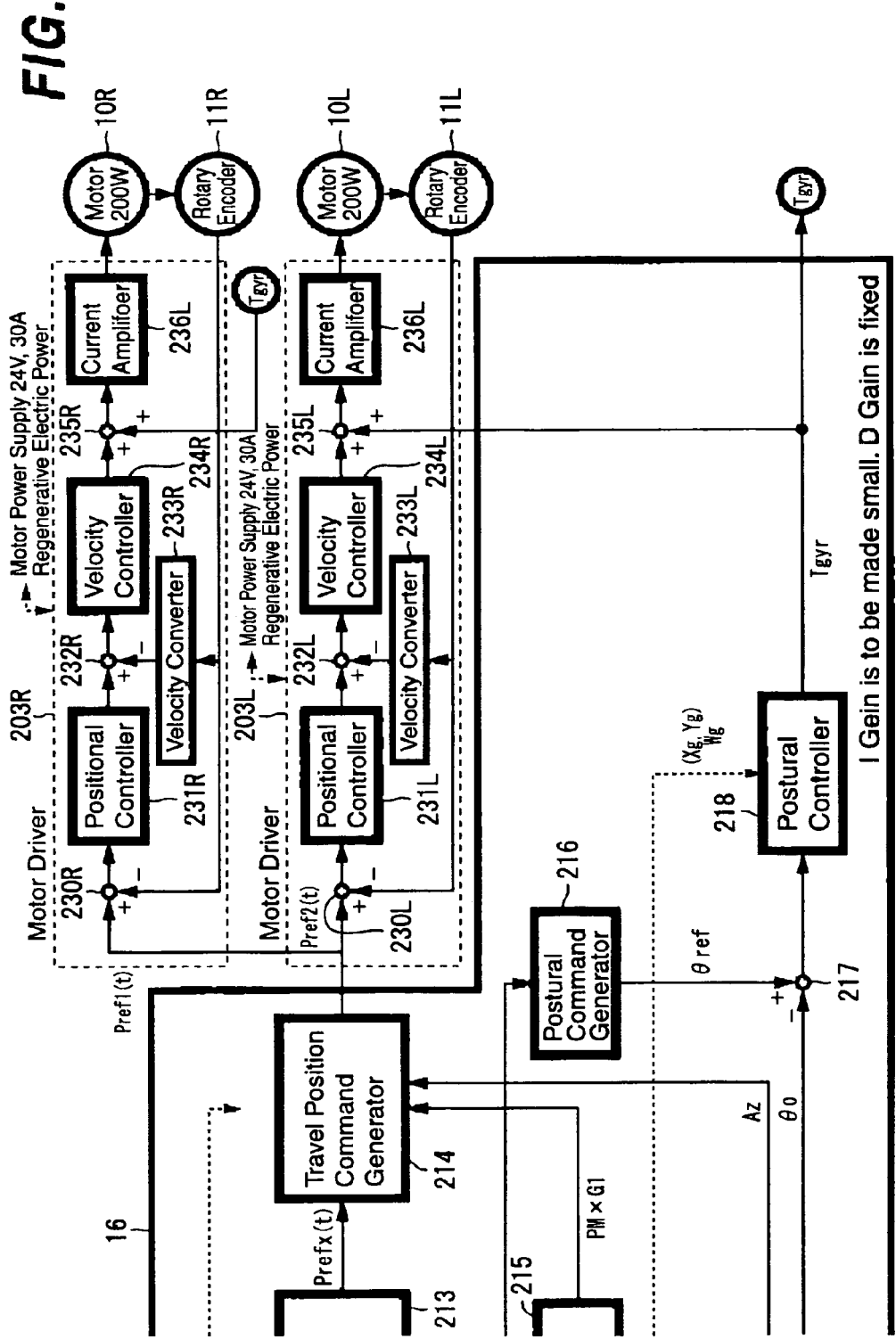

As described above, according to the above mentioned embodiment, the motor torque is controlled to rotate the tire at the time of free fall, the relative velocity between the road surface and the tire is made into zero at the time of landing, the interfacial frictional force can be made small, and the rotational moment force generated by the interfacial frictional force at the time of landing can be made small, so that it becomes possible to maintain the table posture stably. In addition, FIG. 69 is a diagram to explain the control over the right wheel, the control over the left tire is also described similarly. Moreover, FIG. 69 shows the circuit to be added in the control system-block internal configuration diagram of FIGS. 46A and 46B.

Figure 70B:
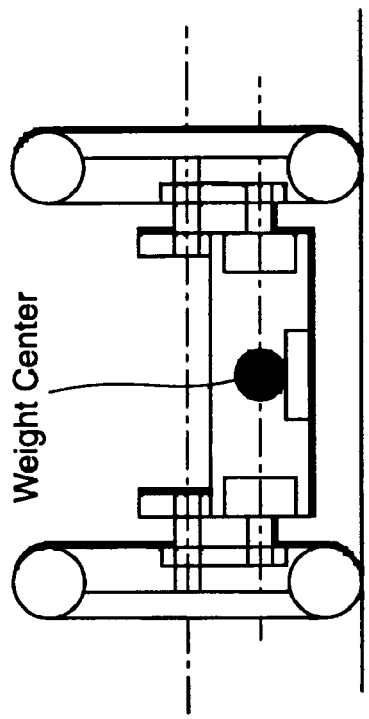
FIGS. 70A and 70B are diagrams showing the relationship among the barycentric position, turn velocity and load position.
Figure 70A:
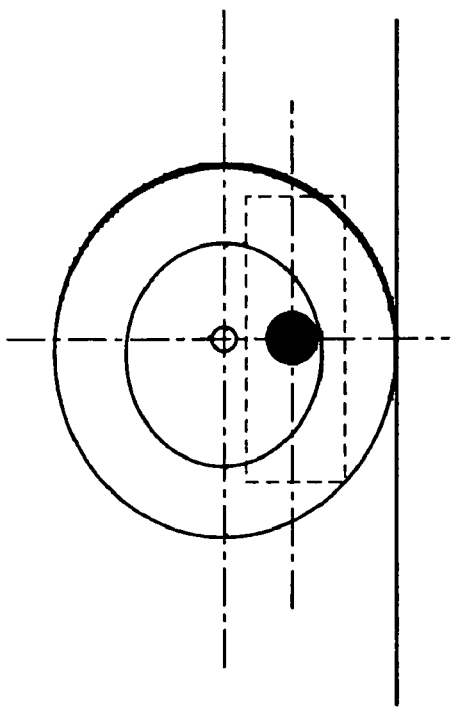

Thus, according to the above mentioned embodiment,
1. Even if an abnormality occurs in the control unit to be unable to operate, the vehicle stops by the friction of the tires and the vehicle is kept to have the barycentric position at the most stable position due to the reason that a gravitational center exists on or below the wheel axle, so that the vehicle is kept horizontal by the friction of the tires not to fall down easily and a serious accident can be prevented from occurring. (refer to FIGS. 70A and 70B)

2. When the motor torque is generated by the motor to drive the wheel, the vehicle can move with keeping the posture in which the barycenter is stable.
3. When the motor torque is generated by the motor to drive the wheel, the vehicle can move with keeping the body horizontal.
4. Since the load can be detected, stable and constant performance is maintained against a fluctuation of the load (refer to FIGS. 70A and 70B).
5. Even if a man does not ride, traveling can be performed stably by means of the pressure sensor.
6. Even if there is no handle equipped, a man can operate the vehicle using the pressure sensor by shifting the barycentric position of his/her weight to decide both the travel direction and the travel velocity based on the barycentric position thereof or by changing the right and left barycentric position at the time of a halt to perform driving for a turn.
7. Even if there exists a difference in the radius of two tires due to the difference in air pressure of two wheels, traveling straight can be carried out by the feed-back control over the gyroscopic sensor of the yaw axis to make the rotational velocity of the right and left wheels variable. Further, even if there exists a difference in road surface with respect to the right and left wheels, the traveling straight can be carried out by making the rotational velocity of the right and left wheels variable.
8. Due to a flexible tire, the ground-contacting area with the road surface becomes large and therefore a rolling frictional resistance becomes large. Therefore, if the man rides, the vehicle can stand stably.

Figure 71A:
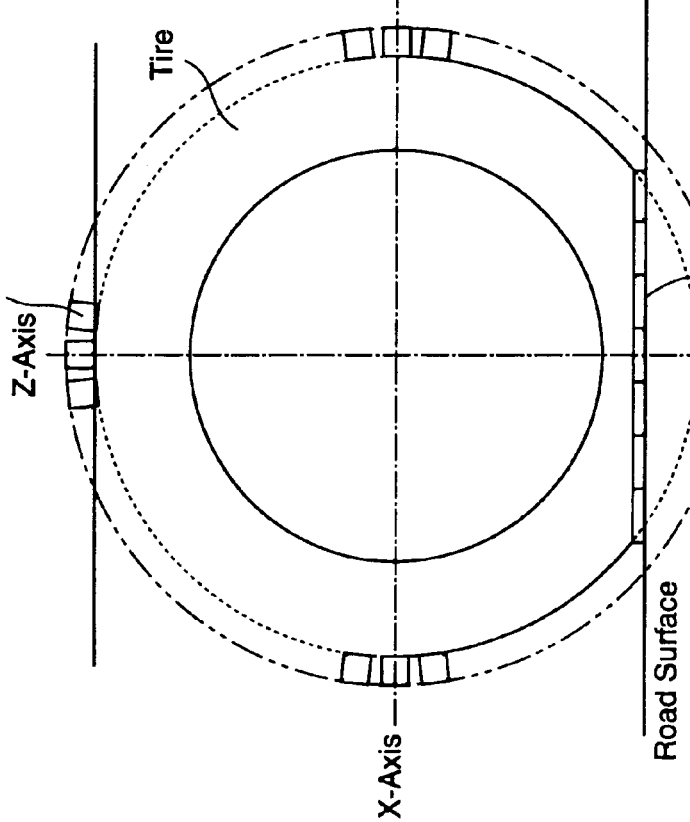
FIGS. 71A and 71B are diagrams showing a structure of a tire.
Figure 71B:
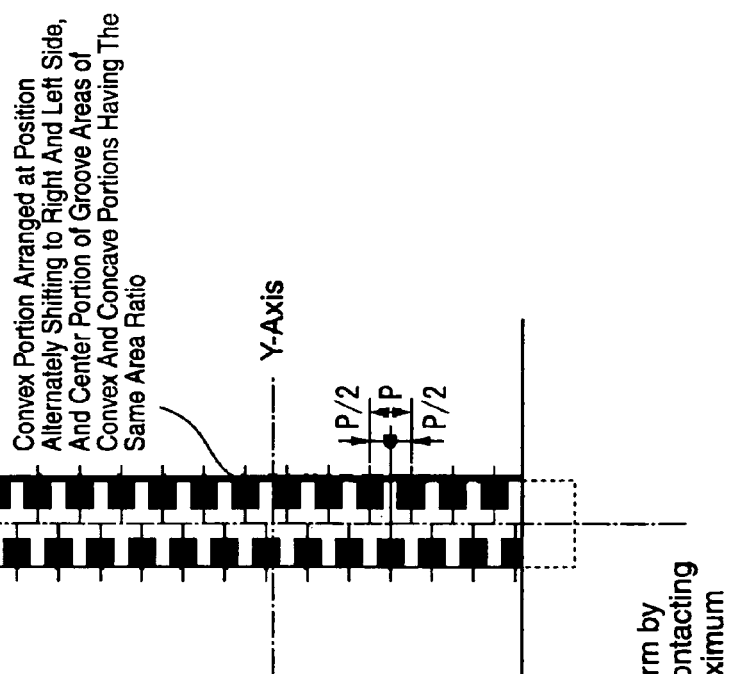

Further, in the above described embodiment, such structure as shown in FIGS. 71A and 71B can be employed for the tires. The tire shown in FIGS. 54A and 54B is formed of a rubber material (such as natural rubber or chloroprene rubber) having flexibility and vibration-proof quality and has the structure including a concavo-convex surface in which a convex portion is disposed in turn by shifting the position alternately on the right side and on the left side. Moreover, a central portion of the tire becomes a groove, and an unevenness of the road surface is absorbed by the projecting portions of the vibration-proof rubber to prevent vibration. The central portion functions as the groove, and areas of the concave and convex portions have the same area ratio.

Furthermore, the tire has such a characteristic in which with respect to the ground-contacting portion between the tire and the road surface, the contacting area can be made large by the transformation of the convex portion due to the weight of the vehicle so that the rolling frictional resistance increases; and if the tire rotates in the clockwise direction (CW) and in the counterclockwise direction (CCW), and if the tire has the concavo-convex surface due to a phase difference on the right side and on left side, a uniform road surface resistance can be obtained; so that the posture of the vehicle can be easily controlled by means of the inverted pendulum control or by means of the ZMP (Zero Moment Point) control by the vehicle. In addition, since a grooved area and a projected area of the tire are equal, the projection of the portion in contact with the road surface is transformed to fully contact with the road surface, thereby increasing the rolling friction.

With the above tire structure, since large rolling friction is obtained, the stable posture can be maintained. Further, according to such structure, low rigidity is obtained with respect to the X-axis and the rigidity in the direction of the Y-axis can be made high, so that the vibration of the vehicle regarding the Y-axis and a sway regarding the roll axis can be reduced.

Thus, according to the above mentioned traveling apparatus, a traveling apparatus includes a means for driving a plurality of wheels independently and a chassis connecting the plurality of wheels, in which a means for detecting a barycentric shift of a rider is provided in the chassis to perform traveling by respectively setting rotational velocity of the plurality of wheels in accordance with information on said detected shift of the barycenter, wherein means for detecting the acceleration in the gravitational direction is provided to the chassis, and a control means for performing a predetermined control with respect to the rotational velocity of the plurality of wheels by detecting a change in acceleration in the gravitational direction, so that safe landing can be obtained even if a wheel goes apart from a road surface and falls freely in the air.

Moreover, according to the method for controlling the above mentioned traveling apparatus, a method for controlling a traveling apparatus is provided in which the traveling apparatus includes a plurality of wheels independently driven, a chassis connecting the plurality of wheels, and the chassis is provided with a means for detecting barycentric shift of a rider to perform traveling by respectively setting rotational velocity of the plurality of wheels in accordance with information on the detected barycentric shift, wherein the acceleration in the gravitational direction of the chassis is detected, and a change in acceleration in the gravitational direction is detected to apply a predetermined control with respect to the rotational velocity of the plurality of wheels, so that safe landing can be obtained even if a wheel goes apart from a road surface and falls freely in the air.

Note that, the present invention can be applied to an apparatus that is a vehicle having a gravitational center on or below a wheel axle and performing an autonomous travel, in which a man rides on the vehicle which stabilizes autonomously a vehicle body by a postural control unit to feed back a postural sensor signal and the vehicle is made to move forward, move backward and make a turn by changing a barycenter of a weight, and also can be applied to an apparatus of a biped autonomous robot that is an ambulatory vehicle having no mechanism of a brake and an accelerator, or can be applied to a robot. Furthermore, the present invention is not limited to the embodiments explained above, and various modifications thereof are possible without departing from a scope and a spirit of the present invention.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A traveling apparatus, comprising:
   a means for driving a plurality of wheels independently;
   a chassis for connecting said plurality of wheels, in which means for detecting a shift of barycenter of a rider is provided by setting a rotational velocity of each of said plurality of wheels, respectively, in accordance with information on said detected shift of the barycenter; and
   control means for restricting the rotational velocity of each of said plurality of wheels to a predetermined limited value by detecting when a barycentric position has come close to a position near each of said plurality of wheels, wherein turning is performed in accordance with the shift of said barycentric position to the right and left.

2. The traveling apparatus according to claim 1, wherein said plurality of wheels include two wheels whose rotational axles are disposed on a straight line, and an element of keeping said chassis horizontal is included in the setting of the rotational velocity of each of said plurality of wheels.

3. The traveling apparatus according to claim 1, wherein means for detecting acceleration in traveling is provided in said chassis, and an angle of said chassis is controlled in accordance with said detected travel acceleration to ensure a stability of posture of the rider.

4. The traveling apparatus according to claim 1, wherein means for detecting a velocity of said turning is provided in said chassis, and the limited value with respect to the rotational velocity of each of said plurality of wheels is changed in accordance with said detected turning velocity.

5. The traveling apparatus according to claim 1, wherein said chassis is provided with an acceleration sensor which detects acceleration on an X-axis, on a Y-axis, and on a Z-axis and with a gyroscope sensor which detects an angular velocity on a pitch axis, on a yaw axis, and a roll axis, and the acceleration and the angular velocity of said chassis at a time of traveling are detected to control an angle and the acceleration in traveling of said chassis.

6. The traveling apparatus according to claim 1, wherein a table is provided on said chassis, the table including pressure sensors provided on each of four corners of the table, respectively, and the shift of said barycentric position of the rider is detected in real time by outputs of the pressure sensors.

7. The traveling apparatus according to claim 1, wherein a barycentric vector is obtained from information on a velocity of a turning position and said barycentric position, and control is performed such that a ground-contacting point of the barycentric vector with a road surface becomes a ground-contacting point between each of said plurality of wheels and a road surface.

8. A method for controlling a traveling apparatus including a plurality of wheels driven independently and a chassis for connecting said plurality of wheels, the method comprising:

detecting a shift of barycenter of a rider by setting a rotational velocity of each of said plurality of wheels, respectively, in accordance with information on said detected shift of barycenter;

turning in accordance with the shift of a barycentric position to the right and left; and performing a predetermined restriction with respect to the rotational velocity of each of said plurality of wheels by detecting when said barycentric position has come close to a position near each of said plurality of wheels.

9. The method for controlling the traveling apparatus according to claim 8, wherein said plurality of wheels include two wheels whose rotational axles are disposed on a straight line, and an element of keeping said chassis horizontal is included in the setting of the rotational velocity of each of said plurality of wheels.

10. The method for controlling the traveling apparatus according to claim 8, further comprising:

detecting an acceleration in traveling of said chassis; and controlling an angle of said chassis in accordance with said detected travel acceleration of ensure a stability of posture of the rider.

11. The method for controlling the traveling apparatus according to claim 8, further comprising:

detecting a velocity of said turning of said chassis; and changing the limited value with respect to the rotational velocity of each of said plurality of wheels in accordance with said detected turning velocity.

12. The method for controlling the traveling apparatus according to claim 8, further comprising:

detecting, with respect to said chassis, acceleration on each of an X-axis, a Y-axis, and a Z-axis and an angular velocity on each of a pitch axis, a yaw axis, and a roll axis to control an angle and the acceleration in traveling.

13. The method for controlling the traveling apparatus according to claim 8, further comprising:

measuring a pressure at each of four corners of a table provided on said chassis; and detecting the shift of said barycentric position of the rider in real time.

14. The method for controlling the traveling apparatus according to claim 8, further comprising:

obtaining a barycentric vector from information on a velocity of a turning position and the barycentric position, wherein control is performed such that a ground-contacting point of the barycentric vector with a road surface becomes a ground-contacting point between each of said plurality of wheels and a road surface.

* * * * *

UNITED STATES PATENT AND TRADEMARK OFFICE
CERTIFICATE OF CORRECTION

PATENT NO. : 7,363,993 B2
APPLICATION NO. : 10/980604
DATED : April 29, 2008
INVENTOR(S) : Shinji Ishii Page 1 of 1

It is certified that error appears in the above-identified patent and that said Letters Patent is hereby corrected as shown below:

In claim 10, column 56, line 20, "of ensure" should read --to ensure--.

Signed and Sealed this

Nineteenth Day of August, 2008

JON W. DUDAS
*Director of the United States Patent and Trademark Office*